(12) United States Patent  
Shelby

(10) Patent No.: US 9,314,831 B2  
(45) Date of Patent: Apr. 19, 2016

(54) MANUFACTURING SYSTEM AND METHODS

(75) Inventor: Richard R. Shelby, Huntley, IL (US)

(73) Assignee: Revcor, Inc., Carpentersville, IL (US)

( * ) Notice: Subject to any disclaimer, the term of this patent is extended or adjusted under 35 U.S.C. 154(b) by 1171 days.

(21) Appl. No.: 13/168,376

(22) Filed: Jun. 24, 2011

(65) Prior Publication Data

US 2012/0326374 A1 Dec. 27, 2012

(51) Int. Cl.
*B21D 11/14* (2006.01)
*B21D 53/26* (2006.01)
*B23Q 11/00* (2006.01)

(52) U.S. Cl.
CPC .............. *B21D 11/14* (2013.01); *B21D 53/267* (2013.01); *B23Q 11/0046* (2013.01); *Y02P 70/171* (2015.11); *Y10T 29/49826* (2015.01); *Y10T 29/53* (2015.01)

(58) Field of Classification Search
CPC ........ B21D 11/14; B21D 53/267; B21D 1/06; B21D 1/14; B21D 3/00; B21D 53/78; B23Q 11/0046; Y10T 29/53; Y10T 29/49826; Y10T 29/49336; B21K 1/36; F04D 29/34; F04D 29/329; F04D 29/388
USPC ............ 72/31.02, 31.03, 31.1, 298, 299, 300, 72/304, 305, 308, 310, 311, 457, 705, 72/16.2, 21.6; 416/210 R; 29/889.2, 889.6, 29/889.7
See application file for complete search history.

(56) References Cited

U.S. PATENT DOCUMENTS

| 825,511 | A | 7/1906 | Blondell |
| 1,909,097 | A | 5/1933 | Damerell |
| 2,124,760 | A | 7/1938 | Burrington |
| 2,352,442 | A | 6/1944 | Lowey et al. |
| 2,359,277 | A | 10/1944 | Saunders |
| 2,611,414 | A * | 9/1952 | Sampatacos ................... 72/21.6 |
| 2,742,947 | A | 4/1956 | Dobbs |
| 3,039,512 | A * | 6/1962 | Herder ............................ 72/376 |
| 3,147,811 | A | 9/1964 | Klonoski |
| 3,280,607 | A * | 10/1966 | Whitmore et al. ............. 72/14.9 |
| 3,580,039 | A | 5/1971 | Heinonen |
| 3,581,535 | A * | 6/1971 | Hinks et al. .................... 72/15.3 |
| 3,641,800 | A * | 2/1972 | Wickham ........................ 72/299 |

(Continued)

OTHER PUBLICATIONS

Website, Carr Lane Manufacturing Co., Toggle-Action Principles, http://www.carrlane.com/catalog/index.cfm/ 29425071F0B221118070C1C513906103E0B0554 3B0B012009083C3B285355464A2D020609090C0015312A365 15F55455B, publicly available before Jun. 24, 2010, 2 pages.

(Continued)

*Primary Examiner* — David Bryant
*Assistant Examiner* — Lawrence Averick
(74) *Attorney, Agent, or Firm* — Fitch Even Tabin & Flannery LLP

(57) ABSTRACT

In one aspect, a manufacturing system is provided having lobe clamps configured to secure lobes of a spider, drive assemblies configured to pivot the lobe clamps, sensors for detecting the position of the lobe clamps, and a control system operably coupled to the drive assemblies and configured to cause the drive assemblies to pivot the lobe clamps and impart a twist to lobes of the spider. In another aspect, a method is provided that includes twisting lobes of a spider in a first direction toward initial target positions using a machine, permitting the lobes to twist in a second direction toward free state positions, and twisting one or more of the lobes using the machine in response to the one or more lobes having free state positions different than final target positions of the lobes.

44 Claims, 43 Drawing Sheets

(56) References Cited

U.S. PATENT DOCUMENTS

| | | | | |
|---|---|---|---|---|
| 3,696,655 | A | * | 10/1972 | Hinks et al. ............... 72/321 |
| 4,319,866 | A | | 3/1982 | Kolthoff |
| 4,373,241 | A | * | 2/1983 | Maloof ................ 29/889.6 |
| 4,636,142 | A | * | 1/1987 | Baranski ............. 416/210 R |
| 5,461,893 | A | * | 10/1995 | Tyler ...................... 72/16.2 |
| 6,715,989 | B2 | * | 4/2004 | Mosiewicz ........ F04D 29/023 403/337 |
| 6,942,457 | B2 | * | 9/2005 | Pennington et al. ......... 416/144 |
| 7,770,426 | B2 | * | 8/2010 | Mizukawa ................ 72/306 |
| 8,127,581 | B2 | * | 3/2012 | Davis ................. B23P 6/002 269/291 |
| 2004/0118175 | A1 | * | 6/2004 | Lawrence et al. ......... 72/31.03 |
| 2011/0061431 | A1 | * | 3/2011 | Mizukawa ................ 72/31.1 |

OTHER PUBLICATIONS

Website, Modern Die Systems, Design and Build, Automated Twist Dies, http://www.moderndiesystems.com/catalog/detail_tmp.php?prd=Automated%20Twist%20Dies&pid=5&cpage=1, copyright 2001, publicly available before Jun. 24, 2010, 2 pages.

Modern Die Systems, Twist Die Gage, Operator Interface Manual, Apr. 1998, publicly available before Jun. 24, 2010, 18 pages.

Declaration of Richard Shelby under 37 C.F.R. 1.132 filed herewith in subject patent application, U.S. Appl. No. 13/168,376, 55 pages.

* cited by examiner

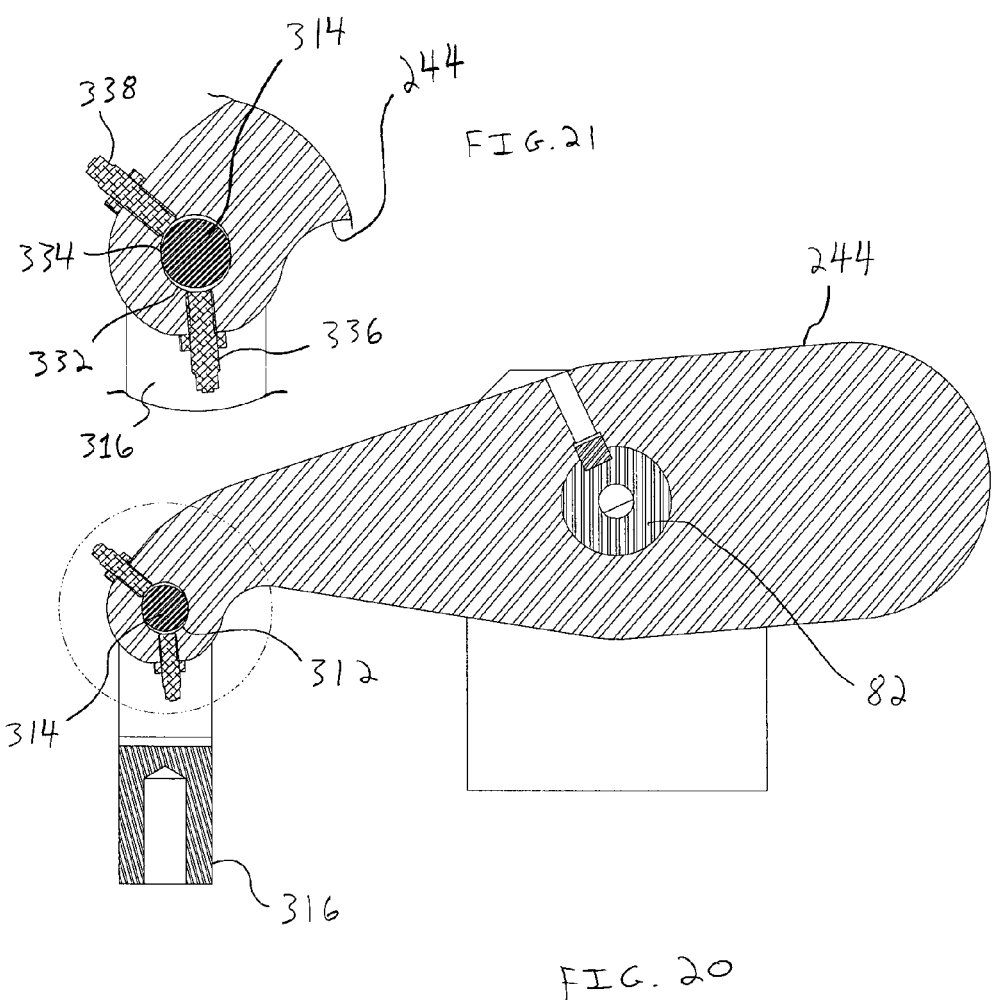

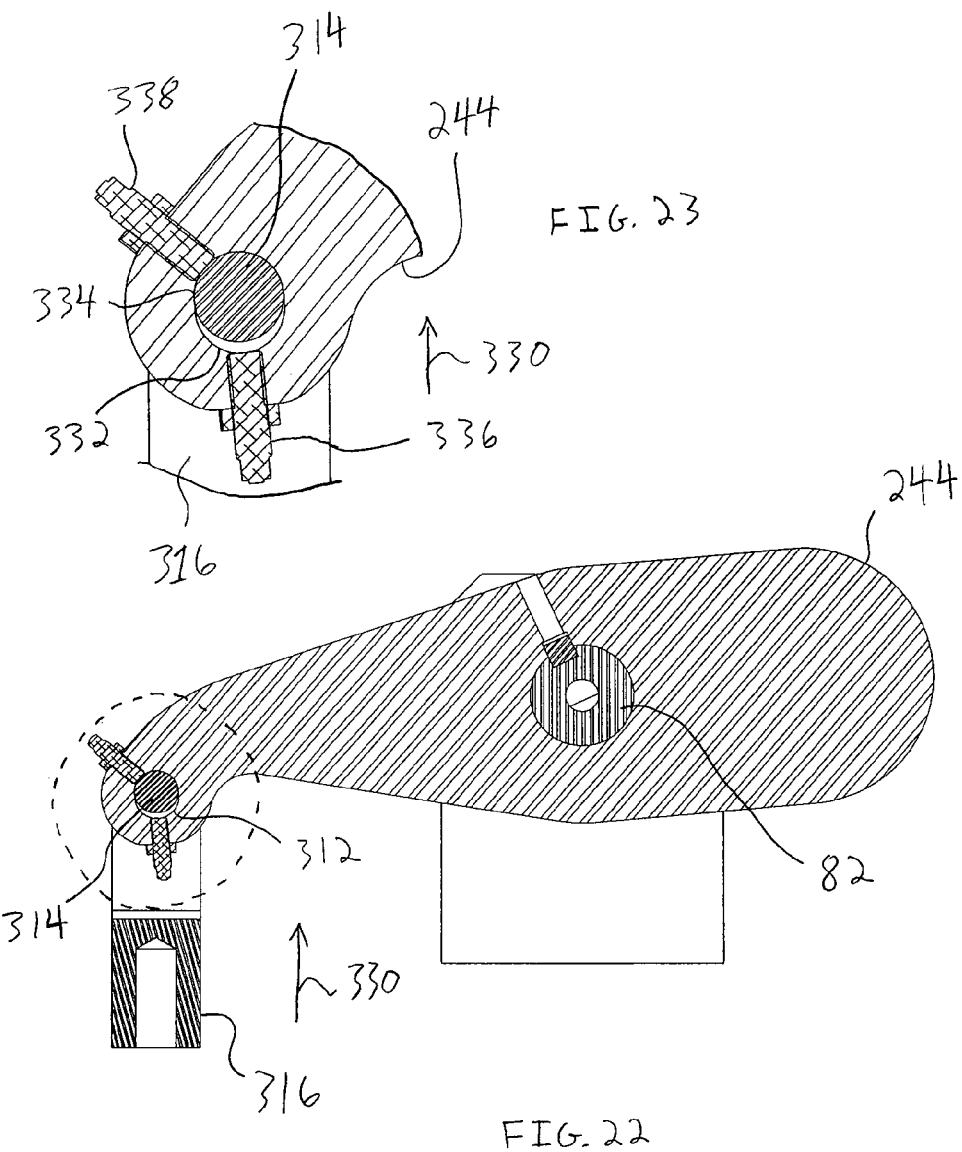

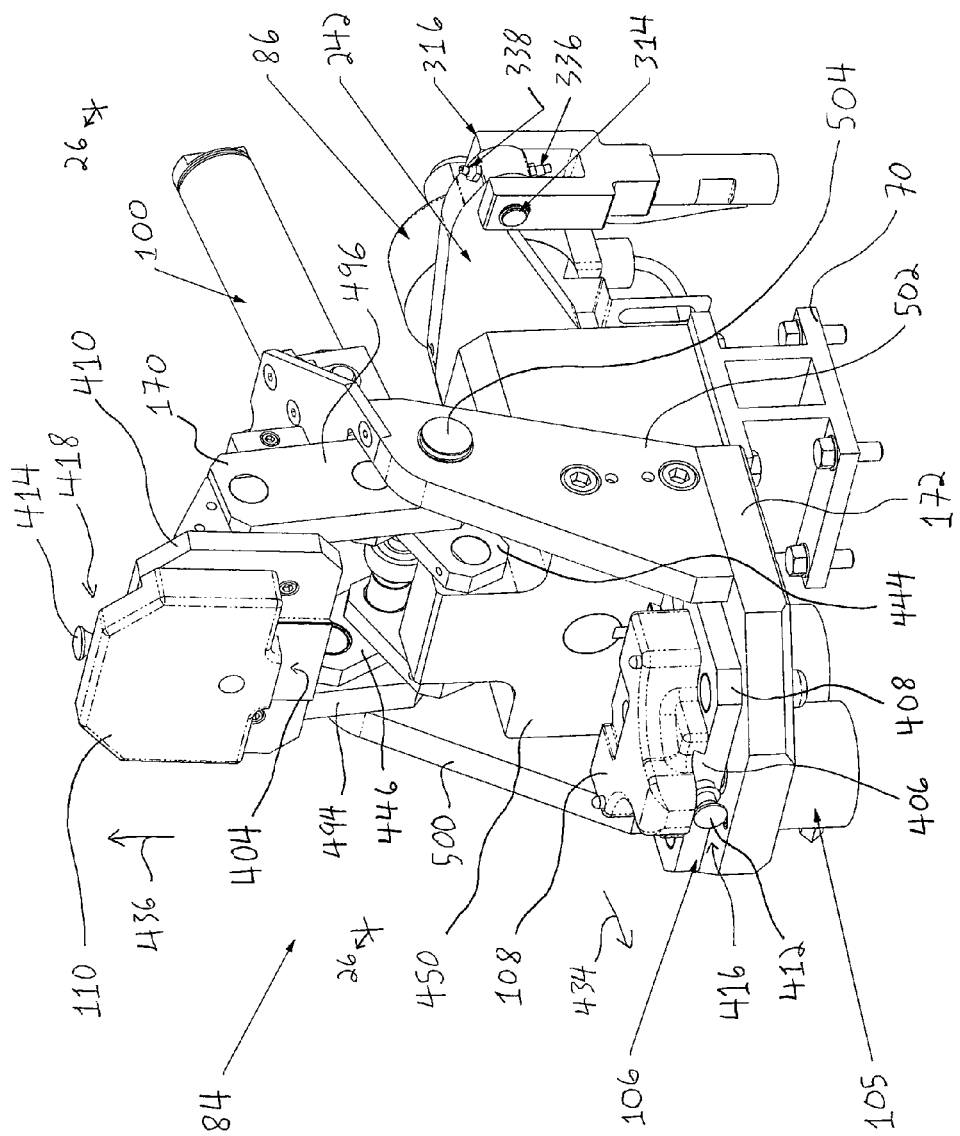

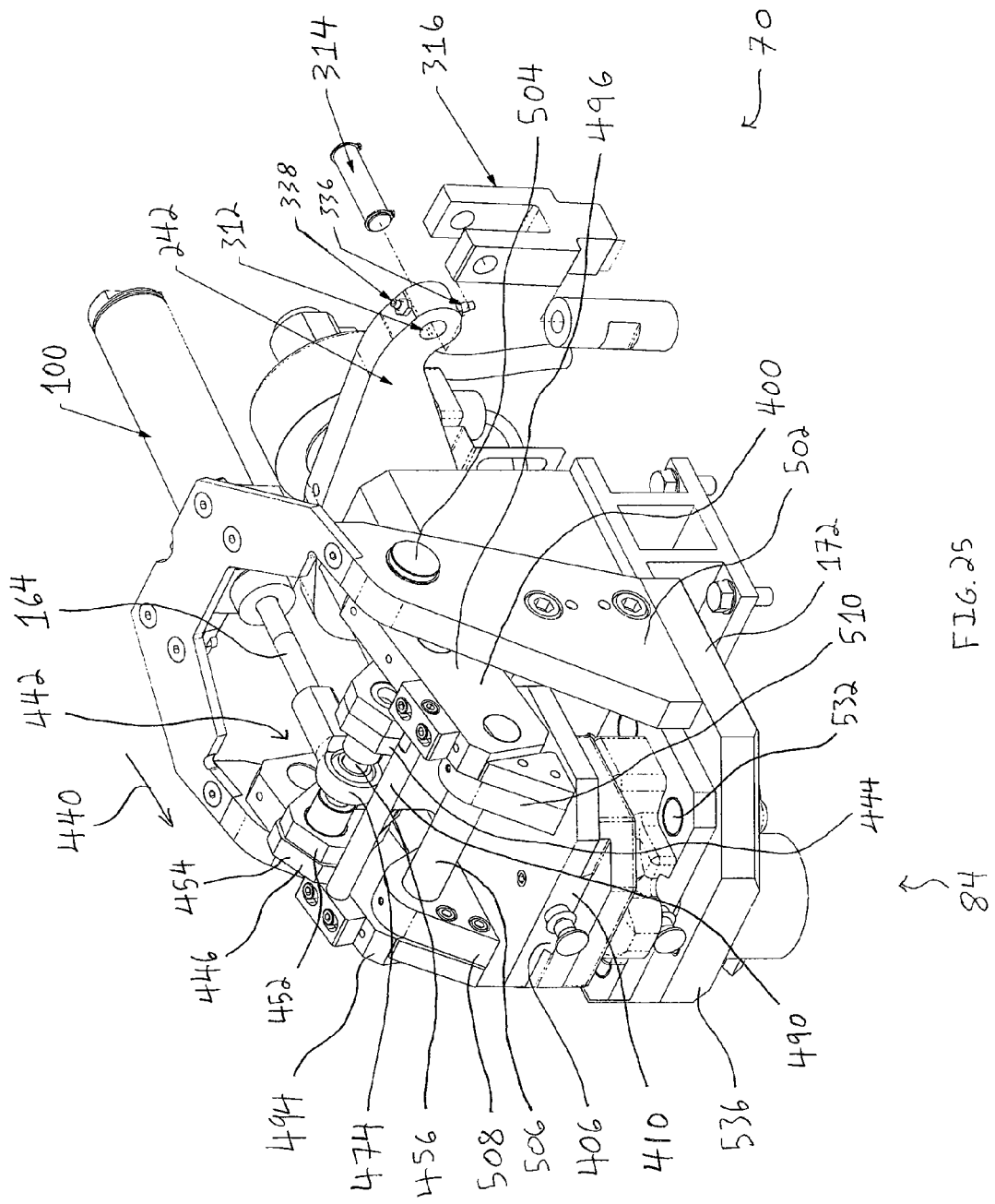

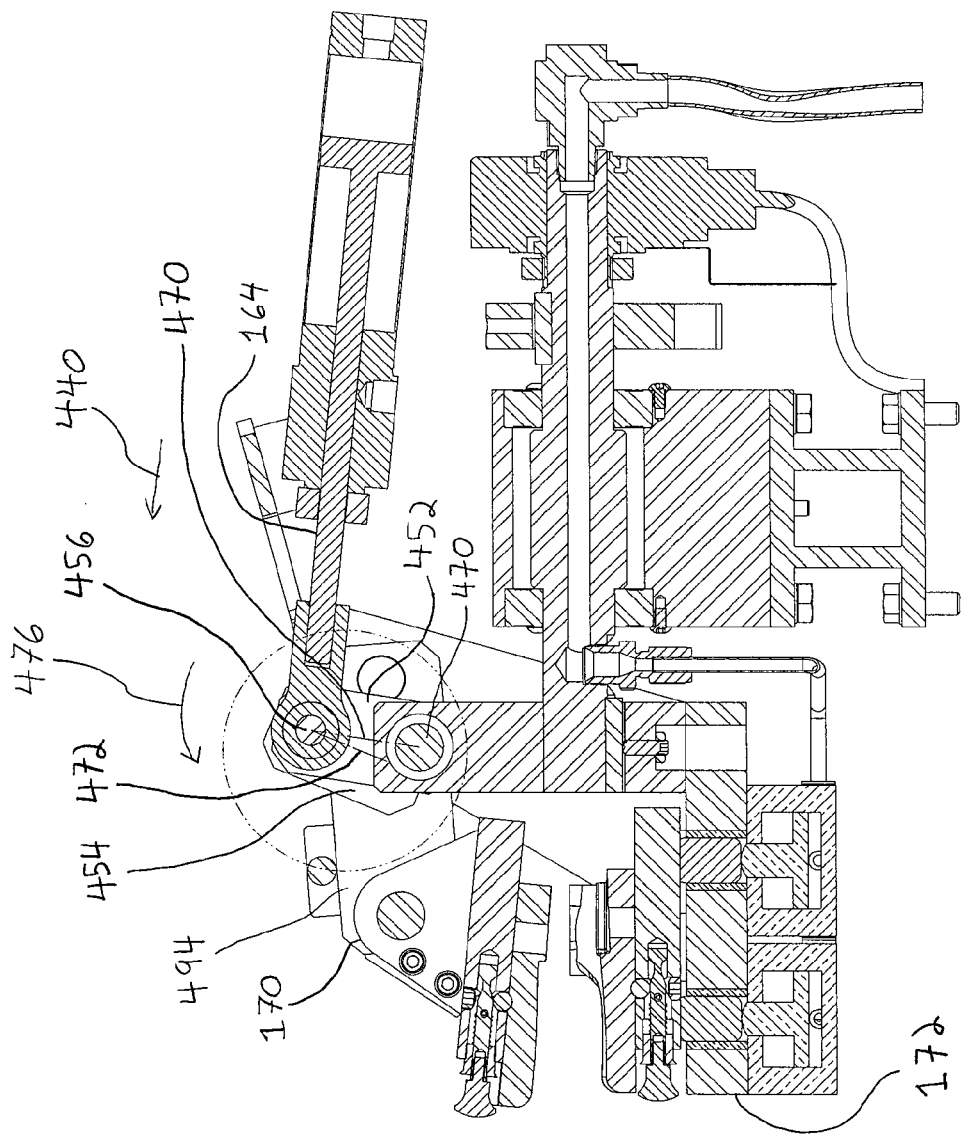

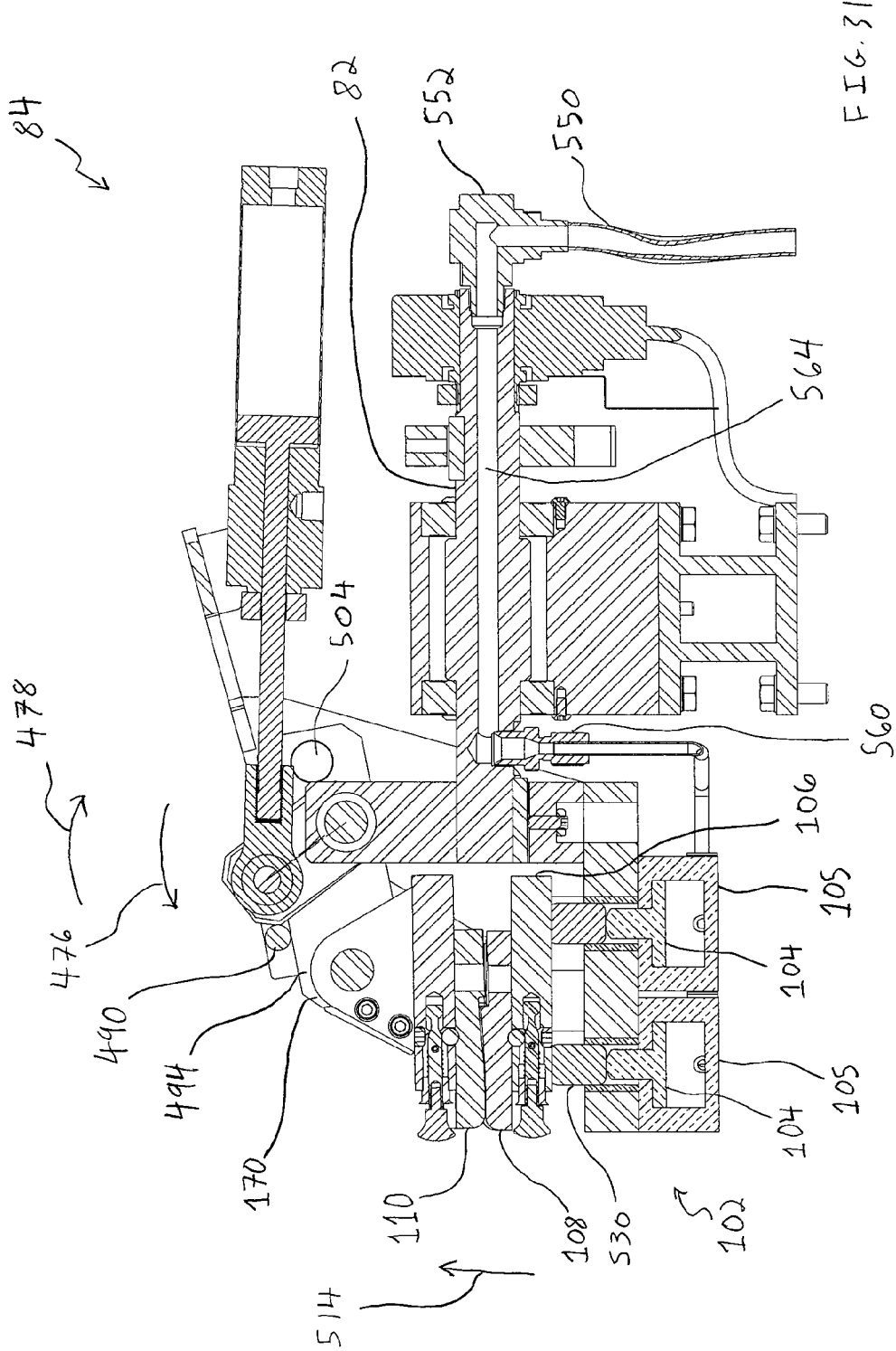

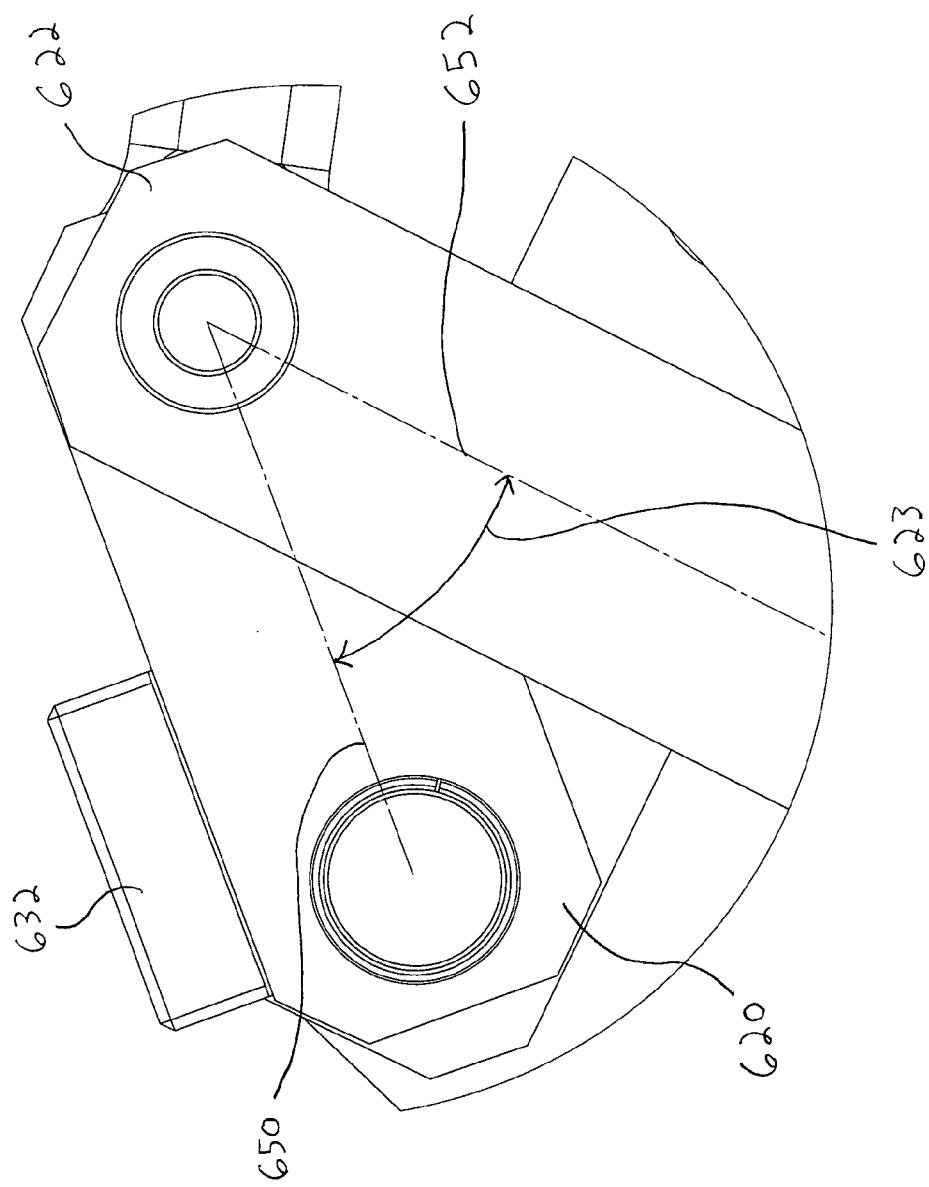

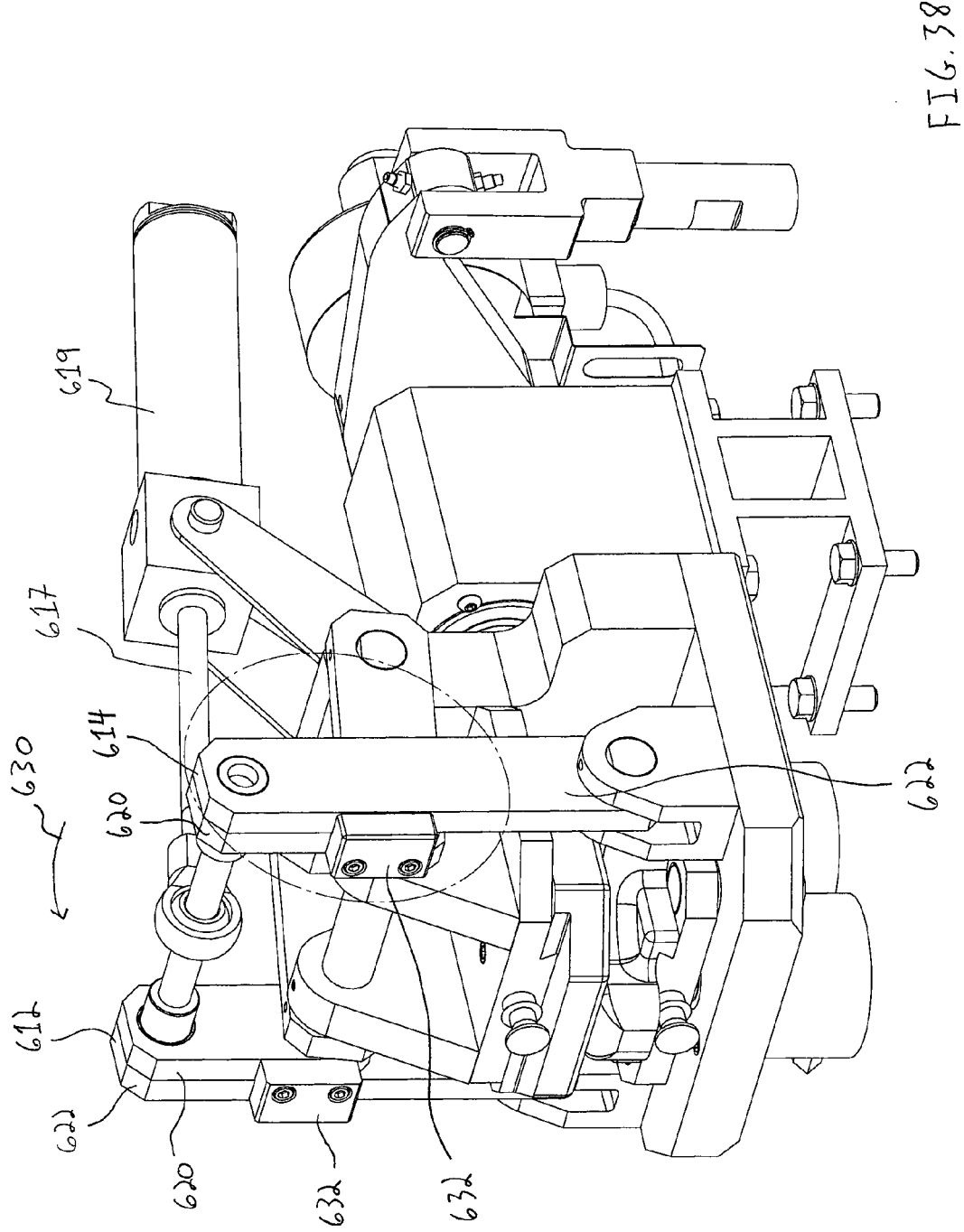

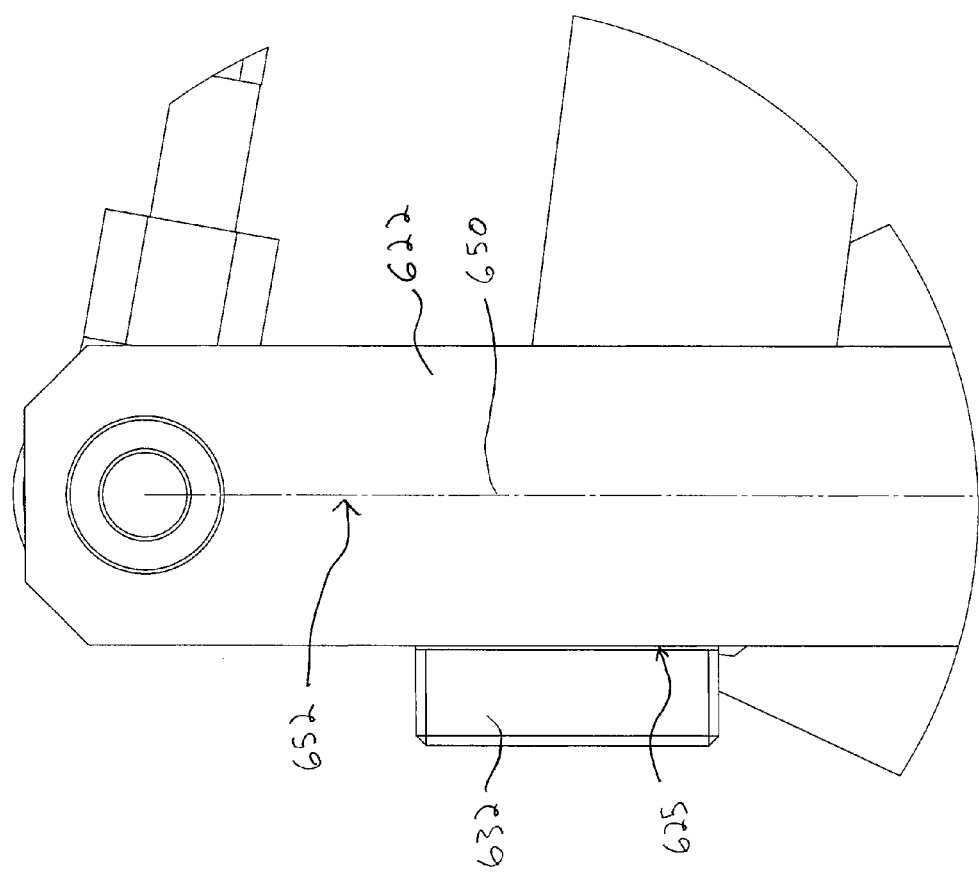

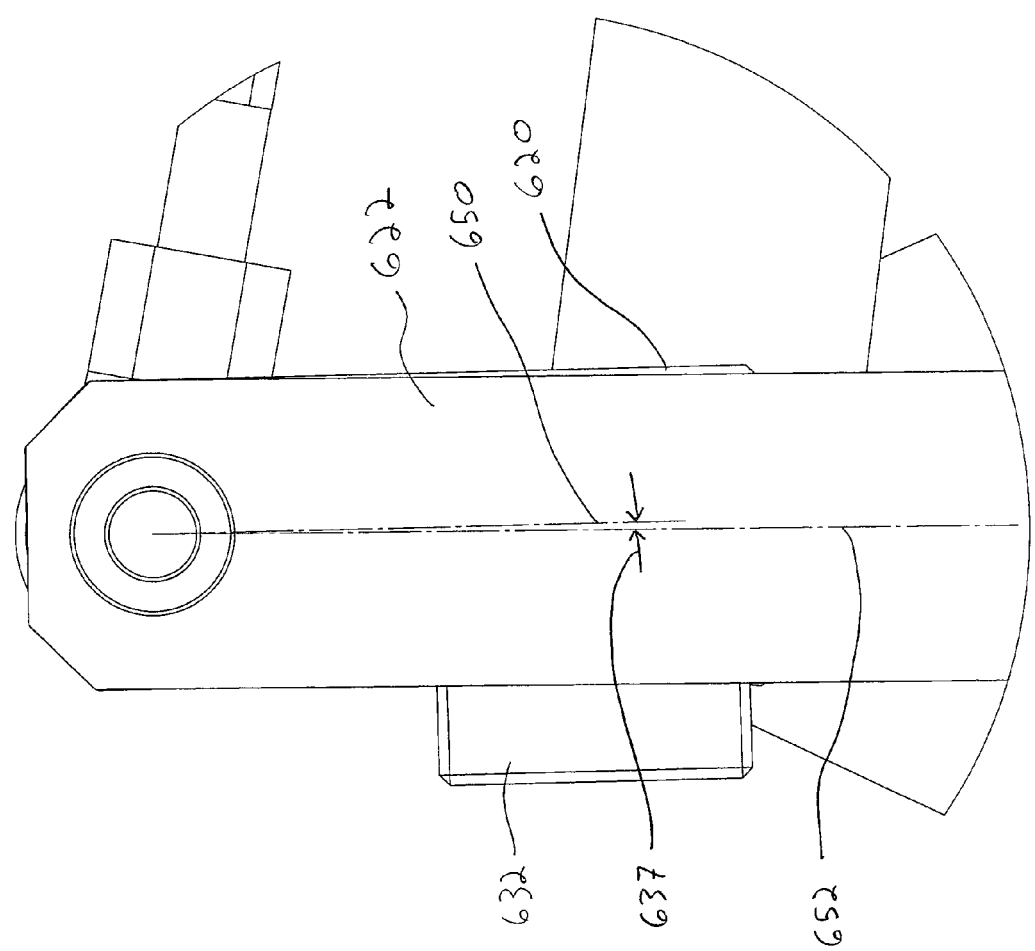

MANUFACTURING SYSTEM AND METHODS

FIELD

The field relates to manufacturing systems and methods for bending or twisting portions of articles and, more particularly, to manufacturing systems and methods for twisting lobes of spiders used in fan assemblies.

BACKGROUND

One type of axial fan includes a spider having a central portion for engaging a hub or motive source and a plurality of lobes extending radially outward from the central portion to which fan blades are secured. The lobes of the spider are bent or twisted during manufacture to position the blades, which are attached to the lobes after twisting, at desired pitch angles. In one approach, the spider and fan blades of the axial fan are stamped from sheet metal. An operator loads the spider into a traditional press machine that twists the lobes of the spider to impart desired twist angles to the lobes. The operator removes the spider from the press machine, checks the height of the lobes, rivets the fan blades to the lobes, and verifies that the dimensions and balance of the assembled fan are within acceptable tolerances.

The traditional press machine has a hydraulic ram that clamps the spider between upper and lower forming plates of the machine and causes clamping pads of the forming plates to pivot and twist the lobes of the spider. Cylindrical bearings within each forming plate support the clamping pads and permit the clamping pads to pivot relative to the respective forming plate. Lowering the upper forming plate of the press machine against the lower forming plate causes a linkage to pivot the clamping pads of the lower forming plate which, in turn, causes pivoting of the clamping pads of the upper forming plate. The combined pivoting of the clamping pads of the upper and lower forming plates twists lobes of a spider clamped therebetween and imparts twist angles to the lobes.

One problem with the traditional press machine is that the cylindrical bearings of the forming plates are expensive and wear rapidly when subjected to compressive loads. To extend the lifecycle of the bearings and reduce operating cost, the press machine may be configured so that the upper forming plate does not completely clamp a spider against the lower forming plate. Instead, the spider rests upon the lower forming plate, and the upper forming plate stops at a position approximately ten thousandths of an inch above the spider. Because of the clearance between the upper forming plate and the spider, the lobes of the spider tend to slide circumferentially between the clamping pads as the clamping pads pivot and twist the lobes of the spider. The circumferential sliding of the spider lobes between the clamping pads is a major source of variation in the twist angles of the lobes of each spider and is difficult to control on a spider-by-spider basis throughout a production run.

Another problem with the traditional press machine is that setting up the press machine to produce spiders having desired lobe twist angles is a trial-and-error process which results in a large amount of scrap material. More specifically, at the beginning of a production run, the linkage that controls the pivoting of the clamping pads is adjusted to an initial setting to produce spiders having the desired lobe twist angles. The initial setting is an empirically determined setting that produces lobe twist angles that are substantially similar to the desired lobe twist angles. Next, the operator uses the machine to twist a series of spiders, the operator adjusting the linkage and the pivoting of the clamping pads after every spider until a spider is produced having lobe twist angles within tolerance. Normally, it takes between three and five (or more) spiders in order to setup the press machine and produce a spider having lobe twist angles within tolerance. The spiders produced while bringing the press machine within acceptable tolerances typically have twist angles so far from the desired lobe twist angles that they must be scrapped. Scrapping several spiders in order to setup the press machine makes production runs of only a few spiders cost-prohibitive.

The press machine is considered setup once a spider is produced having lobe twist angles within tolerance. However, subsequent spiders may have lobe twist angles outside of acceptable tolerances such that continued tracking of spider lobe twist angles throughout a production run is needed. The continued tracking is achieved by performing a gauging step on each twisted spider that compares the spider to a spider having the desired lobe twist angles. Using information from the gauging step, the operator uses stepper motors to adjust the linkage of the press machine and the range of pivoting of the clamp pads in an attempt to twist the lobes of the next spider closer to the desired lobe twist angles. In this manner, each spider is used as a data point to adjust the settings of the press machine and bring the lobe twist angles of the subsequent spider closer to acceptable tolerances. Adjusting the press machine using the differences between each twisted spider and the desired lobe twist angles causes the settings of the linkage, the range of pivoting of the clamp pads, and the variation of the spider lobe twist angles, to continually fluctuate as the material properties of the spiders vary throughout a production run.

Another shortcoming of the traditional press machine is that corrections to the spider lobes are done by hand. In one approach, an operator manually checks every fan after the blades of the fan have been riveted to a twisted spider. If one of the lobes is out of tolerance, the operator manually bends the lobe into a position where he believes the lobe and the attached blade are acceptable. The operator then re-checks the fan and repeats the bending process as necessary. Besides the expensive and time-consuming nature of manually bending lobes of an assembled fan, gripping and bending one of the lobes imparts torsional forces to the lobes not being bent by the operator. As such, the operator's bending of a single out-of-tolerance lobe to correct that lobe may cause one or more of the remaining lobes to be pulled out of tolerance.

Although the press machine generally imparts an identical twist angle to all of the lobes of a spider, variations in the spider material, alignment of the spider in the press machine, circumferential sliding of the lobes between the clamp pads, and spring-back of the spider lobes after twisting all contribute to twist angle variation between the lobes of the spider and on a spider-to-spider basis during a production run. These variations in twist angles cause variation in the balance of the fan after the fan blades have been connected to the lobes. An out-of-balance fan may operate inefficiently, may have a resonant frequency in an operating range of the fan, and may even cause an electric motor or other drive source to wear prematurely and even fail. To ensure that each fan produced using the traditional press machine is balanced, an operator uses a machine to check the balance of the fan about the rotation axis, manually clamps counterweights to the fan blades to correct for any imbalance, and then re-checks the balance of the fan. The process of adding counterweights and re-checking the balance of the fan is repeated until the balance of the fan is within acceptable tolerances. As will be appreciated, the process of manually balancing a fan using counterweights is an expensive and time-consuming process that adds significant cost to each fan produced. Further, industry standards typically limit fan suppliers to no more than five counterweights per fan. Thus, a fan that requires more than five counterweights to bring the fan within acceptable tolerances cannot be delivered to a customer and is scrapped.

Another approach to twisting fan spiders is disclosed in U.S. Pat. No. 2,611,414 to Sampatacos ("the '414 patent"), which utilizes jaws carried on cylindrical plungers to grip and twist lobes of a spider. The machine has an annular member engaged with the cylindrical plungers so that rotation of the annular member causes all of the plungers to turn in unison and to the same extent. Like the linkage of the press machine described above, the machine of the '414 patent uses an adjustable stop mechanism to limit movement of the annular member and control the twist angle imparted to the lobes of a spider. Although an operator may have an empirical initial setting for the adjustable stop, setting up the machine of the '414 patent to produce spiders having desired lobe twist angles would involve twisting a series of spiders and adjusting the stop after each twisted spider to bring the machine within tolerance. Like the traditional press machine, the series of twisted spiders produced during setup of the machine of the '414 patent would likely be scrapped which makes production runs of only a few spiders cost-prohibitive. Further, variations in the material properties of spiders throughout a production run would require constant adjustment of the stop of the '414 patent throughout a production run to limit lobe twist angle variation and the resulting balancing issues discussed above. The machine of the '414 patent is also similar to the press machine in that checking whether a spider is within tolerance and any necessary corrections would be done manually after the spider is removed from the machine. Further, neither the press machine nor the machine of the '414 patent compensates for spring-back of lobes of a spider after twisting, which can result in each of the lobes of the spider having different lobe twist angles even though they were all twisted to the same extent.

BRIEF DESCRIPTION OF THE DRAWINGS

FIG. 20 is a cross-sectional view similar to FIG. 17 showing the crank arm in a free state and the clevis shifted slightly upwardly by the linear actuator;

FIG. 21 is an enlarged view of the dashed circle portion of FIG. 20 showing the pin disposed in the middle of the throughbore of the crank arm;

FIG. 22 is a cross-sectional view similar to FIG. 17 showing the crank arm in a free state and the clevis shifted upwardly by the linear actuator;

FIG. 23 is an enlarged view of the dashed circle portion of FIG. 22 showing the pin at an upper end of the throughbore of the crank arm;

FIG. 24 is an enlarged perspective view of a lobe clamp assembly of the spider twister machine of FIG. 2 showing upper and lower jaws of the lobe clamp assembly in an open configuration;

FIG. 25 is an enlarged perspective view similar to FIG. 24 showing the upper and lower jaws of the lobe clamp assembly in a closed configuration;

FIGS. 27 and 28 are cross-sectional views similar to FIG. 26 showing the upper jaw shifting toward a closed position;

FIG. 31 is a cross-sectional view similar to FIG. 26 showing hydraulic pistons of the lower jaw shifting the lower lobe pad to a raised position against an upper lobe pad of the upper jaw of the lobe clamp assembly;

FIG. 37A is an enlarged side view of the portion of the lobe clamp assembly circled in FIG. 37 showing longitudinal axes of inboard and outboard links of a jaw lock mechanism extending at an angle relative to each other;

FIG. 38 is a perspective view similar to FIG. 35 showing an upper jaw of the lobe clamp assembly shifting toward a closed position;

FIG. 38A is an enlarged side view of the portion of the lobe clamp assembly circled in FIG. 38 showing longitudinal axes of the inboard and outboard links aligned with one another;

FIG. 39A is an enlarged side view of the portion of the lobe clamp assembly circled in FIG. 39 showing longitudinal axes of the inboard and outboard links extending at an angle relative to each other.

DETAILED DESCRIPTION OF THE PREFERRED EMBODIMENTS

Figure 1:
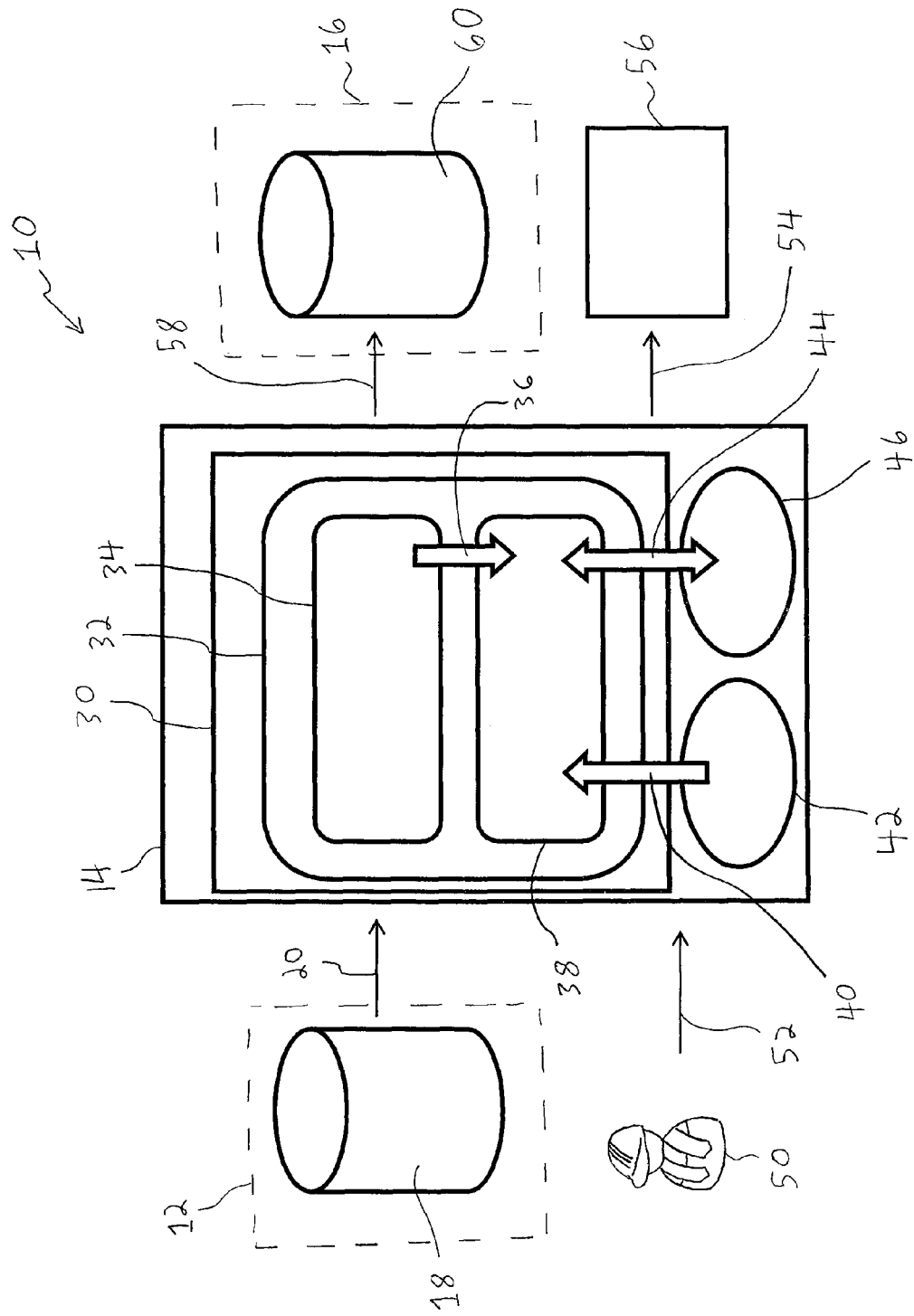
FIG. 1 is a flow diagram of a manufacturing system including a spider twister machine.

A manufacturing system is provided that generates less scrap, produces manufactured articles requiring less re-work, and produces manufactured articles faster and at a lower cost than previous systems. In one form, the manufacturing system is configured to perform successive iterations of twisting one or more lobes of a spider until all of the lobes have desired twist angles that are within tolerance. The manufacturing system has a control system that monitors the positions of the lobes and can control twisting of one or more of the lobes to bring the one or more lobes within tolerance before the spider is advanced to subsequent processing. In this manner, the manufacturing system ensures that the lobes of every spider produced are twisted within tolerance such that manual re-working of fan assemblies produced with the twisted spiders is minimized. Further, twisting one or more of the lobes of a spider in successive iterations until all of the lobes are within tolerance reduces twist angle variation between lobes of the spider and on a spider-to-spider basis throughout a production run. The resulting fan assemblies have less variation in balance, require less manual correction with counterweights, and result in fewer scrapped fan assemblies than previous approaches.

In one embodiment, the manufacturing system has lobe clamps and drive assemblies connected to the lobe clamps which pivot the lobe clamps. The manufacturing system has a control system configured to cause each of the drive assemblies to pivot the lobe clamps in a first direction toward initial target positions. In one approach, the initial target position of each lobe clamp is the amount of pivoting needed to twist the lobe secured to the lobe clamp to a twist angle approximate a desired twist angle of the lobe. The initial target position for each lobe clamp may be different than the initial target position of the other lobe clamps and may take into account how the pivoting of the other lobe clamps to their respective initial target positions and the twisting of the associated lobes will affect the lobe secured to the lobe clamp. Thus, the manufacturing system can apply a unique amount of twist to each lobe of the spider to compensate for the twisting of the other lobes, rather than blindly twisting all of the lobes to the same extent as in prior approaches.

Once the lobe clamps reach the initial target positions, the control system causes the drive assemblies to permit the lobe clamps to pivot in a second direction toward first free state positions. In one approach, the first free state position of each lobe clamp is the position where the associated lobe tends to return after twisting to the initial target position. The tendency of a lobe to return to a free state position after twisting, sometimes referred to as spring back, is typically different for each lobe. The control system is configured to compare the first free state positions of the lobe clamps to final target positions to check whether the lobe clamps are within acceptable tolerances of the final target positions. The control system is configured to determine corrective target positions for one or more lobe clamps in response to the one or more lobe clamps having first free state positions different than the final target positions. This permits the manufacturing system to evaluate each lobe of a spider independently and calculate corrective target positions for the one or more lobe clamps secured to the one or more lobes not within acceptable tolerances. Thus, the manufacturing system individually evaluates the position of each lobe after an initial twist and determines corrective twist amounts such that the manufacturing system can account for spring back and twist angle variation on a lobe-by-lobe basis.

In one form, the control system is configured to cause one or more of the drive assemblies to pivot one or more of the lobe clamps in the first direction or the second direction toward the corrective target positions. Pivoting the one or more lobe clamps imparts a corrective twist to the one or more lobes secured to the one or more lobe clamps to bring the one or more lobes closer to the respective desired final target positions. The corrective twist for a given lobe clamp may be in the first direction or in the second direction depending on whether the free state position of the lobe clamp is above or below the final target position of the lobe clamp. The control system is further configured to cause the drive assemblies to permit the one or more lobe clamps to pivot in the first direction or the second direction toward second free state positions in response to the control system determining that the one or more lobe clamps have pivoted to the corrective target positions. Once the one or more lobe clamps reach the second free state positions, the control system compares the second free state positions of the one or more lobe clamps to the final target positions.

As will be appreciated, the control system can continue iterations of calculating corrective target positions for one or more of the lobe clamps out of tolerance, pivoting the one or more lobe clamps toward corrective target positions, and comparing the positions of the lobe clamps to final target positions. This approach eventually brings all of the lobes of the spider within tolerance and, in many applications, brings all of the lobes of the spider within tolerance in three or fewer iterations of the process. Further, the control system monitors the lobe clamps not being pivoted to ensure that they remain within tolerance of their respective final target positions during corrective pivoting of the one or more lobe clamps outside of tolerance. However, if the lobe clamps not being pivoted are drawn out of tolerance, the control system may calculate corrective target positions for the lobe clamps and cause the associated drive assemblies to pivot the lobe clamps during the next iteration of corrections to the lobe clamps. Thus, rather than twist lobes of a spider according to how far a previous spider was out of tolerance, as in the traditional press machine, the manufacturing system twists each of the lobes of the spider until they are all within tolerance. Once all of the lobes have been twisted to the desired final target positions, the twisted spider is advanced to a subsequent stage of the manufacturing process where fan blades are connected to the twisted spider.

A method of twisting a spider using a machine is also provided that does not require scrapping spiders in order to bring the machine within tolerance. Instead, the method includes twisting lobes of a spider in a first direction toward initial target positions using the machine and permitting the lobes to twist in a second direction toward first free state positions in response to the lobes reaching the initial target positions. The machine remains secured to the lobes as they twist toward the first free state positions which accelerates the operation of the machine since the process of releasing the spider from the machine is performed after the spider has been twisted to within tolerance. If the first free state positions of all of the lobes are within tolerance of their respective final target position, such as a desired twist angle, the twisted spider is complete. If, however, one or more of the lobes have free state positions different than their respective final target positions, the method further includes twisting the one or more lobes in the first direction or the second direction toward first corrective target positions using the machine.

The first corrective target position of each lobe may be different, and is calculated to bring the respective lobe closer to the final target position. Iterations of the corrective twisting of one or more lobes are performed to individually bring each of the lobes to within the desired tolerance of its final target position. If the machine is used to determine the free state positions of the spider lobes, keeping the machine secured to the lobes during twisting decreases variation in measurements that may be generated by securing and unsecuring the machine to the spider throughout a twisting operation. In one form, the method further includes restricting movement of the lobes that were within tolerance of their final target positions after the initial twist while twisting the remaining one or more lobes toward their first corrective target positions. This tends to prevent the lobes that were within tolerance from being drawn out of tolerance and reduce variations in measuring the free state positions of all of the spider lobes after twisting the one or more spider lobes toward their first corrective target positions.

In another respect, a method of twisting a spider using a machine is provided that overcomes variations in spider lobe free state positions which result from variation in spider material and variation in the alignment of spiders in the machine throughout a production run. The method overcomes these variations by twisting the lobes of each spider in a first direction toward initial target positions using the machine and permitting the lobes to twist in a second direction toward first free state positions in response to the lobes reaching initial target positions. Further, the method comprises measuring the free state position of each of the lobes using sensors of the machine and determining first corrective target positions for one or more of the lobes in response to the one or more lobes having free state positions different than final target positions of the lobes. The first corrective target position for each lobe is determined based on the first free state position of that particular lobe, such that the method may compensate for any variation in free state position due to variation in spider material or alignment of the spider being twisted. In one approach, determining first corrective target positions for one or more lobes includes using a processor to calculate the first corrective target positions using the initial target positions, the final target positions, and the first free state positions of the one or more lobes. This permits the machine to provide real-time, individualized corrective twisting for each lobe of a spider being twisted by the machine.

In one aspect, a spider lobe clamp apparatus is provided that has first and second jaws configured to clamp a spider lobe during twisting more securely than prior approaches and significantly reduce the amount of twist angle variation attributable to sliding of the lobe during twisting. The spider lobe clamp apparatus has a jaw lock mechanism for fixing the position of the first jaw and a pair of cooperating portions of the jaw lock with an unlocked configuration where the cooperating portions are spaced apart from each other which permits the first jaw to move between open and closed positions. The cooperating portions of the jaw lock mechanism also have a locked configuration adjacent each other that fixes the first jaw in the closed configuration. When the first jaw is in the closed position, forces applied to the first jaw during a twisting operation press the cooperating portions more tightly against one another such that there is substantially no movement of the first jaw away from the closed position. The jaw lock mechanism may comprise an over-center lock configured to have a stable configuration when the first jaw is in the closed position and the jaw lock mechanism is in the locked configuration. In this manner, the jaw lock mechanism remains rigidly secured in the locked configuration until the over-center lock is shifted away from the stable configuration, such as by an actuator of the spider lobe clamp apparatus.

In one form, one of the cooperating portions of the jaw lock mechanism includes a pivot arm and rigid stop, the pivot arm being pivotal between an unlocked position where the pivot arm is spaced from the stop and a locked position where the pivot arm is adjacent the rigid stop. Any forces that act to move the first jaw away from the closed position more tightly press the pivot arm against the rigid stop, which rigidly fixes the jaw lock mechanism in the locked configuration. By contrast, U.S. Pat. No. 2,611,414 to Sampatacos discloses using hydraulic pressure to force a piston inward and engage a cam face of the piston with a roller connected to a lever of an upper jaw. The rigid engagement of the pivot arm against the stop of the jaw lock mechanism disclosed herein provides a more rigid lock than relying upon hydraulic pressure to maintain the position of a hydraulic piston, as disclosed by the '414 patent.

The second jaw of the spider lobe clamp apparatus may includes a lobe pad and a shift device configured to move the lobe pad to a raised position with the pivot arm and the stop of the jaw lock mechanism in the locked configuration adjacent one another. A spider lobe may be disposed between the lobe pad and the first jaw, such that shifting the lobe pad to the raised position applies a compressive force against the lobe and clamps the lobe between the lobe pad and the first jaw. Further, shifting the lobe pad to the raised position more tightly presses the pivot arm of the jaw lock mechanism against the rigid stop and more tightly fixes the jaw lock mechanism in the locked configuration. The rigid engagement between the pivot arm and the rigid stop of the jaw lock mechanism permits the shift device to apply up to three tons of clamping force to the spider lobe held between the first and second jaws without the first jaw moving away from the closed position.

Turning to the figures, a manufacturing system 10 having an enterprise resource planning system 12, a spider twister machine 14, and a quality management system 16 is shown in FIG. 1. The enterprise resource planning system 12 receives shop orders for twisted spiders, fan assemblies, and/or other parts and stores information regarding the orders in a database 18. The enterprise resource planning system 12 provides shop order and routing information 20 for shop orders involving twisted spiders to the spider twister machine 14. The shop order and routing information 20 may include a shop order number, a finished good part number, desired twist angles of the lobes of the spider, twist angle tolerance, rotation direction of the fan assembly with which the twisted spider is to be used, hub nest height and lobe clamp force. The shop order and routing information 20 provided to the spider twister machine 14 provides the spider twister machine 14 with information used to set up the machine 14 and produce finished twisted spiders according to the shop order.

The spider twister machine 14 includes a computer 30 that executes a twister application 32 and controls the spider twister machine 14. In some instances, the spider twister machine 14 may be located on-site and one or more of the components of the manufacturing system 10 will be located off-site, such as a remote, central computer hosting the twister application 32. In approach, a programmable logic controller or a programmable automation controller may be used rather than a computer 30.

The twister application 32 has a database query component 34 that retrieves information from the database 18, including twist angle, twist angle tolerance, rotation direction, hub nest height, and lobe clamp force for a particular shop order. The database query component 34 communicates 36 with a machine control component 38. The machine control component 38 communicates 40 with sensors 42 that provide information regarding the operation of the spider twister machine 14. The machine control component 38 also communicates 44 with actuators 46 that produce movement of the spider twister machine 14. In this manner, the machine control component 38 can measure data from the sensors 42, control operation of the actuators 46, and perform data analysis on data received from the operation of the spider twister machine 14, as well as data from the enterprise resource planning system 12.

In one approach, the spider twister machine 14 uses the database query component 34 to retrieve shop order and routing information 20 from the enterprise resource planning system 12 and automatically groups shop orders by tooling requirements to minimize tool changes. The shop orders may be sequenced by first in first out, or may be sorted by quantity, due date, or any other parameter for which there is a field in the enterprise resource planning system 12. Although the manufacturing system 10 is particularly well-suited for efficiently organizing shop orders into production runs, an operator 50 may interrupt a production run to make a single twisted spider by inputting 52 appropriate commands into the spider twister machine 14 and making the appropriate tooling change, if necessary. The spider twister machine 14 will then suspend the production run and make the one or more twisted spiders as requested by the operator 50 before returning to the production run.

To twist a spider using the machine 14, the operator 50 provides input 52 including selecting a shop order from an interface with the application 32, changing the tooling if needed, and loading a spider into the spider twister machine 14. The spider twister machine 14 twists the spider using the shop order and routing information 20 and outputs 54 a twisted spider 56. The spider twister machine 14 also outputs 58 process measurements to the quality management system 16. The process measurements may include twist angle measurements, cycle duration, date and time of twisting operation, and other information to a database 60 of the quality management system 16.

Figure 2:
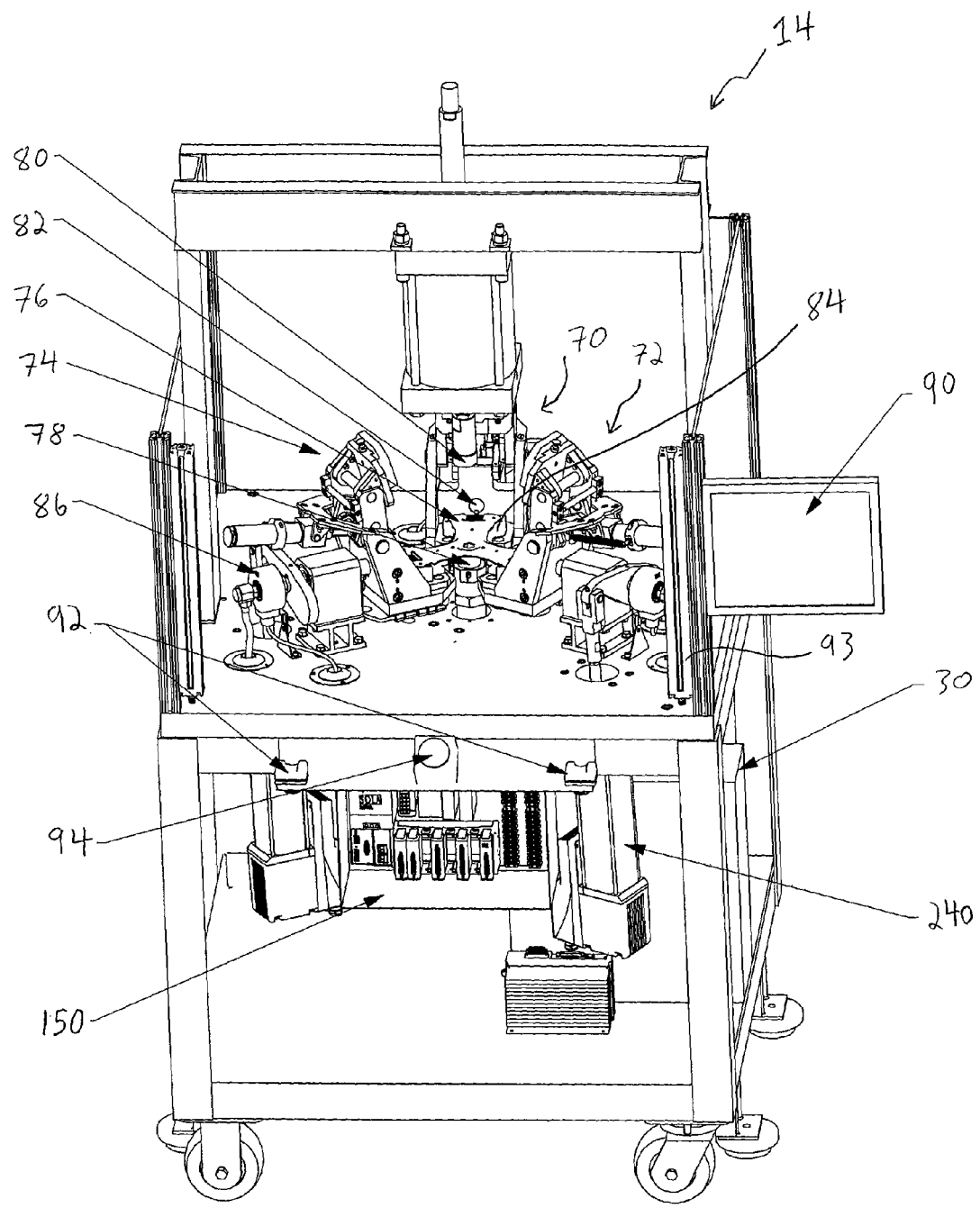
FIG. 2 is a front perspective view of an embodiment of the spider twister machine of FIG. 1.

As shown in FIG. 2, the spider twister machine 14 has three lobe clamp assemblies 70, 72, 74 each configured to grip and twist a lobe of a spider 76 to a final target position, such as a position where the lobes have a desired twist angle. In one form, the lobe clamp assemblies 70, 72, 74 are identical assemblies each independently controlled by the computer 30 and each capable of imparting a unique twist angle to an associated lobe of the spider 76. The spider twister machine 14 has a vertically adjustable stop or hub nest 78 for supporting a central portion of the spider 76 and a spider hold down 80 that shifts downward and clamps the central portion of the spider 76 between the spider hold down 80 and the hub nest 78. As will be discussed in greater detail below, the spider twister machine 14 aligns an upper surface of the spider 76 with pivot axes of the lobe clamp assemblies 70, 72, 74 to increase the consistency of twisting operations for spiders of varying thicknesses. For thicker spiders, the spider twister machine 14 may shift the hub nest 78 downward which, in combination with corresponding pitch or lobe pads of the lobe clamp assemblies 70, 72, 74, accommodates the thickness of the spider and aligns the upper surface of the spider 76 with the pivot axes of the lobe clamp assemblies 70, 72, 74. The shop order and routing information 20 from the enterprise resource planning system 12 may include information regarding the appropriate height of the hub nest 78 for each shop order.

With reference to lobe clamp assembly 70, the spider twister machine 14 selectively pivots a drive shaft 82 rigidly connected to a lobe clamp 84 of the lobe clamp assembly 70 to pivot the lobe clamp 84 and an impart a twist angle to a spider lobe secured to the lobe clamp 84, as will be discussed in greater detail below. In one approach, the spider twister machine 14 monitors the position of the spider lobes by monitoring the movement of the lobe clamp assemblies 70, 72, 74. For example, the lobe clamp assembly 70 includes an absolute rotary encoder 86 (similar to the absolute rotary encoder 86 shown on lobe clamp assembly 74) for measuring the angular position of the drive shaft 82. In this manner, the spider twister machine 14 may determine the position of the associated lobe of the spider 76 via the position of the drive shaft 82.

The operator 50 generally interacts with the spider twister machine 14 using a graphical user interface of the twister application 32 displayed on a monitor 90. The monitor 90 is preferably a touch screen, with the operator 50 selecting shop orders using on-screen buttons, pull-down menus, tables and the like. Once the operator 50 has selected a shop order using the monitor 90, he loads a spider into the spider twister machine 14, as shown by spider 76 in FIG. 2. The operator 50 then places one hand on each of a pair of touch buttons 92 before the spider twister machine 14 begins twisting the spider 76. Once the cycle starts, the operator 50 will be able to remove his hands from the buttons 92, although the spider twister machine 14 may stop the machine 14 if a light curtain 93 detects movement of an object into the machine 14.

The lobe clamp assemblies 70, 72, 74 have actuators 100 that open and close the lobe clamps 84, 160, 162 (see FIGS. 4, 7, 8) about lobes of a spider and locking mechanisms 102 (see FIGS. 30 and 31) which secure the lobe clamps 84, 160, 162 to the lobes of the spider. The spider twister machine 14 has a two-position solenoid valve 107 (see FIG. 4) that controls the flow of shop air 130 to shift the actuators 100 between retracted and extended configurations and shift the lobe clamps 84, 160, 162 between open and closed configurations. Each locking mechanism 102 includes hydraulic pistons 104 that shift a lower clamp plate 106 and a lower lobe pad 108 connected thereto upwardly against an upper lobe pad 110 to clamp a lobe of the spider 76 (not shown in FIGS. 30 and 31) therebetween or downwardly to release the lobe from between the lower and upper lobe pads 108, 110. As will be discussed in greater detail below, the locking mechanism 102 may secure the lobe clamp 84 to a lobe with approximately three tons of force.

Returning to FIGS. 2-4, the spider twister machine 14 controls the locking assemblies 102 by controlling a hydraulic system 123 and regulating hydraulic fluid flow to the hydraulic cylinders 105. More specifically, to secure the lobe clamps 84, 160, 162 to the lobes of the spider 76 after the lobe clamps 84, 160, 162 have closed, the computer 30 communicates with an electronics enclosure 150 to cause a hydraulic dump valve 120 to close and to activate a hydraulic pump 122. As discussed in greater detail below, the electronics enclosure 150 houses devices for handling analog and digital signals that allow the computer 30, and the application 32, to communicate in real time with the sensors 42 and the actuators 46 of the spider twister machine 14 (see FIG. 1). The hydraulic pump 122 pumps hydraulic fluid from a reservoir 124 into hydraulic lines that feed the hydraulic cylinders 105. The computer 30 monitors pressure within the hydraulic system using an electronic proportional regulator 126 and stops the hydraulic pump 122 once a desired lobe clamp force has been achieved. The spider twister machine 14 keeps the hydraulic dump valve 120 closed to maintain pressure within the hydraulic system 123 and fix the hydraulic pistons 104 in the raised position, as shown in FIG. 31. This keeps the locking mechanisms 102 locked and the lobe clamps 84, 160, 162 secured with the lobes of the spider 76 during twisting. After the machine 14 has twisted the spider 76, the computer 30 causes the hydraulic dump valve 120 to open and permit hydraulic fluid to enter the reservoir 124. This decreases the pressure within the hydraulic system 123 which, in turn, causes the hydraulic pistons 104 to shift the lower clamp pad 106 downwardly and unlock the locking mechanism 102. At this point, the spider twister machine 14 causes the pneumatic actuators 100 to open the lobe clamps 84, 160, 162 so that the operator 50 can remove the now-twisted spider 76.

Figure 4:
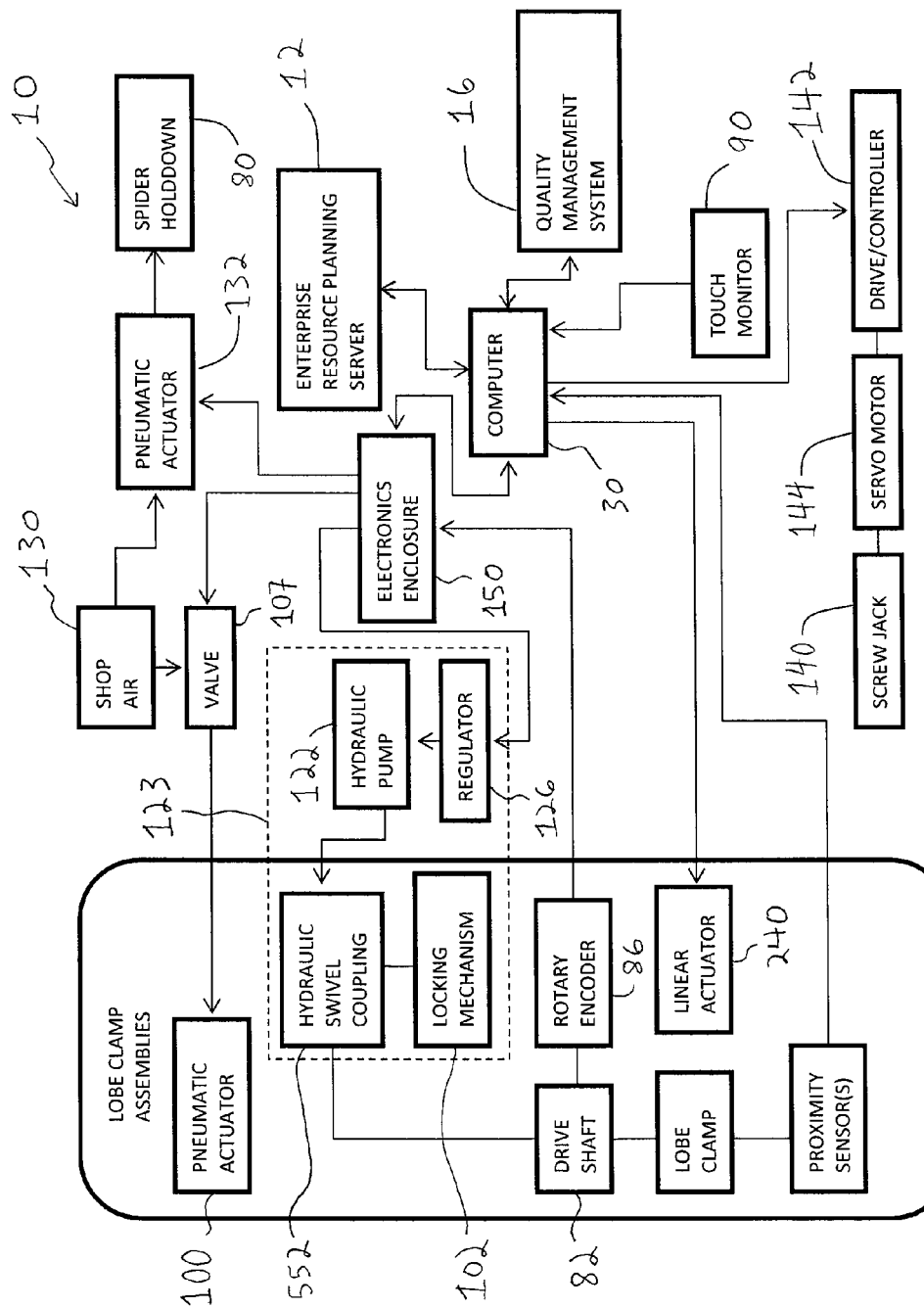
FIG. 4 is a block diagram of the spider twister machine of FIG. 2.
Figure 5:
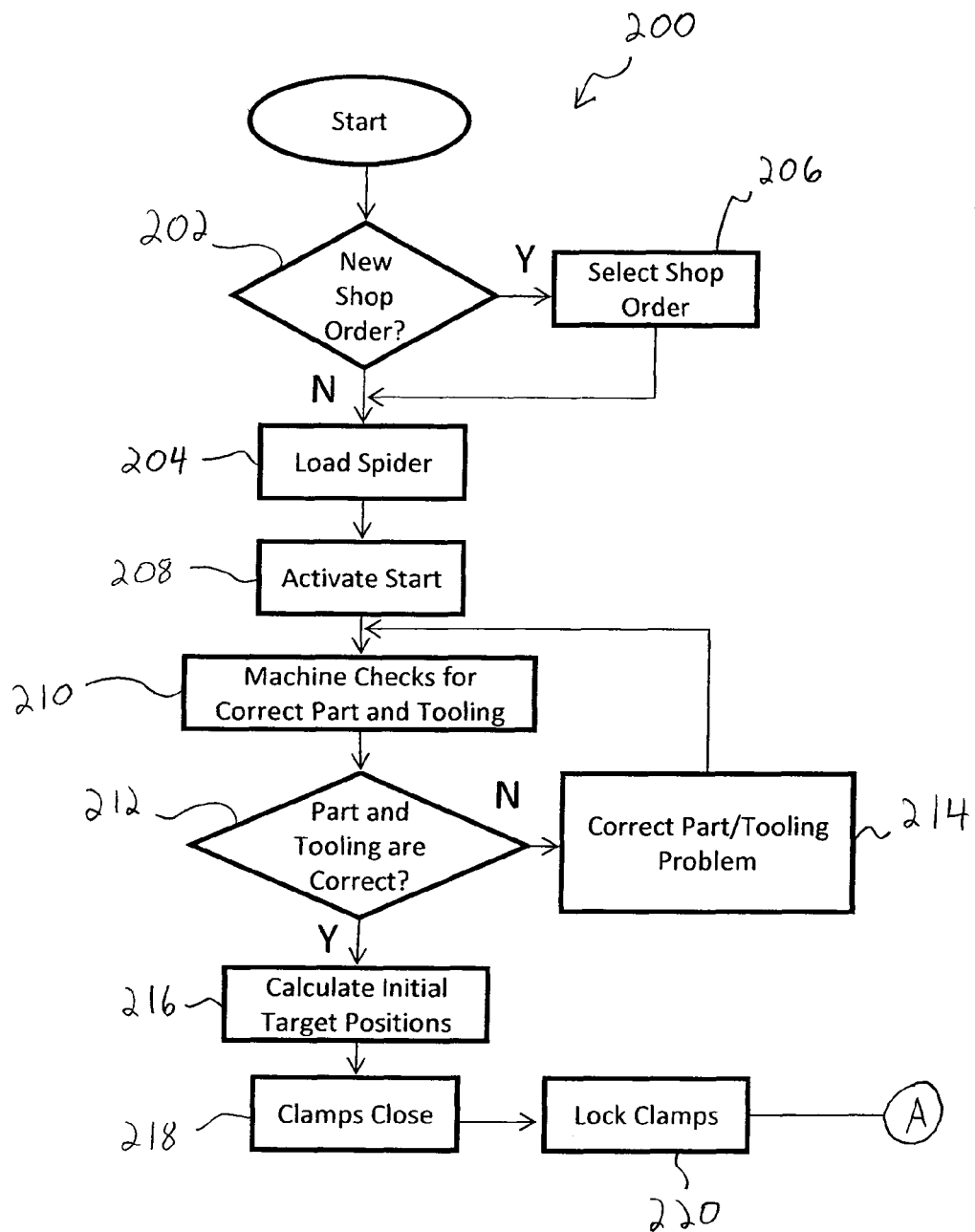
FIGS. 5 and 6 are flow diagrams of a method of twisting a spider using the spider twister machine of FIG. 2.

The spider twister machine 14 uses a pneumatic solenoid valve to control operation of the spider hold down 80, although a hydraulic piston or electric drive may also be used. In the illustrated form, the computer 30 communicates with the electronics enclosure 150 to regulate shop air 130 and control a solenoid valve connected to a pneumatic actuator 132, which adjusts the position of the spider hold down 80, as shown in FIG. 4. Like the pressure applied by the hydraulic pistons 104, the computer 30 uses data from the pneumatic actuator 132 to calculate the force the spider hold down 80 is applying to the spider 76.

Figure 3:
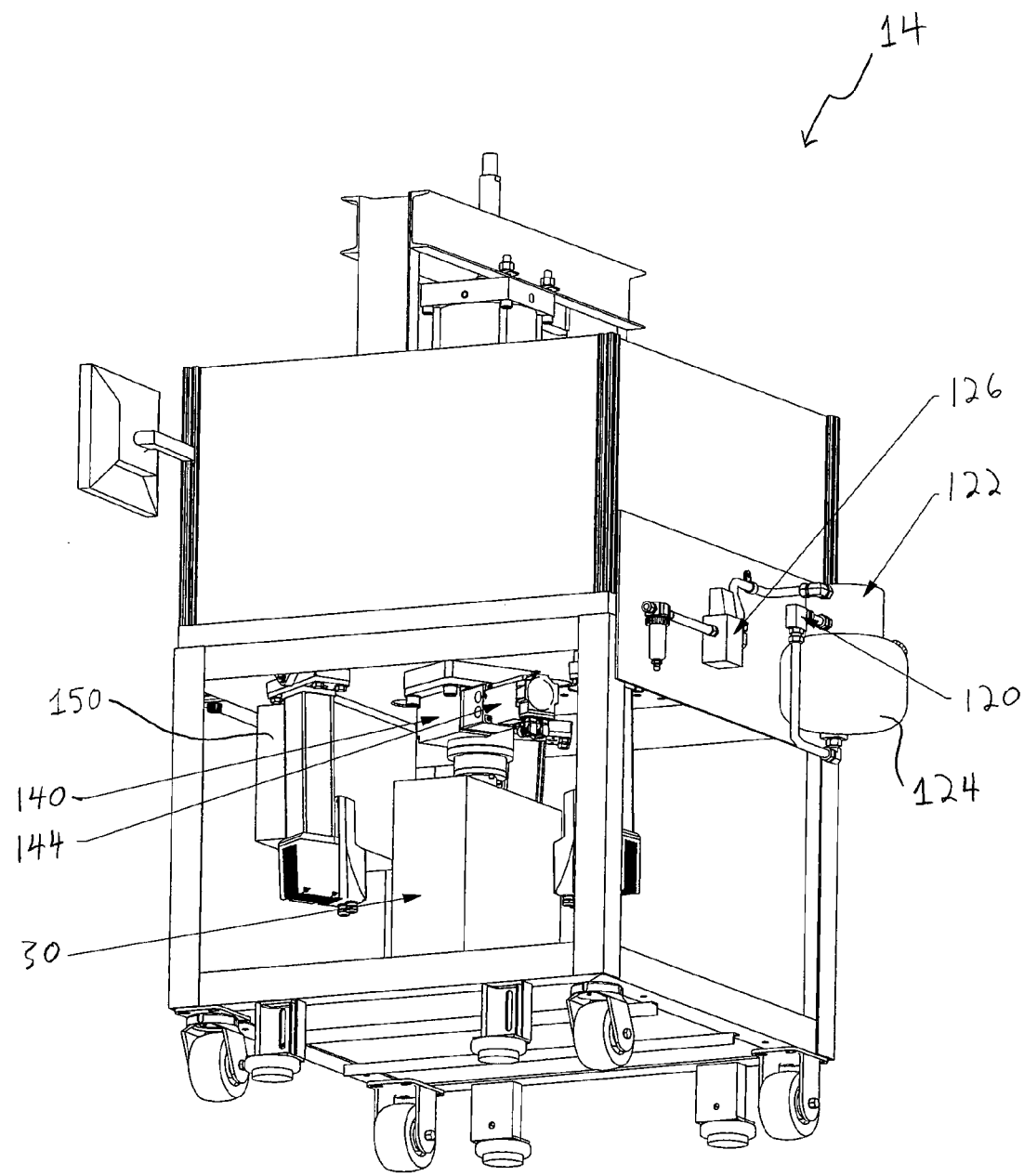
FIG. 3 is a side perspective view of the spider twister machine of FIG. 2.

Opposite the spider hold down 80, the hub nest 78 is connected to a screw jack 140, as shown in FIGS. 2-4. The computer 30 sends hub nest height commands to a drive controller 142 that drives a servo motor 144 which, in turn, adjusts the screw jack 140. When the spider 76 is initially loaded into the spider twister machine 14 and positioned on the hub nest 78, the height of the hub nest 78 controls the vertical positioning of the spider 76 within the machine 14. Once the twisting operation begins, the spider hold down 80 clamps a center portion of the spider 76 against the hub nest 78, the lobe clamps 84, 160, 162 close, and the lower lobe pads 108 of the lobe clamp assemblies 70, 72, 74 shift upward and clamp the spider lobes against the upper lobe pads 110. To impart an axial bias to the spider 76, the vertical position of the hub nest 78 may be vertically offset from position of the lobe clamps 84, 160, 162. Further, the shop order and routing information 20 from the enterprise resource planning system 12 may include information regarding both the hold down force and the hub nest height for each shop order.

Figure 6:
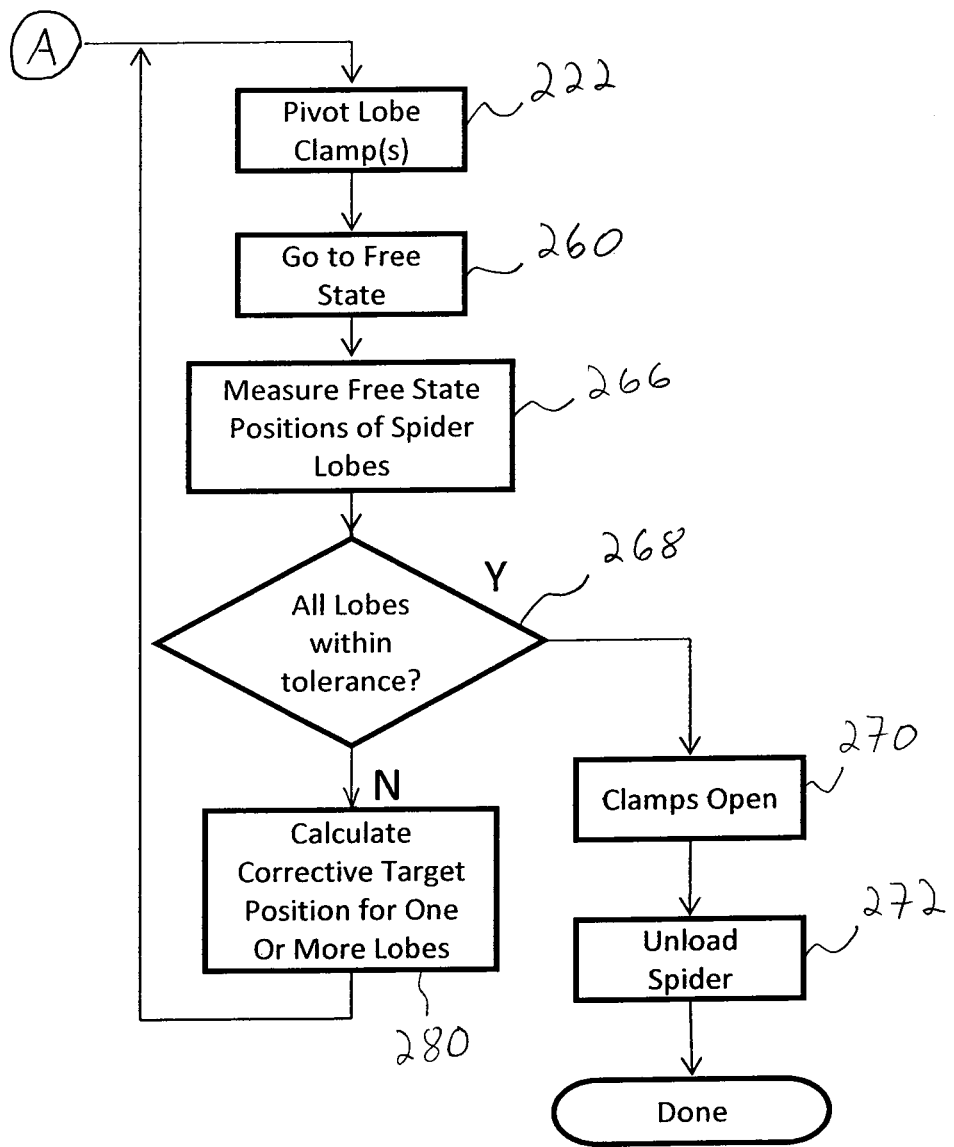
Figure 7:
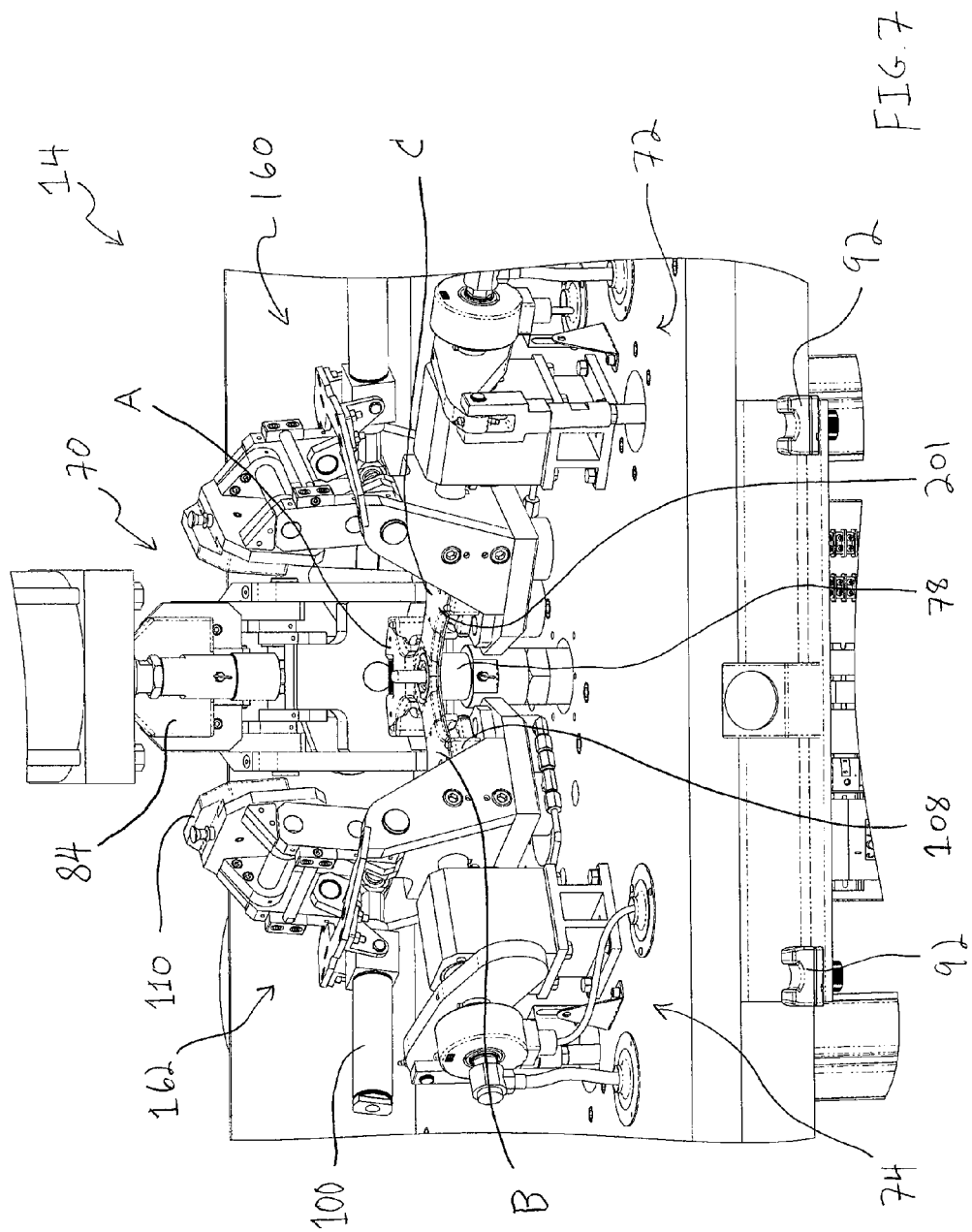
FIGS. 7-13 are enlarged perspective views of the spider twister machine of FIG. 2 illustrating a process of twisting a spider using the spider twister machine.

Turning now to FIGS. 5-13, a process 200 of twisting a spider 201 is shown. If the spider is from an existing shop order at step 202, the operator 50 loads 204 a spider 201 into the spider twister machine 14, as shown in FIG. 7. If the spider is for a new shop order, the operator 50 selects the shop order at step 206 using the monitor 90 before loading 204 the spider 201 into the spider twister machine 14. The operator then activates 208 the machine 14 by touching buttons 92 on the front of the machine 14.

At step 210, the spider twister machine 14 checks whether the spider 201 loaded into the machine 14 matches the shop order. The machine 14 also checks whether the tooling of the machine 14 matches the shop order, which can include checking whether the lobe pads 108, 110 match the lobes of the spider 201 as specified in the shop order. Checking the tooling at step 210 may also include verifying that the hub nest 78 matches the hub or central portion of the spider 201 as specified by the shop order. If the part and/or tooling are not correct at step 212, the spider twister machine displays an appropriate error message on the monitor 90 and instructs the operator 50 to load the proper spider 201, lobe pads 108, 110, hub nest 78, and/or other tooling at step 214. If the parts and tooling are correct at step 212, the machine 14 may complete the remainder of the process 200 in a fully automated fashion without further interaction with the operator 50.

Next, the computer 30 running the twister application 32 calculates 216 initial target positions for each of the lobes of the spider 201. In one approach, the initial target position is determined by calculating an initial twist angle for each lobe of the spider 201. The initial twist angle for each lobe of the spider 201 is a function of the desired final target position of each lobe, such as a final twist angle of each lobe or a height of the lobe after twisting. As one example, a polynomial regression analysis was performed on spider twist data from twisting a series of three-lobe spiders. The polynomial regression analysis was performed to determine mathematical equations for calculating an initial twist angle for each lobe based on a desired final twist angle for that lobe. The spider twist data was obtained by using the spider twister machine 14 to impart an identical initial twist to each of the lobes of a first spider, and the free state angle of the lobes after the initial twist was measured. The first twisted spider was removed from the spider twister machine 14, and a second spider was twisted to a different initial twist angle. The free state angle of the lobes of the second spider after the initial twist were measured. This process was repeated for eighty-one spiders to obtain a sufficiently large data set. The resulting data set, with twist angle in degrees, resembled the following:

| Spider | Initial Twist Angle | Free State Angle (Lobe 1) | Free State Angle (Lobe 2) | Free State Angle (Lobe 3) |
|---|---|---|---|---|
| 1 | 15 | 10 | 11 | 10.5 |
| 2 | 20 | 15 | 14.5 | 14 |
| 3 | ... | ... | ... | ... |

As shown in the above table, each lobe of the spider 201 may have a different free state angle even after an identical initial twist. The differences in free state angles despite identical initial twist angles are attributable to the bending moments created during twisting of each lobe. Specifically, twisting one of the lobes creates bending moments on the other lobes which affects their twist angles, while simultaneously twisting the other lobes creates bending moments on the one lobe which affects the twist angle of the one lobe.

The regression analysis produced equations in the following form that the computer 30 may use to calculate the initial twist angle for each lobe of a three-lobe spider, where subscript i is the lobe number and the DesiredAngle is the desired final twist angle of the lobe measured in degrees:

$$\text{InitialTwistAngle}_i = Fn_i(\text{DesiredAngle}_i)$$

The lobe numbers generally correspond to the orientation of the spider 201 when loaded into the spider twister machine 14. Specifically, the lobe of the spider 201 farthest from the operator 50 as he loads the spider 201 into the machine 14 is lobe number 1 (see lobe A, FIG. 7). The lobe of the spider 201 disposed to the left of the operator 50 is lobe number 2 (see lobe B, FIG. 7) and the lobe of the spider 201 disposed to the right of the operator 50 is lobe number 3 (see lobe C, FIG. 7).

For the data set obtained from the eighty-one twisting operations, the regression analysis produced the following equations, where subscripts indicate lobe number:

$$InitialTwistAngle_1 = \frac{-0.7186 + ((0.7186)^2 - 4*(0.006545*(-4.134 - DesiredAngle_1)))^{0.5}}{2*0.006545}$$

$$InitialTwistAngle_2 = \frac{-0.8298 + ((0.8298)^2 - 4*(0.005332*(-6.707 - DesiredAngle_2)))^{0.5}}{2*0.005332}$$

$$InitialTwistAngle3 = \frac{-1.005 + ((1.005)^2 - 4*(0.001688*(-7.999 - DesiredAngle_3)))^{0.5}}{2*0.001688}$$

To determine how far to initially twist each lobe, the computer 30 inputs the desired final twist angles for all of the lobes into the equations. In many instances, the desired final twist angle will be identical for all of the lobes of a spider. The computer 30 then solves the equations to obtain an initial twist angle for each lobe.

Figure 8:
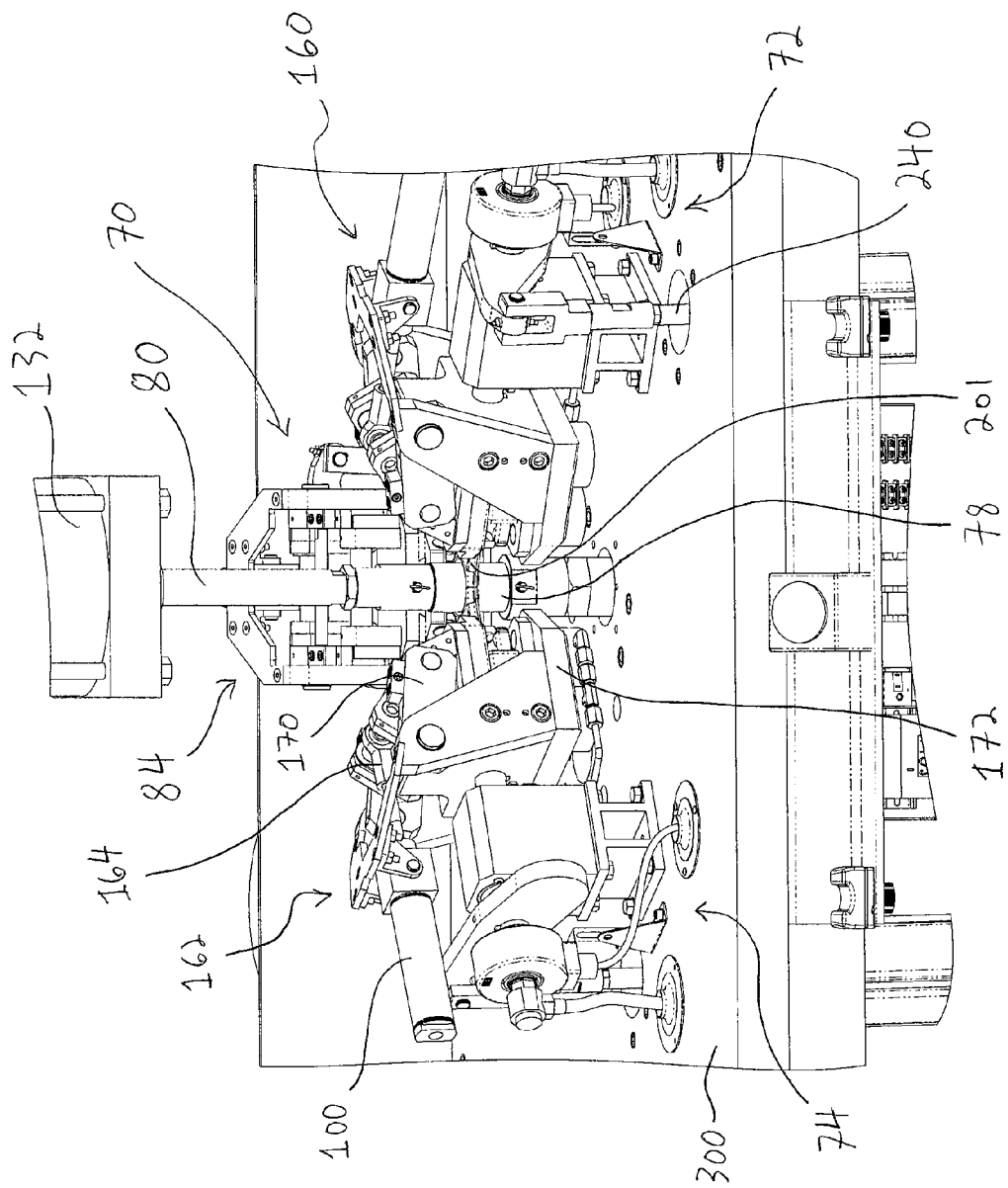

With the spider 201 loaded in the spider twister machine 14, as shown in FIG. 7, the computer 30 communicates with the electronics enclosure 150 and causes the lobe clamps 84, 160, 162 of the lobe clamp assemblies 70, 72, 74 to close at step 218, as shown in FIG. 8. The spider twister machine 14 closes the lobe clamps 84, 160, 162 by extending shafts 164 of the linear actuators 100 inward to swing an upper jaw 170 toward a lower jaw 172 of each lobe clamp 84, 160, 162. This shifts a jaw lock mechanism 442 (see FIG. 25) of each lobe clamp 84, 160, 162 to a locked configuration that locks the upper jaw 170 in closed position adjacent the lower jaw 172, as will be discussed in greater detail below. The computer 30 also communicates with the electronics enclosure 150 and actuates pneumatic actuator 132 to shift the spider hold down 80 downward onto the center portion of the spider 201 and clamp the spider portion 201 against the hub nest 78, as shown in FIG. 8.

Figure 9:
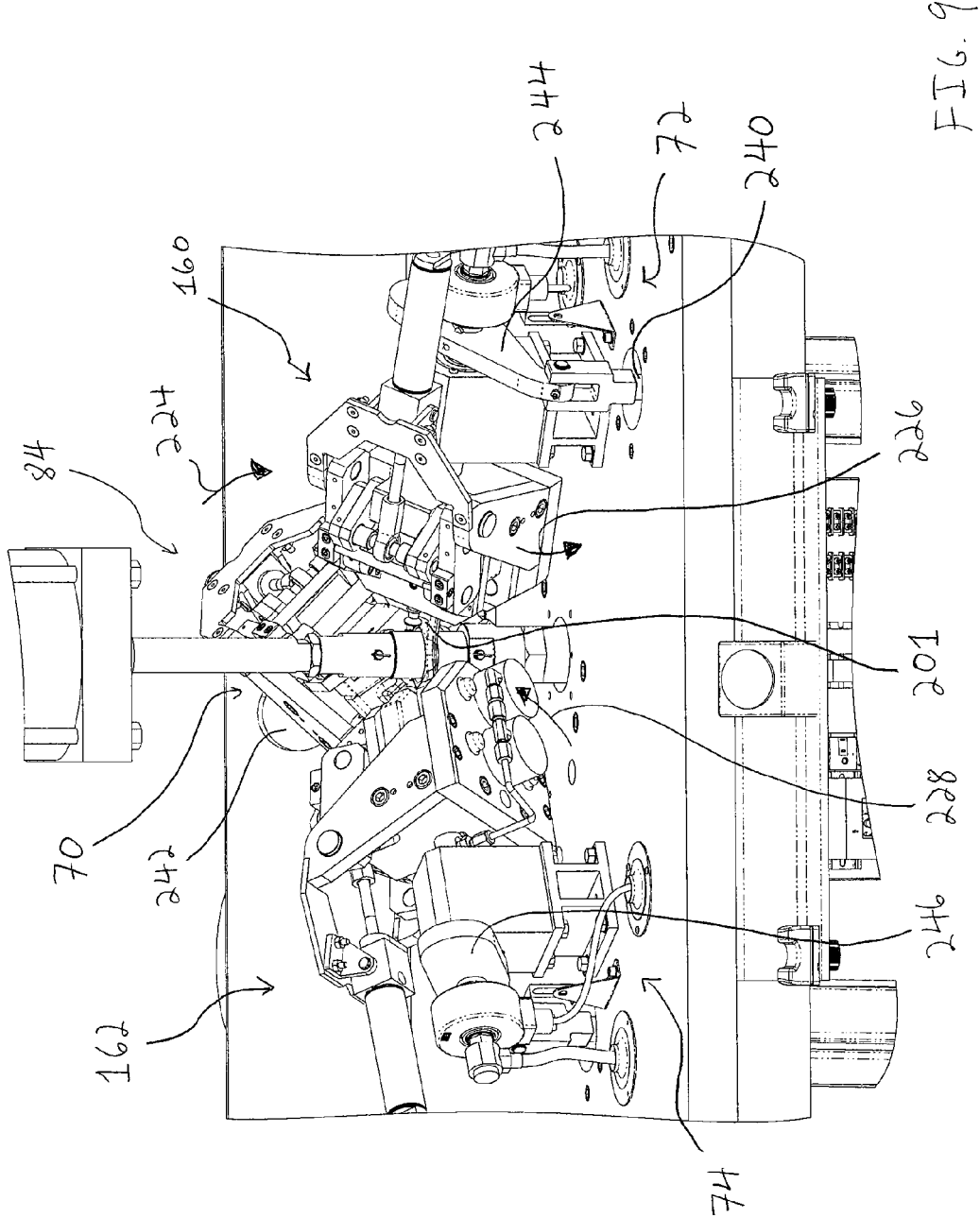

At step 220, the computer 30 communicates with the electronics enclosure 150 and activates the locking mechanisms 102 to lock the lobe clamps 84, 160, 162 and secure the lobe clamps 84, 160, 162 to the lobes of the spider 201. With the spider hold down 80 clamping the central portion of the spider 201 against the hub nest 78 and the lobe clamps 84, 160, 162 secured to the lobes of the spider 201, as shown in FIG. 8, the spider twister machine 14 performs an initial twist (see FIG. 6) at step 222 by pivoting the lobe clamps 84, 160, 162 in directions 224, 226, 228 toward respective initial target positions calculated at step 216, as shown in FIG. 9. More specifically, the computer 30 causes drive assemblies which include electrical-mechanical linear actuators 240 (see FIG. 2) of each of the lobe clamp assemblies 70, 72, 74 to pull crank arms 242, 244, 246 downward, as shown in FIG. 9. The crank arms 242, 244, 246 are rigidly connected to the lobe clamps 84, 160, 162 via respective drive shafts 82, such that the downward movement of the linear actuators 240 causes the drive shafts 82 to pivot about respective pivot axes.

Figure 10:
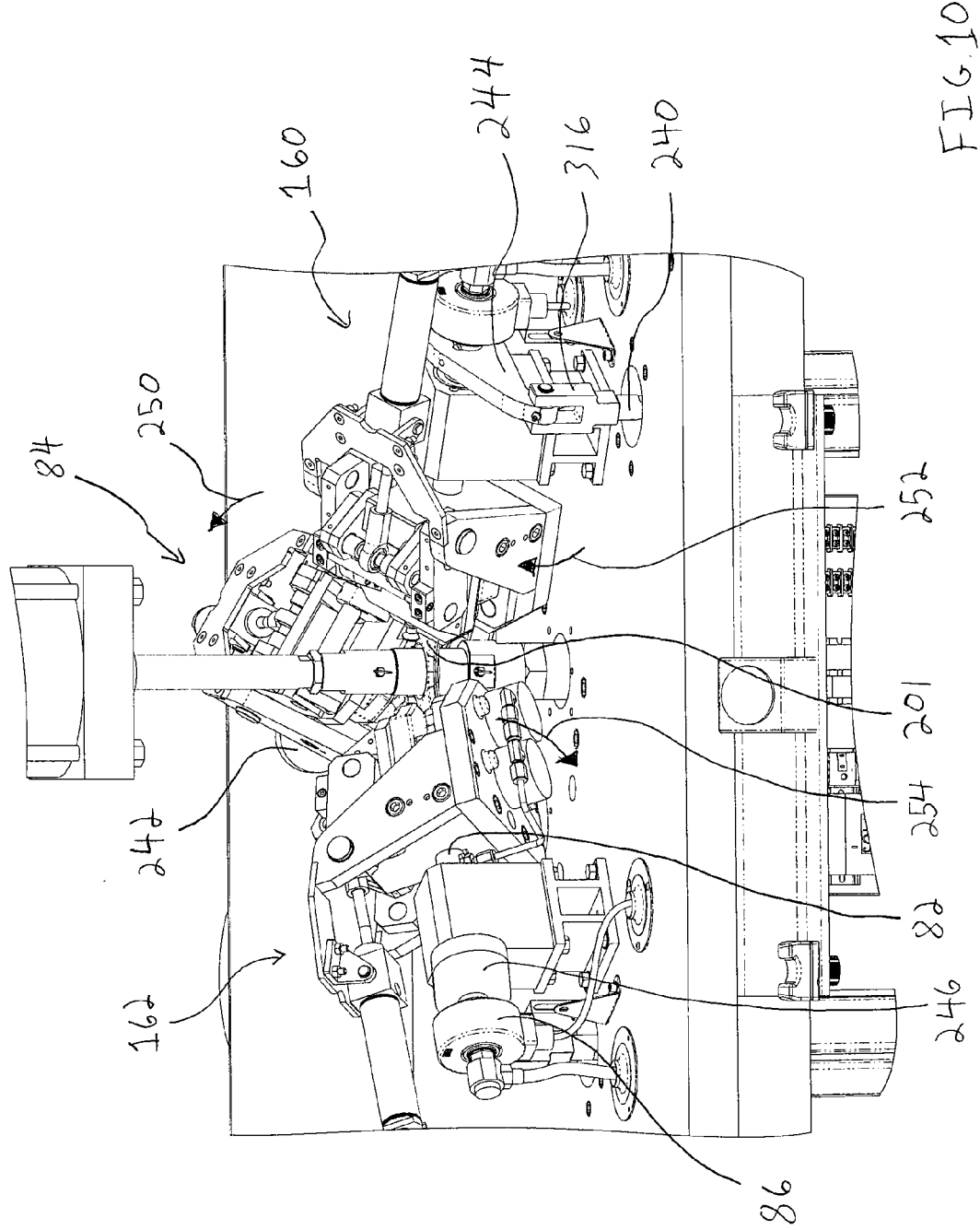

Once the lobe clamps 84, 160, 162 have reached the initial target positions, shown in FIG. 9, the computer 30 causes the linear actuators 240 to permit the crank arms 242, 244, 246 to pivot in directions 250, 252, 254 back toward free state positions at step 260, as shown in FIG. 10. The spider 201 may be made of stamped steel, which undergoes both plastic and elastic deformation during the pivoting of the lobe clamps 84, 160, 162 toward the initial target positions at step 222. Due to the partially elastic properties of the spider 201, the lobes of spider 201 tend to partially spring back toward their undeformed state after the lobes have been twisted to the initial target positions at step 222. Specifically, the lobes of the spider 201 each exert a torque on the respective lobe clamp 84, 160, 162 that tends to rotate the lobe clamps 84, 160, 162 in directions 250, 252, 254, as shown in FIG. 10. When the computer 30 causes the linear actuators 240 to permit the crank arms 242, 244, 246 to pivot at step 260, the linear actuators 240 may provide controlled pivoting of the crank arms 242, 244, 246 so that the torque exerted on the lobe clamps 84, 160, 162 by the spider 201 does not freely pivot the lobe clamps 84, 160, 162 away from the initial target positions. Instead, the linear actuators shift devises 316 (see FIG. 10) connected to the crank arms 242, 244, 246 upward at a controlled rate that permits the torque from the lobes to gradually pivot the lobe clamps 84, 160, 162 in directions 250, 252, 254.

Once the lobe clamps 84, 160, 162 reach free state positions, each lobe of the spider has a position that reflects the plastic deformation imparted to the lobe during the pivoting of the lobe clamps 84, 160, 162 to the initial target positions at step 222. At the free state positions, the lobes of the spider 201 exert substantially no torque on the lobe clamps 84, 160, 162 due to the lobes no longer being elastically deformed. In one approach, the spider twister machine 14 uses this absence of torque to determine when each of the lobes has reached a respective free state position. To this end, the lobe clamp assemblies 70, 72, 74 each have a free state position sensor assembly 262 (see FIG. 14) for detecting when the associated lobe clamp reaches a free state position, as will be discussed in greater detail below.

At step 266 in method 200 (see FIG. 6), the computer 30 measures the positions of the lobes of the spider 201 once the lobes have reached the free state positions, as shown in FIG. 10. In the illustrated approach, the computer 30 receives data from rotary absolute encoders 86 connected to drive shafts 82 of the lobe clamps 84, 160, 162. The drive shafts 82 are rigidly connected to the lobe clamps 84, 160, 162, which allow the computer 30 to measure the pivoting of the lobe clamps 84, 160, 162 by measuring pivoting of the drive shafts 82. In an alternative approaches, rotary incremental encoders, linear displacement gauges such as lasers, linear encoders, or linear variable differential transformers may be used to measure the positions of the lobes of the spider 201. Alternatively, a rotary displacement gauge may be used to measure the positions of the lobes of the spider 201. For example, the spider twister machine 14 may be modified to utilize rotary servo motors or actuators to pivot the lobe clamps 82, 160, 162, and the rotary servo motors or actuators may have integral rotary encoders. Another alternative approach is a rotary or angular displacement gauge attached directly to each lobe of the spider. The gauge may be placed onto the associated lobe after the lobe clamps 82, 160, 162 have secured the lobes such that the gauge can directly detect deformation of the lobe as the spider is being twisted. Still further alternative approaches may utilize rotary variable differential transformers to measure the positions of the lobes of the spider 201.

At step 268 in method 200, the computer 30 checks whether all of the lobes of the spider 201 are within tolerance of respective final target positions using measurements from step 266. If the free state positions of the lobes are all within tolerance of the final target positions at step 268, the computer 30 communicates with the electronics enclosure 150 and causes the pneumatic actuator 132 to retract the spider hold down 80 at step 270. The computer 30 also causes the linear actuators 100 to retract shafts 164 outward and swing the upper jaw 170 away from the lower jaw 172 on each of the lobe clamps 84, 160, 162 at step 270. This opens the lobe clamps 84, 160, 162 and releases the spider 201 from the spider hold down 80. The operator 50 may then unload the twisted spider 201 from the machine 14 at step 272. The twisted spider 201 is advanced to a subsequent processing step, such as riveting blades to the lobes of the spider 201.

If one or more of the lobes are outside of tolerance at step 268, the computer 30 calculates corrective target positions for the one or more lobes at step 280. In one approach, the computer 30 calculates the corrective target position using the following equation to determine a corrective twist angle:

CorrectiveTwistAngle=FinalDesiredTwistAngle−FreeStateAngle+PreviousTwistAngle

Figure 11:
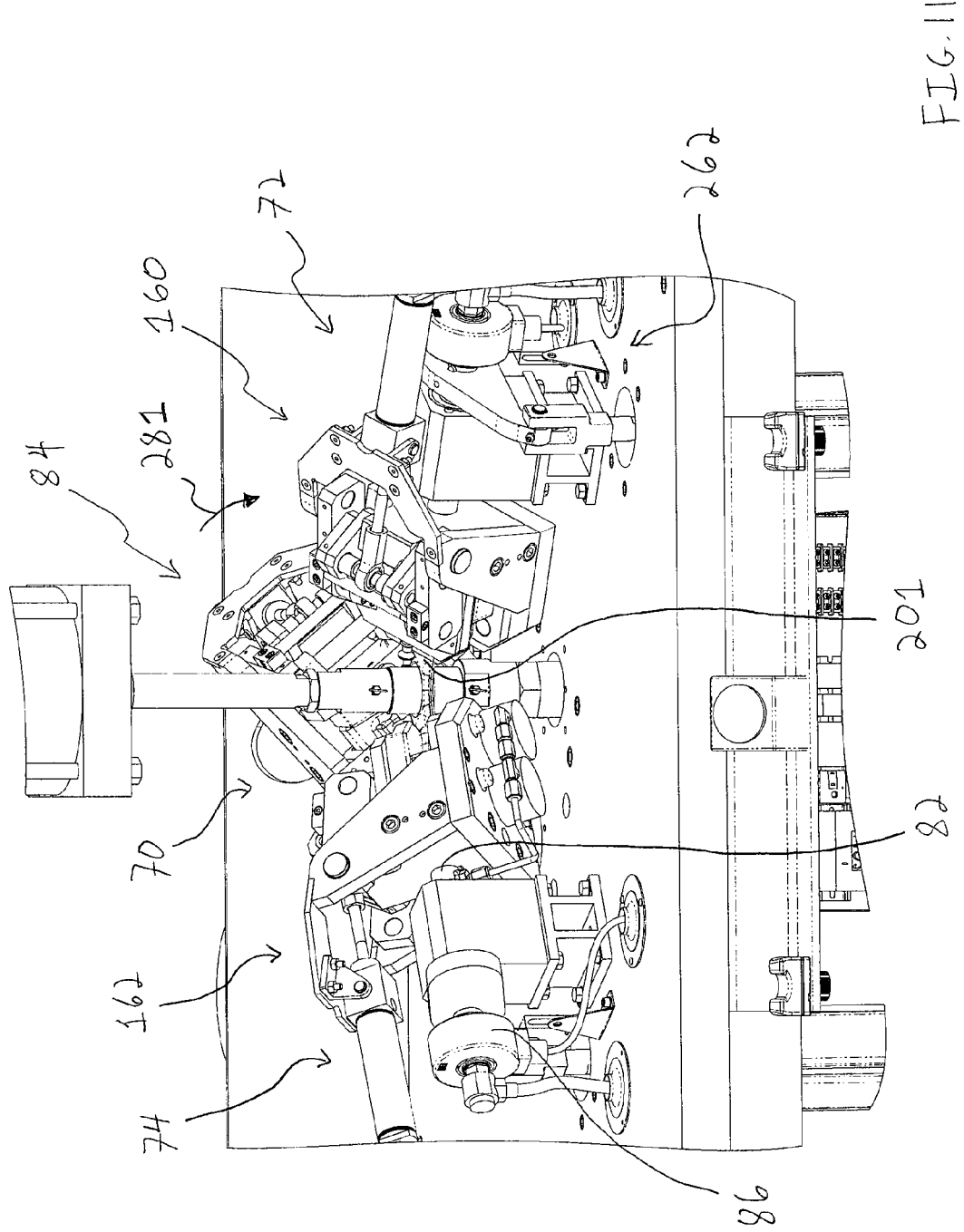
Figure 12:
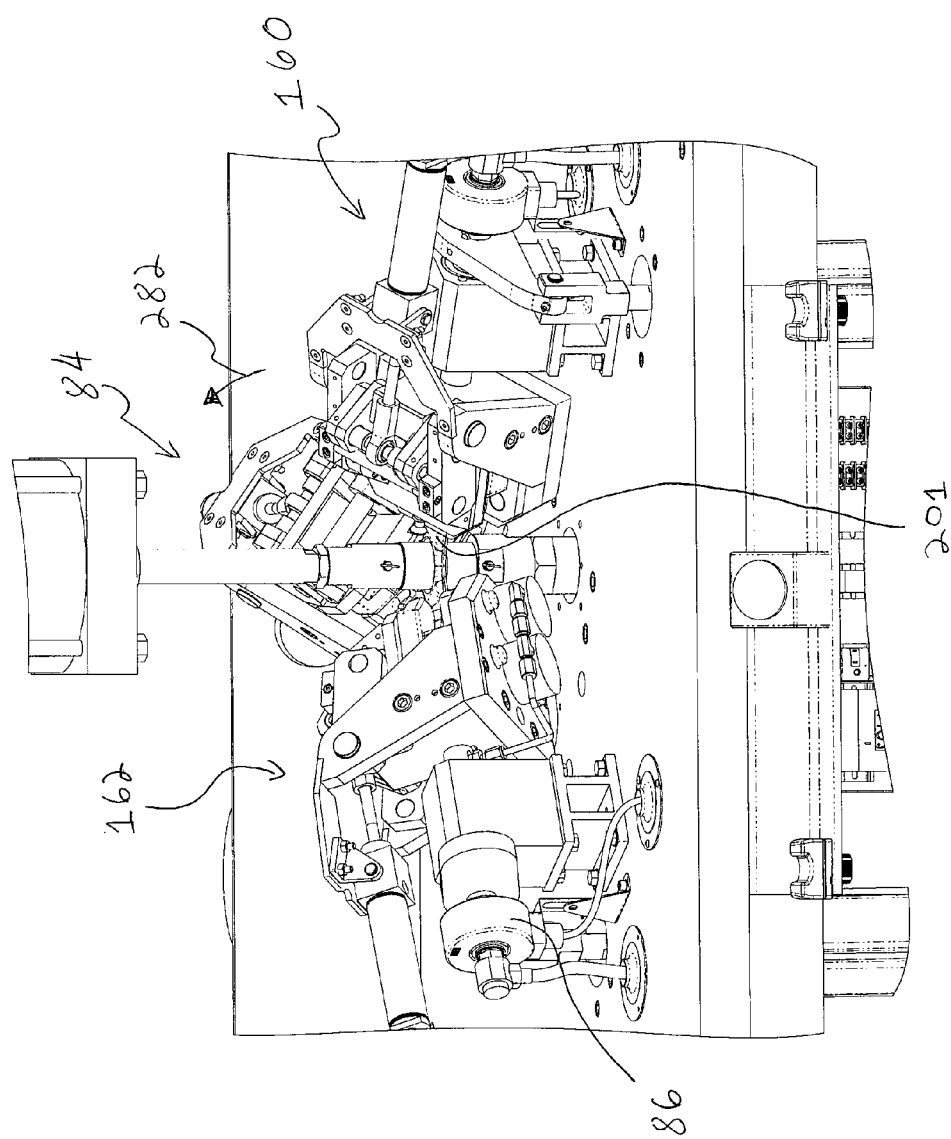

For example, with reference to FIG. 11, if the final desired twist angle of the lobe secured to lobe clamp 84 is 30°, the previous twist of the lobe at step 222 was 35°, and the twist angle of the lobe at its free state is 28°, the corrective twist angle for the lobe is:

CorrectiveTwistAngle=30°−28°+35°

CorrectiveTwistAngle=37°

Thus, the spider twister machine 14 will cause the lobe clamp 84 to pivot to a 37° position in direction 281, as shown in FIG. 11, to apply a corrective twist to the lobe such that the lobe will have a second free state position where the lobe has twist angle of approximately 30°. Stated differently, the spider twister machine 14 will cause the lobe clamp 84 to pivot 9° in direction 281 beyond the first free state position of the lobe clamp 84 in order to produce a second free state position of the lobe secured to the lobe clamp 84 that is closer to the desired final twist angle. With reference to FIGS. 10 and 11, the corrective pivoting of the lobe clamp 84 to the corrective twist angle of 37° at step 222 is shown by the contrast in position of the lobe clamp 84 in FIG. 10 compared to the position of the lobe clamp 84 in FIG. 11. If the second free state position of the lobe secured to the lobe clamp 84 is different than the desired final twist angle of 30°, such as due to lobe spring-back, then the spider twister machine 14 will calculate a second corrective twist angle for the lobe clamp 84 using the equation above at step 280 in method 200. Next, the spider twister machine 14 will pivot the lobe clamp 84 at step 222 to impart the second corrective twist angle to the lobe and produce a third free state twist angle of the lobe that is even closer to the desired final twist angle.

As another example, the material of the spider 200 may produce less spring-back of the lobe clamp 84 such that the free state angle of the lobe is greater than the final desired twist angle of the lobe secured to the lobe clamp 84. Stated differently, the lobe of the spider may have a free state position above the final target position of the lobe. For example, if the final desired twist angle of the lobe secured to lobe clamp 84 is 30°, the initial twist of the lobe at step 222 was 35°, and the twist angle of the lobe at its free state is 33°, the corrective twist angle for the lobe is:

Corrective TwistAngle=30°−33°+35°

Corrective TwistAngle=32°

The spider twister machine 14 will cause the lobe clamp 84 to pivot to a 32° position in direction 250 (see FIG. 10) at step 222 to apply a corrective twist to the lobe such that the lobe will have a second free state position closer to the desired final twist angle of 30°. Because the 32° position of the lobe clamp 84 is still above the final desired twist angle of 30°, the free state position of the lobe clamp 84 will likely be different than the final desired twist angle at step 268. Thus, the spider twister machine 14 may calculate a second corrective twist angle at step 280. For example, the final desired twist angle of the lobe secured to the lobe clamp 84 is still 30°, the previous twist of the lobe was 32°, and assuming the free state position of the lobe (after the corrective twist to 32°) is 34°, the second corrective twist angle for the lobe is:

CorrectiveTwistAngle=30°−34°+32°

Corrective TwistAngle=28°

Thus, the spider twister machine 14 will cause the lobe clamp 84 to pivot to a 28° position in direction 250 (see FIG. 10) to apply a corrective twist to the lobe such that the lobe will have a third free state position where the lobe has a twist angle of approximately 30°. Specifically, the lobe may spring back to a third free state position of 30° after twisting the lobe to the corrective twist angle of 28°. In this manner, the spider twister machine 14 may iteratively calculate corrective twist positions for each spider lobe, twist the spider lobe, and then check whether the free state position of the spider lobe is within tolerance of the desired final target position.

Figure 13:
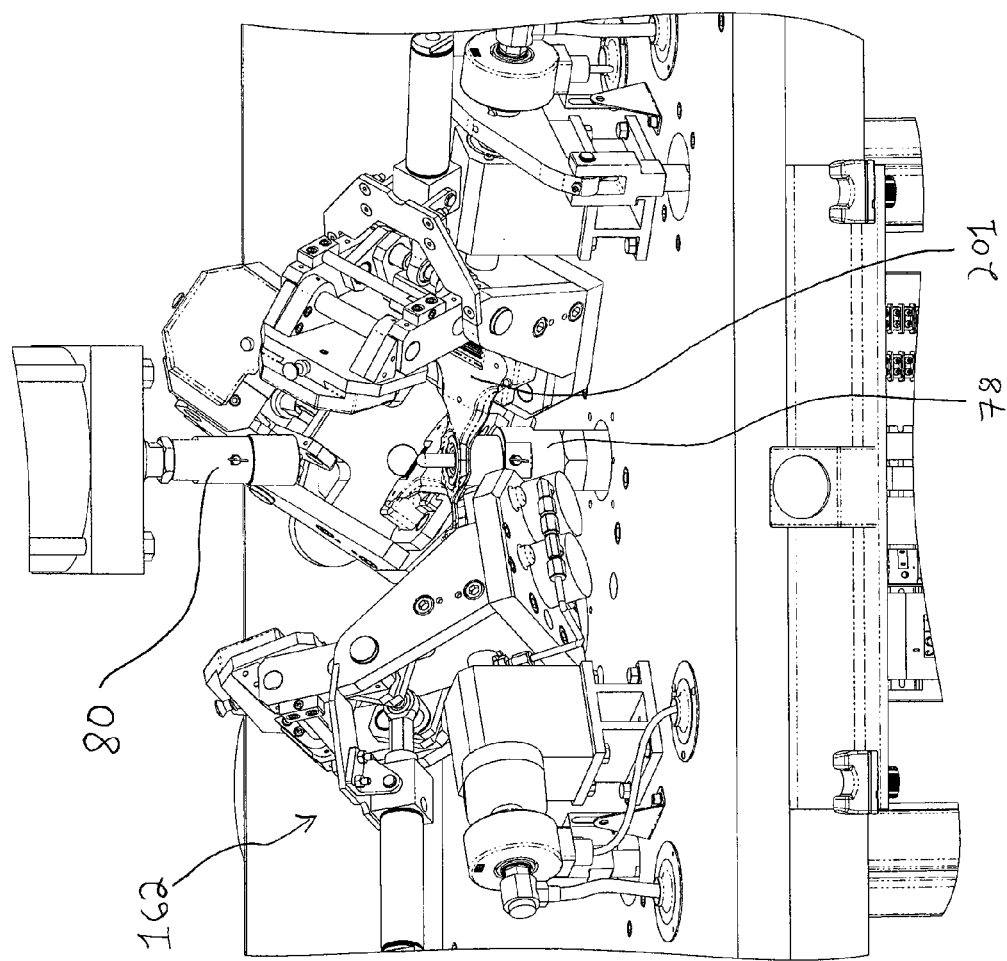

As shown in FIGS. 10 and 11, the computer 30 causes the linear actuator assemblies 240 to hold the lobe clamps 160, 162 substantially stationary during pivoting of the lobe clamp 84 in direction 280 at step 222. After the lobe clamp 84 has reached the corrective target position, the spider twister machine 14 permits the lobe clamp 84 to pivot in direction 282 (see FIG. 12) and reach a second free state position. Again, the computer 30 measures the free state positions of the lobes of the spider 201 using rotary absolute encoders 86 at step 266. Further, the computer 30 checks whether all of the lobes of spider 201 are within tolerance of the final target positions at step 268. Even though lobe clamps 160, 162 are held substantially stationary during pivoting of the lobe clamp 84 toward the corrective target position at step 222, the computer 30 again checks whether all of the lobes of the spider 201 are within tolerance of the final target positions at step 268. This detects whether the corrective pivot of the lobe clamp 84 in direction 280 at step 222 drew one or more of the lobe clamps 160, 162 out of tolerance of their final target positions. In the illustrated example, the lobe clamps 84, 160, 162 are all within tolerance of the final target positions after the corrective pivot of the lobe clamp 84. As will be appreciated, additional iterations of steps 222, 260, 266, 268, and 280 may be applied as needed to bring all of the lobes of the spider 201 within tolerance of desired final target positions. The computer 30 then communicates with the electronics enclosure 150 and causes the pneumatic actuators 100 to open the lobe clamps 84, 160, 162 and the spider hold down 80 to retract at step 270, as shown in FIG. 13. The operator 50 may then remove the twisted spider 201 from the spider twister machine 14 at step 272.

Although the method 200 is described as a series of steps, it will be appreciated that one or more of the steps may be modified, combined, removed, or performed in a different order than presented. Further, additional or fewer actions may be performed at each step without departing from the teachings of this disclosure. For example, step 222 has been described as pivoting the lobe clamps 82, 160, 162 toward initial target positions or, subsequent to step 280, pivoting one of more of the lobe clamps 82, 160, 162 toward corrective target positions. In one alternative approach, step 222 may involve sequentially pivoting lobe clamps 82, 160, 162 and permitting each lobe clamp to return to a respective free state position before pivoting the subsequent lobe clamp. In another approach, step 222 may involve staggering the pivoting of the lobe clamps 82, 160, 162 by a few tenths of a second such that the lobe clamp 160 begins pivoting as lobe clamp 82 pivots toward the respective initial target position and the lobe clamp 162 begins pivoting as lobe clamp 160 pivots toward the respective initial target position.

Figure 14:
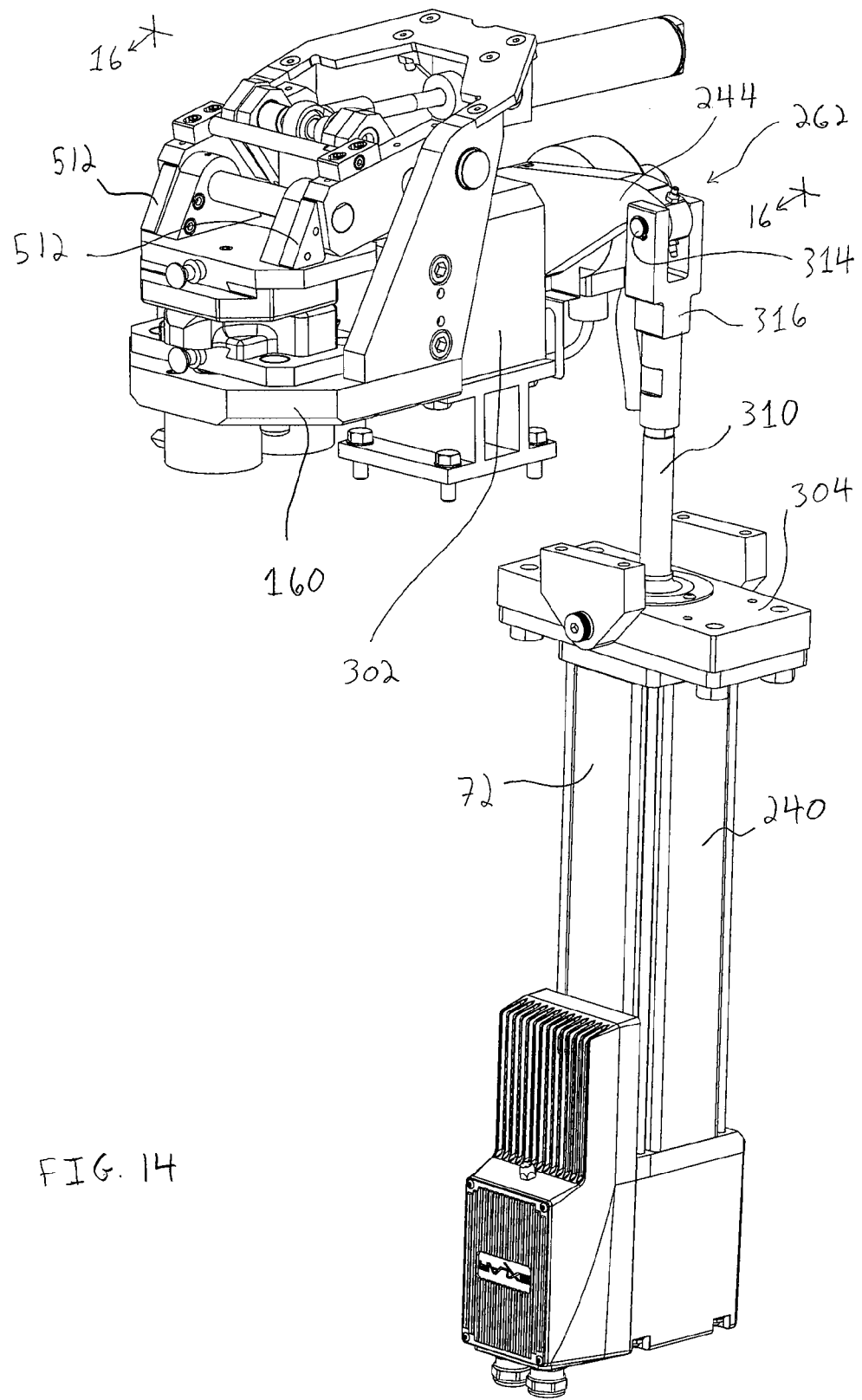
FIGS. 14 and 15 are perspective views of a lobe clamp assembly of the spider twister machine of FIG. 2 showing a linear actuator of the lobe clamp assembly pivoting a lobe clamp of the lobe clamp assembly from a starting position to an initial twist position (FIGS. 14 and 15 are illustrated without the lobe clamp engaging a spider for clarity)
Figure 15:
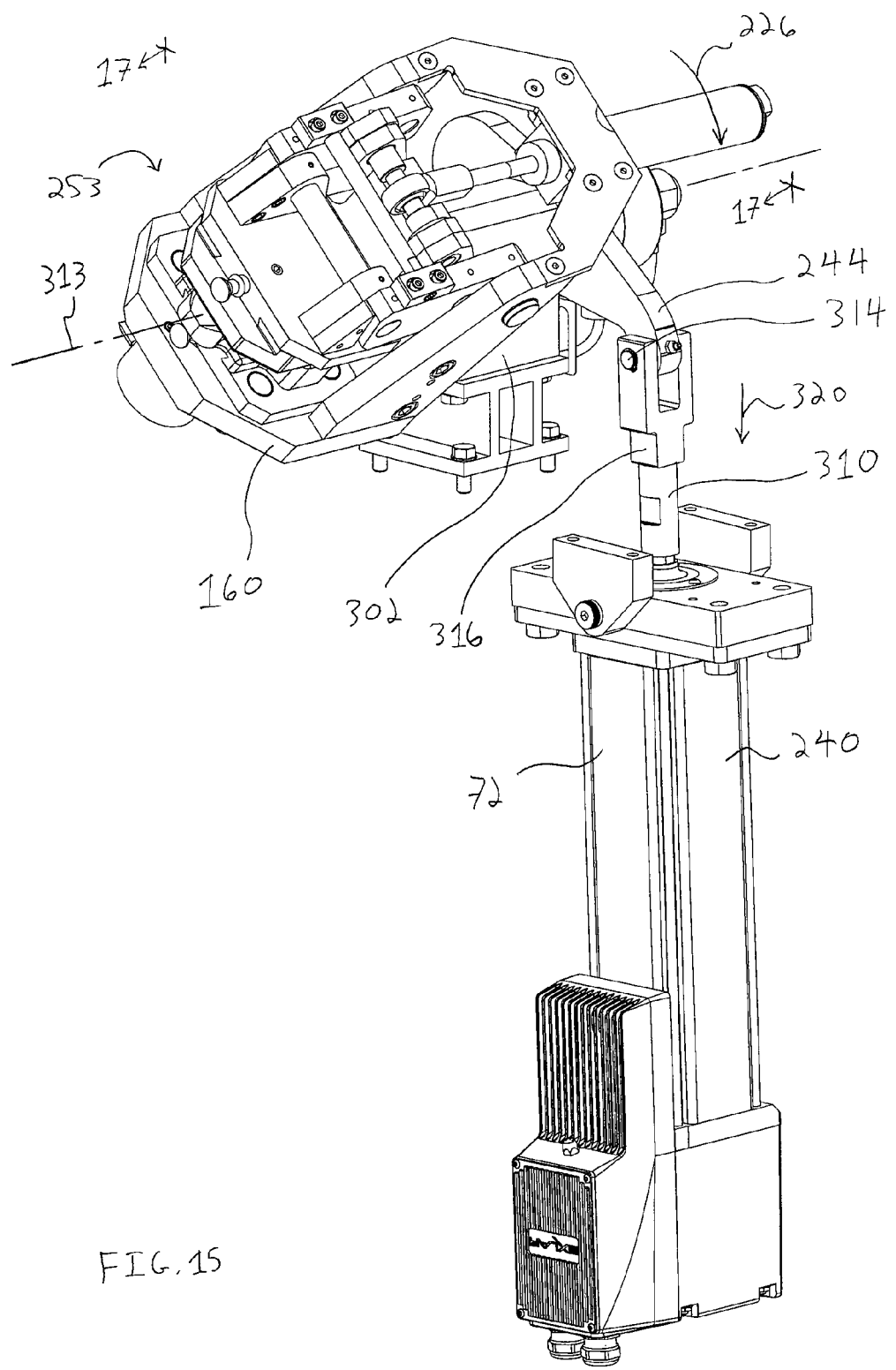
Figure 16:
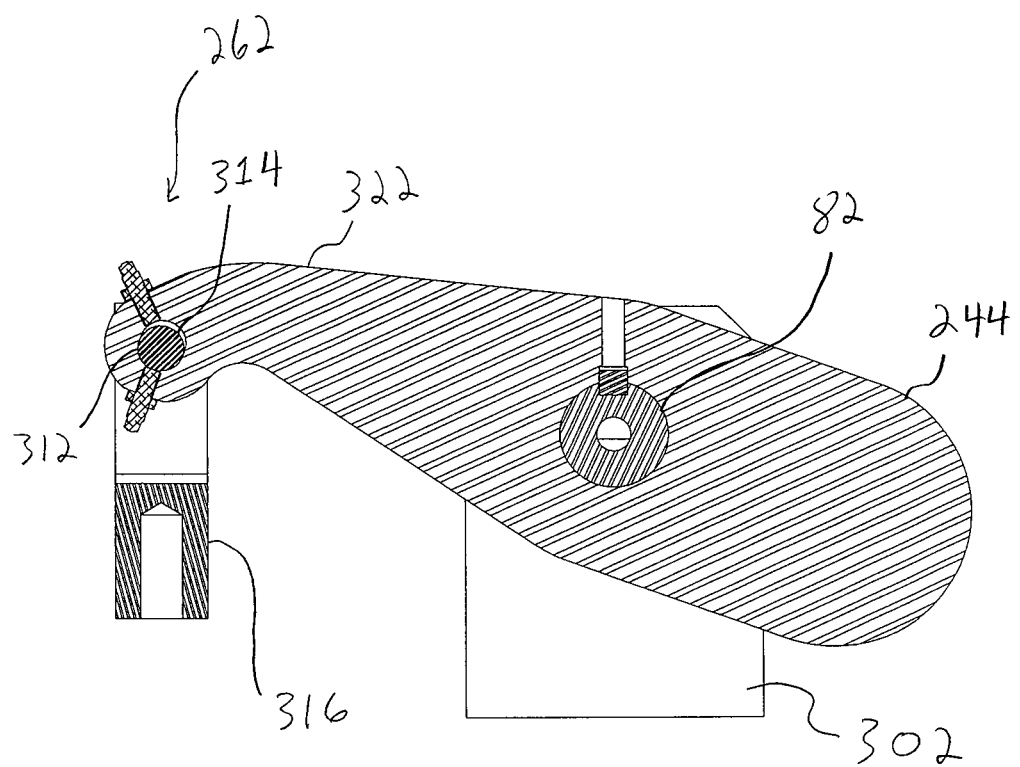
FIG. 16 is a cross-sectional view of a portion of the lobe clamp assembly taken across line 16-16 in FIG. 14 showing a pin connecting a crank arm of the lobe clamp assembly to a clevis of the linear actuator and showing the crank arm in the starting position.

With reference to FIGS. 14-22, the operation of free state position sensor 262 will be discussed in greater detail with reference to lobe clamp assembly 72. In FIG. 14, the lobe clamp assembly 72 is shown removed from the spider twister machine 14 and shown at step 220 in method 200 (see FIGS. 5 and 8). The lobe clamp assembly 72 is connected to a bench 300 (see FIG. 8) of the spider twister machine 14 with a bearing mount 302 and a mounting bracket 304 of the linear actuator 240. The linear actuator 240 has a movable shaft 310 that extends and pushes the crank arm 244 upward or retracts and pulls the crank arm 244 downward. The crank arm 244 has a throughbore 312 (see FIG. 16) which receives a pin 314 for connecting the crank arm 244 to the shaft 310 via a clevis 316. The bore 312 is slightly larger than the pin 314 to permit a small amount of lash or relative motion between the pin 314 and the crank arm 244. In one approach, there is about 0.06 inches of linear play between the pin 314 and the clevis 316, which translates into approximately 0.7 degrees of rotational play of the crank arm 244. This relative motion is used to provide a mechanical state in which no torsional load is transmitted from the lobe clamp 160 to the spider 201. The interconnection of the crank arm 244, the pin 314, and the clevis 316 is shown in FIG. 16, which is a cross-sectional view taken along line 16-16 in FIG. 14.

Figure 17:
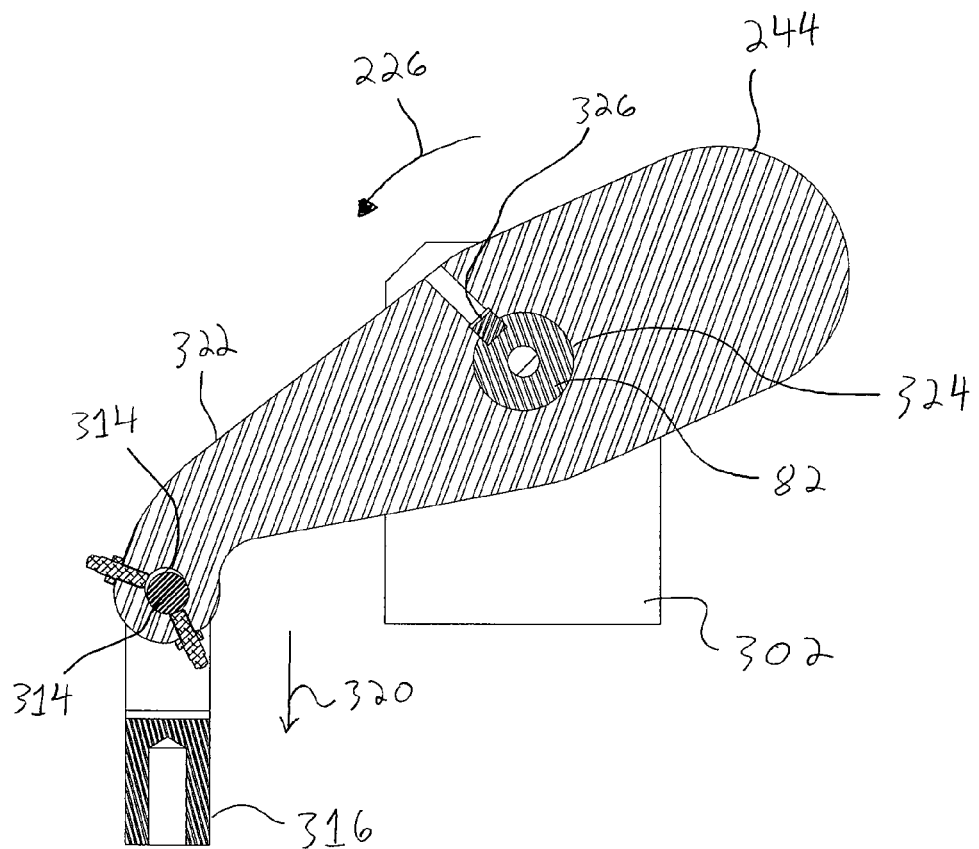
FIG. 17 is a cross-sectional view of a portion of the lobe clamp assembly taken across line 17-17 in FIG. 15 showing the clevis pulling the pin downward to pivot the crank arm to the initial twist position.

At step 222 in method 200, the computer 30 causes the linear actuator 240 to pull shaft 310 downward in direction 320, as shown in FIGS. 6 and 15. Pulling shaft 310 downward in direction 320 causes the lobe clamp 160 to pivot in direction 226 toward the initial target position of the lobe clamp 160 (see FIG. 9). More particularly, the computer 30 causes the linear actuator 240 to pull the shaft 310 downwardly in direction 320. The downward movement of the shaft 310 pulls the clevis 316 and the pin 314 downward, as shown in the cross sectional view of FIG. 17 taken across line 17-17 in FIG. 15. Pulling the pin 314 downward pulls on a distal portion 322 of the crank arm 244 which defines the bore 312. Pulling down on the distal portion 322 causes the crank arm 244 to pivot in direction 226 while the bearing mount 302 remains stationary and fixed to the bench 300 of the spider twister machine 14. As shown in FIG. 17, the crank arm 244 has an opening 324 sized to receive the drive shaft 82 and a key 326 captures the drive shaft 82 within the crank arm 244. The fixed connection between the crank arm 244 and the drive shaft 82 translates pivoting of the crank arm 44 into pivoting of the drive shaft 82 and pivoting of the lobe clamp 160 connected thereto.

Figures 18, 19:
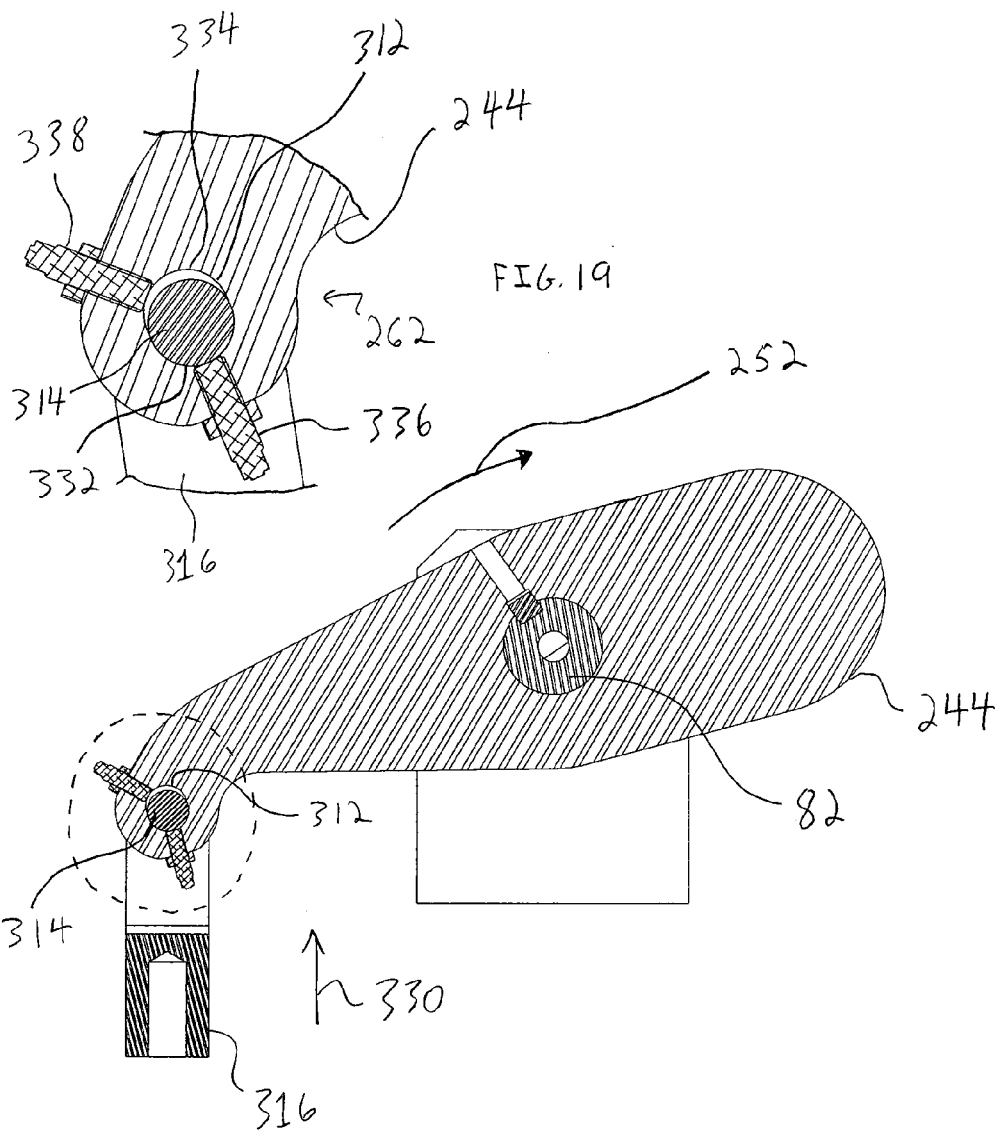
FIG. 18 is a cross-sectional view similar to FIG. 17 showing the clevis shifted upward to permit the crank arm, which is subject to a torque from the now-twisted spider lobe, to pivot in a clockwise manner back toward the starting position.
FIG. 19 is an enlarged view of the dashed circle portion of FIG. 18 showing the pin at a lower portion of a throughbore of the crank arm.

Once the computer 30 determines that the lobe clamp 160 has reached the initial target position (see FIGS. 9 and 15), the computer 30 causes the linear actuator 240 to shift the shaft 310 and the clevis 316 connected thereto upwardly in a controlled manner in direction 330, as shown in FIG. 18. The upward movement of the clevis 316 permits the torsional forces exerted on the lobe clamp 160 by the associated spider lobe to pivot the lobe clamp 160 and the crank arm 244 in direction 252 toward the free state position of the lobe, as shown in FIGS. 18 and 19. The controlled movement of the clevis 316 in direction 330 and the torque applied to the crank arm 244 in direction 252 keeps the pin 314 pressed against a lower end portion 332 of the bore 312 opposite an upper end portion 334. In the illustrated form, the free state position sensor 262 includes a pair of proximity sensors 336, 338 in communication with the bore 312 and configured to detect the presence of the pin 314 at either the lower end portion 332 or the upper end portion 334, respectively, of the bore 312.

The computer 30 causes the linear actuator 240 to continue to raise the shaft 310 and the clevis 316 in direction 330 until the lobe clamp 160 reaches the free state position, as shown in FIGS. 20, 21. Once the lobe secured to the lobe clamp 160 no longer exerts a torsional force on the lobe clamp 160, there is no torque applied to the drive shaft 82 to continue pivoting the crank arm 244 in direction 252 (see FIG. 18). A rotating assembly 253 of the spider lobe assembly 70, which includes the lobe clamp 160 and the drive shaft 82, is neutrally balanced about a pivot axis 313 (see FIG. 15) of the lobe clamp assembly 72 so that the lobe clamp 160 applies substantially zero torque on the spider 201 once the lobe clamp 160 reaches the free state position.

At this point, the linear actuator continues to raise the shaft 310 and the clevis 316 upwardly in direction 330 although the crank arm 244 is no longer pivoting in direction 252, as shown in FIGS. 22 and 23. The continued movement of the clevis 316 and pin 314 connected thereto moves the pin 314 from the lower end portion 332 of the bore 312 to the upper portion 334. The proximity sensors 336, 338 detect the change in position of the pin 314 within the bore 312 and communicate relevant information to the computer 30. In this manner, the computer 30 may use the change in position of the pin 314 within the bore 312 as an indicator that the lobe is no longer applying a torque to the lobe clamp 160 and that the lobe has reached a free state position.

The operation of free state position sensor 262 may be achieved using a variety of configurations other than the illustrated free state position sensor 262. For example, the lash between pin 314 and the clevis 316 could be disposed between any of the components of the drivetrain of the lobe clamp assembly 72. In another approach, the lobe clamps 82, 160, 162 may be opened after twisting the spider lobes to the initial target positions to permit the spider lobes to spring back to their free state positions. The lobe clamps 82, 160, 162 may then be re-secured to the lobes and the positions of the lobes in their free states determined. Another alternative approach to determining the free state positions of the lobes of the spider 201 would involve modifying the linear actuators 240 to include load cells. The load cells may be configured to detect when the torsional loads applied to the lobe clamps 82, 160, and 160 are approximately zero. Alternatively, the spider twister machine 14 may be modified to utilize rotary servo motors to pivot lobe clamps 82, 160, 162 rather than the illustrated drivetrain having the linear actuators 240. The rotary servo motors may include load cells configured to detect when the torsional loads applied to the lobe clamps 82, 160, 162 are approximately zero.

Still further, another alternative approach to calculating when the spider lobes reach free states utilizes servomotor controllers in either rotary or linear motor applications. Servomotor controllers may monitor load in addition to speed, acceleration, and distance. A servomotor controller may be configured to monitor motor load as a lobe of the spider 201 nears a free state. The computer 30 may include an algorithm for detecting when the motor load begins to increase, which indicates the spider lobe has twisted beyond a free state in a first direction, and store that position in memory of the computer 30. The computer 30 may then reverse the motor until the load begins to increase again, which indicates the spider lobe has twisted beyond a free state in a second direction, and store that position in memory of the computer 30. By calculating the midpoint of those two positions, the computer 30 may find the free state position of the spider lobe connected to the motor.

FIGS. 8-13 illustrate the linear actuators 240 pulling the crank arms 242, 244, 246 downward to pivot the lobe clamps 82, 160, 162 toward the initial target positions. This pivoting twists the lobes of the spider 201 so that the fan blades connected to the spider 201 will function when a motor spins the spider 201 and connected fan blades in a clockwise rotational direction. However, if the shop order 20 specifies that the desired rotational direction of the spider 201 is counterclockwise, the computer 30 causes the linear actuators 240 to push the crank arms 242, 244, 246 upward. This pivots the lobe clamps 82, 160, 162, toward initial target positions in opposite directions than those shown in FIGS. 8-13.

When the linear actuators 240 push the crank arms 242, 244, 246 upward to pivot the lobe clamps 82, 160, 162, the free state position sensors 262 operate in a generally opposite manner than shown in FIGS. 14-23. Specifically, pushing the clevis 316 upward to pivot the lobe clamp 160 toward the initial target position presses the pin 314 against the upper end portion 334 of the bore 312. The linear actuator 240 lowers the clevis 316 at a controlled rate while the elastic deformation of the spider 201 applies a torque on the lobe clamp 160 and causes the crank arm 244 to pivot in a counterclockwise direction, as taken from the perspective of FIGS. 18 and 20. The combination of the controlled lowering of the clevis 316 and the torque applied to the lobe clamp 160 by the lobe of the spider 201 keeps the pin 314 pressed against the upper end portion 334 of the bore 312 as the lobe clamp 160 pivots toward a free state position. When the lobe clamp 160 reaches the free state position, the lobe no longer applies a torque to the lobe clamp 160 such that the crank arm stops pivoting in the counterclockwise direction. The linear actuator 240, however, continues the controlled lowering of the clevis 316 and causes the pin 314 to move from the upper end portion 334 of the bore 312 to the lower end portion 332. The proximity sensors 336, 338 detect this change of position of the pin 314, which allows the computer 30 to determine that the lobe clamp 160 has reached the free state position.

Turning to FIGS. 24-34, the operation of the lobe clamp assemblies 70, 72, 74 will be discussed in greater detail with reference to lobe clamp assembly 70. As shown in FIG. 24, the lobe clamp 84 has an open configuration where the upper jaw 170 of the lobe clamp 84 is swung away from a lower jaw 172 of the lobe clamp 84 which permits unobstructed loading of a lobe of the spider 201 into the lobe clamp 84. The open configuration of the lobe clamp 84 also permits the operator 50 to easily disengage dove tail connections 404, 406 between lobe pads 108, 110 and clamp plates 408, 410 of the lobe clamp at step 214 in method 200. More particularly, if the lobe pads 108, 110 need to be changed at step 214, the operator pulls on handles 412, 414 of spring-loaded plunger assemblies 416, 418 to disengage ball bearings 430, 432 (see FIG. 26) from recesses of the lobe pads 108, 110. After disengaging the ball bearings 430, 432, the operator may slide the lobe pads 108, 110 in directions 434, 436 to disengage the dovetail connections 404, 406 between the lobe pads 108, 110 and the clamp plates 408, 410, as shown in FIG. 14.

As will be appreciated, the spider twister machine 14 may be configured to twist spiders of different sizes by loading corresponding lobe pads 108, 110 at step 214 of the method 200. The spider twister machine 14 may be provided with a set of different lobe pads 108, 110 for twisting a desired range of spiders. The configuration of the dovetail connections 404, 406 and recesses for engaging the ball bearings 430, 432 are generally identical throughout a set of lobe pads 108, 110. For larger spiders, however, the lobe pads 108, 110 tend to position the contact area of the pads deeper within the lobe clamps 84, 160, 162 than do the lobe pads 108, 110 for smaller spiders.

Figure 26:
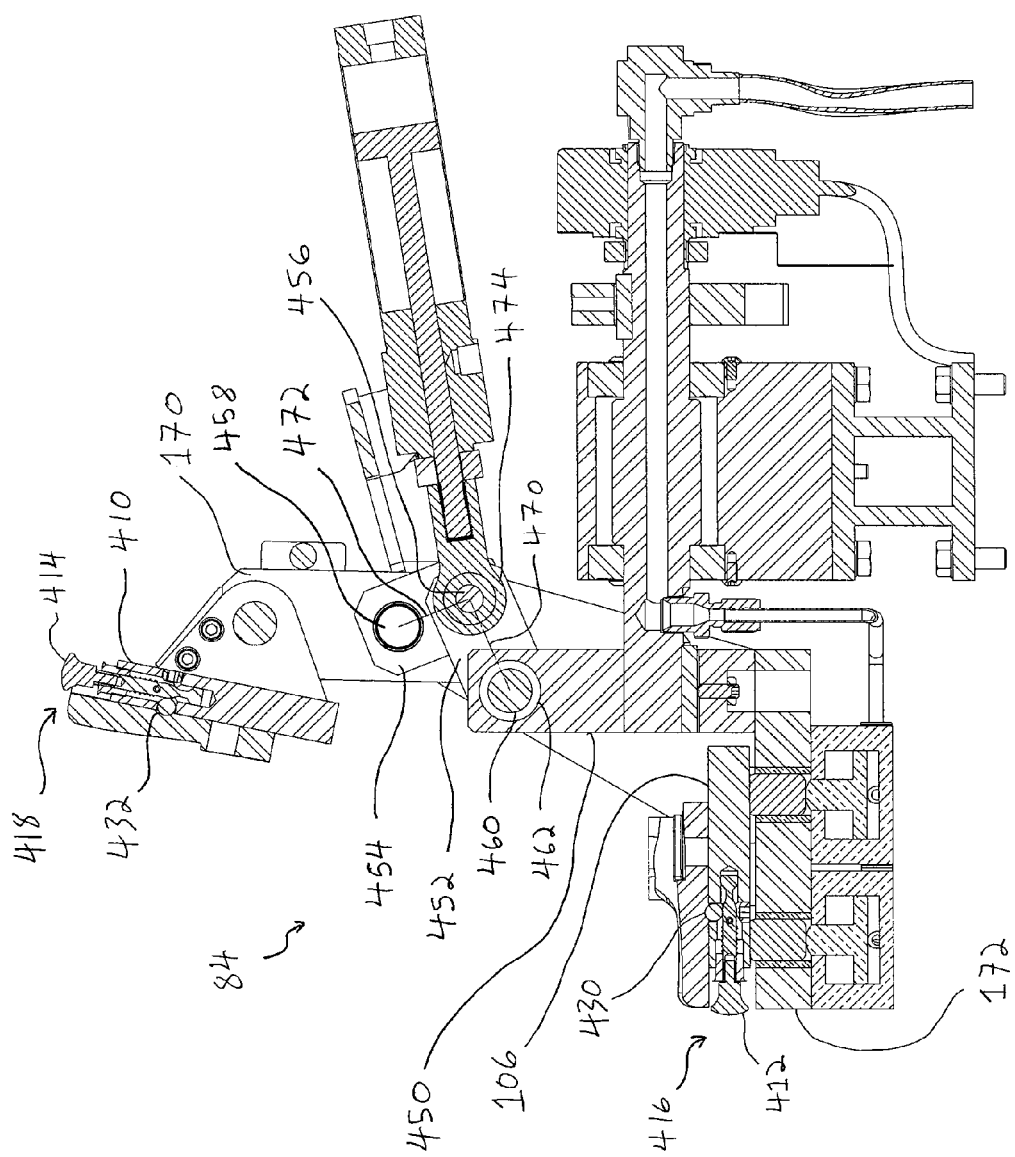
FIG. 26 is a cross-sectional view taken along line 26-26 in FIG. 24.

With the correct lobe pads 108, 110 secured to the lobe clamp 84, the operator 50 begins operation of the spider twister machine 14 in accordance with the method 200, as discussed above. This includes step 218 where the linear actuator 100 shifts shaft 164 radially inward in direction 440 to swing the upper jaw 170 into a closed position, as shown in FIG. 25. The lobe clamp assembly 70 includes a jaw lock mechanism 442 that fixes the upper jaw 170 in the closed position as the linear actuator 100 shifts the shaft 164 in direction 440. The jaw lock mechanism 442 includes a pair of two bar linkages 444, 446 connected at one end to a support or drive block 450 (see FIG. 24) and at the other end to the upper jaw 170 of the lobe clamp 84. Each two bar linkage 444, 446 includes an inboard link 452 and a pivot arm, such as an outboard link 454, pivotally connected to a transverse shaft 456 which extends between the pair of two bar linkages 444, 446. The outboard links 454 are also pivotally connected to the upper jaw 170 at pins 458 and the inboard links 452 are secured to another via a shaft 460 extending through an opening 462 of the drive block 450, as shown in FIG. 26. With the two-bar linkages 444, 446 pivotally connected at their ends to the upper jaw 170 and the drive block 450, movement of the transverse shaft 456 creates relative movement between the inboard and outboard links 452, 454 and opening and closing of the lobe clamp 82.

Figure 27:
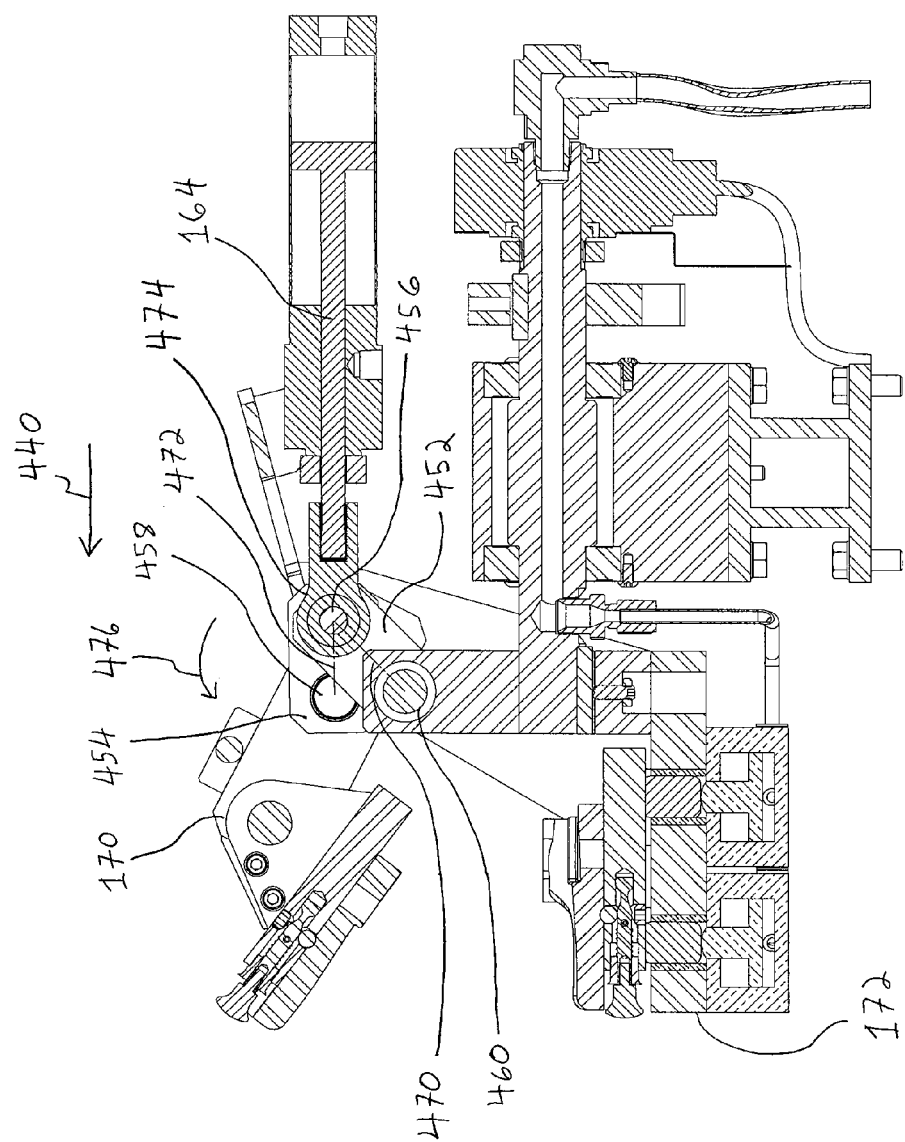
Figure 28A:
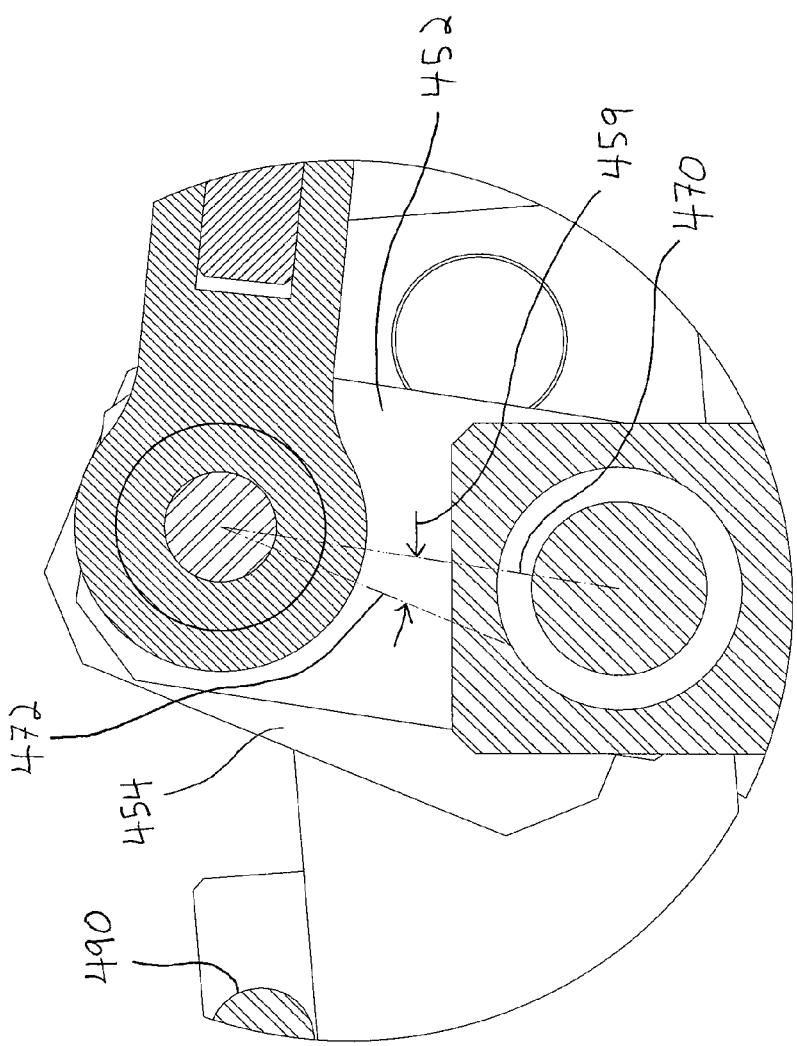
FIG. 28A is an enlarged view of the dashed circle portion of FIG. 28 showing longitudinal axes of inboard and outboard links of a jaw lock mechanism extending at an angle relative to each other.

More particularly, the inboard and outboard links 452, 454 have longitudinal axes 470, 472 extending substantially perpendicular to one another when the lobe clamp 82 is in the open configuration, as shown in FIG. 26. As the linear actuator 100 shifts the shaft 164 in direction 440, a rod end joint 474 (see FIG. 25) between the shaft 164 and the transverse shaft 456 transfers movement of the shaft 164 to the transverse shaft 456. This pivots the transverse shaft 456, the inboard links 452, and the shaft 460 in direction 476 and swings the upper jaw 170 toward the lower jaw 172, as shown in FIG. 27. Pivoting the transverse shaft 456 along an arc in direction 476 causes the outboard links 454 to pivot about the pin connections 458 and draw the longitudinal axes 470, 472 of the links 452, 454 closer together, as shown in FIGS. 26-27. Continued advancing of the shaft 164 in direction 440 causes the inboard links 452 and the transverse shaft 456 to continue pivoting in direction 476 and the upper jaw 170 to continue moving toward the lower jaw 172, as shown in FIG. 28. This draws the inboard and outboard links 452, 454 together and decreases an angle 459 between the longitudinal axes 470, 472 of the links 452, 454, as shown in FIG. 28A.

Figure 29:
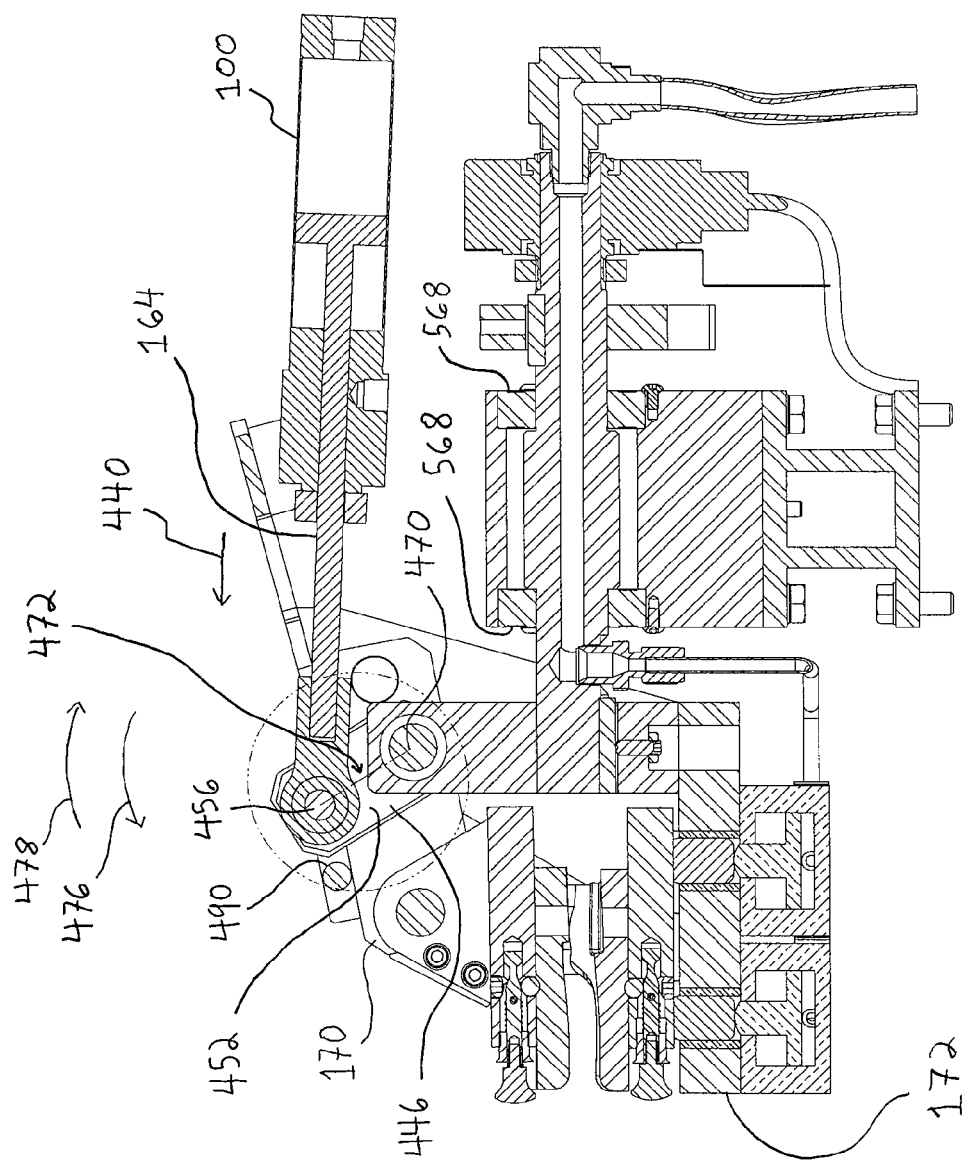
FIG. 29 is a cross-sectional view similar to FIG. 26 showing the upper jaw shifting toward the closed position.
Figure 29A:
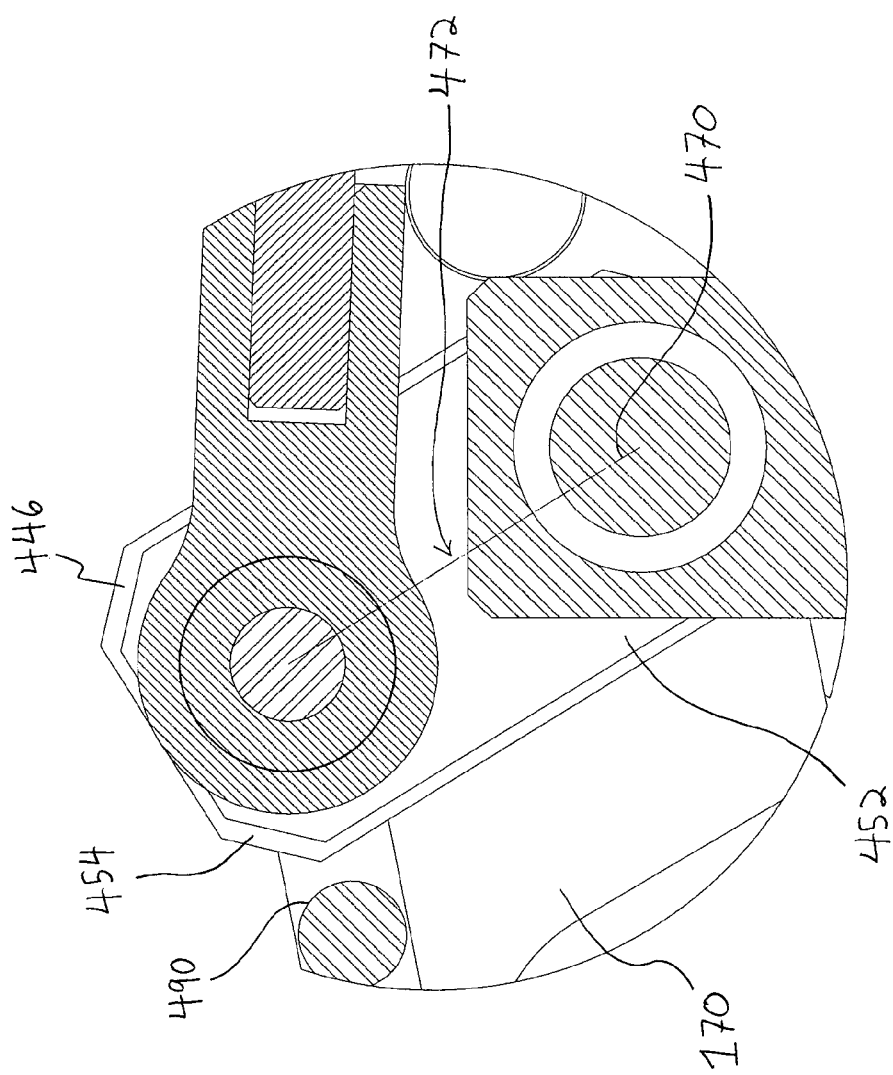
FIG. 29A is an enlarged view of the dashed circle portion of FIG. 29 showing longitudinal axes of the inboard and outboard links aligned with one another.

Shifting of the shaft 164 in direction 440 eventually pivots the transverse shaft 456 to a position where the longitudinal axes 470, 472 of the inboard and outboard links 452, 454 are aligned, as shown in FIGS. 29 and 29A. When the longitudinal axes 470, 472 are aligned, the two-bar linkages 444, 446 are in an unstable configuration where a slight push or pull from the linear actuator 100 will cause the two-bar linkages 444, 446 to pivot in direction 476 or direction 478, respectively. As shown in FIG. 29A, the two-bar linkage 446 is spaced from a stop secured to the upper jaw 170, such as a bar 490, when the longitudinal axes 470, 472 of the inboard and outboard links 452, 454 are aligned.

Figure 30:
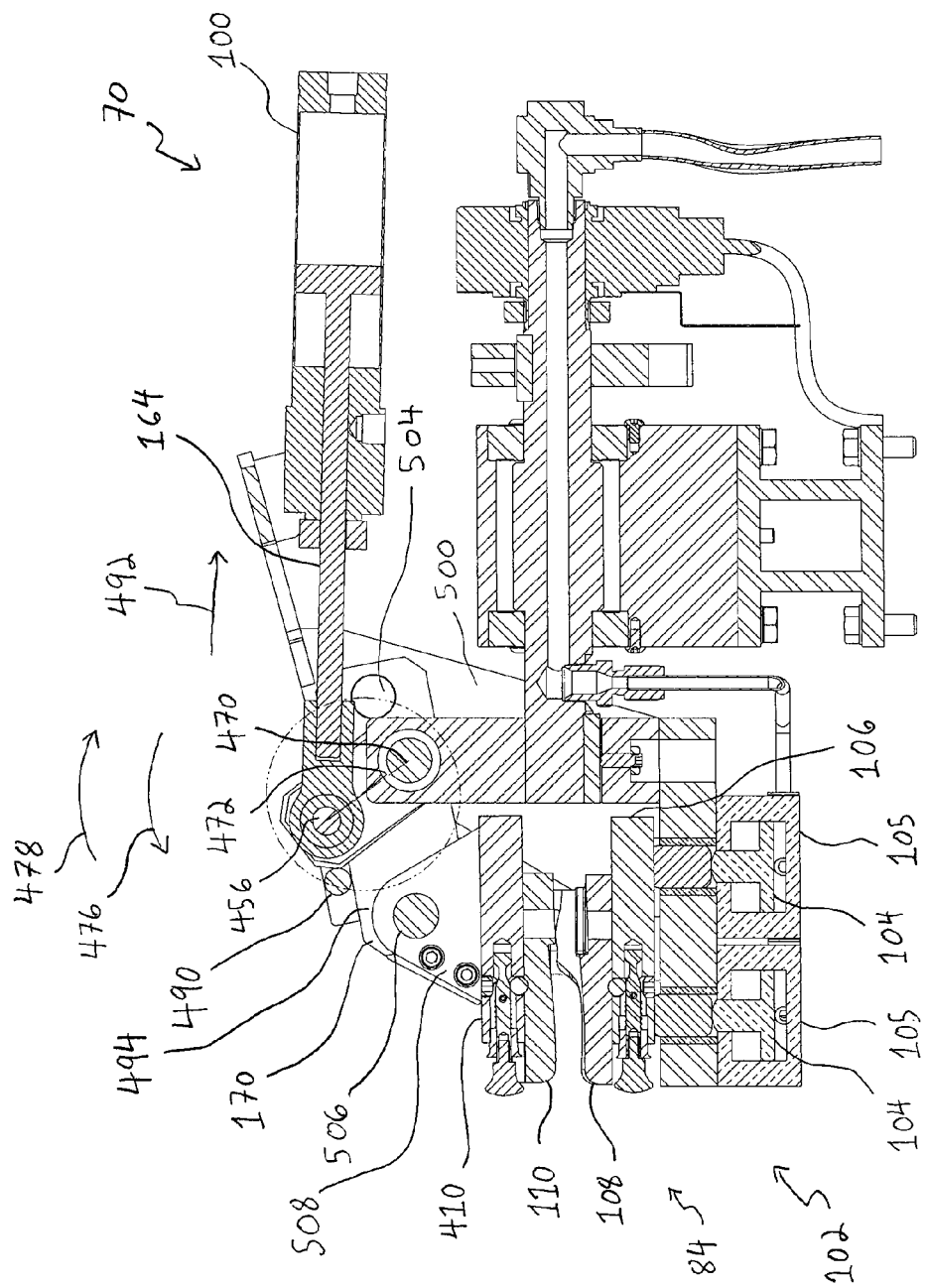
FIG. 30 is a cross-sectional view similar to FIG. 26 showing the upper jaw in the closed position and a lower lobe pad of the lower jaw in a lowered position.
Figure 30A:
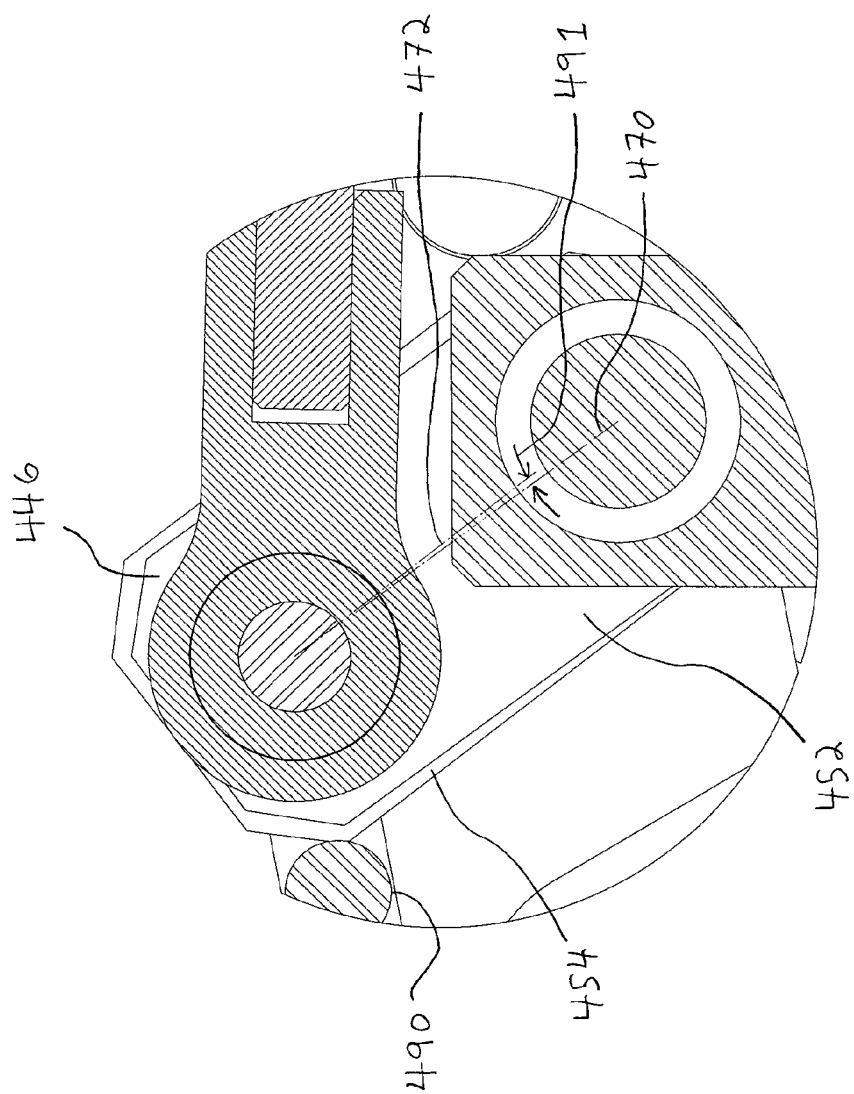
FIG. 30A is an enlarged view of the dashed circle portion of FIG. 30 showing longitudinal axes of the inboard and outboard links extending at an angle relative to each other.
Figure 32:
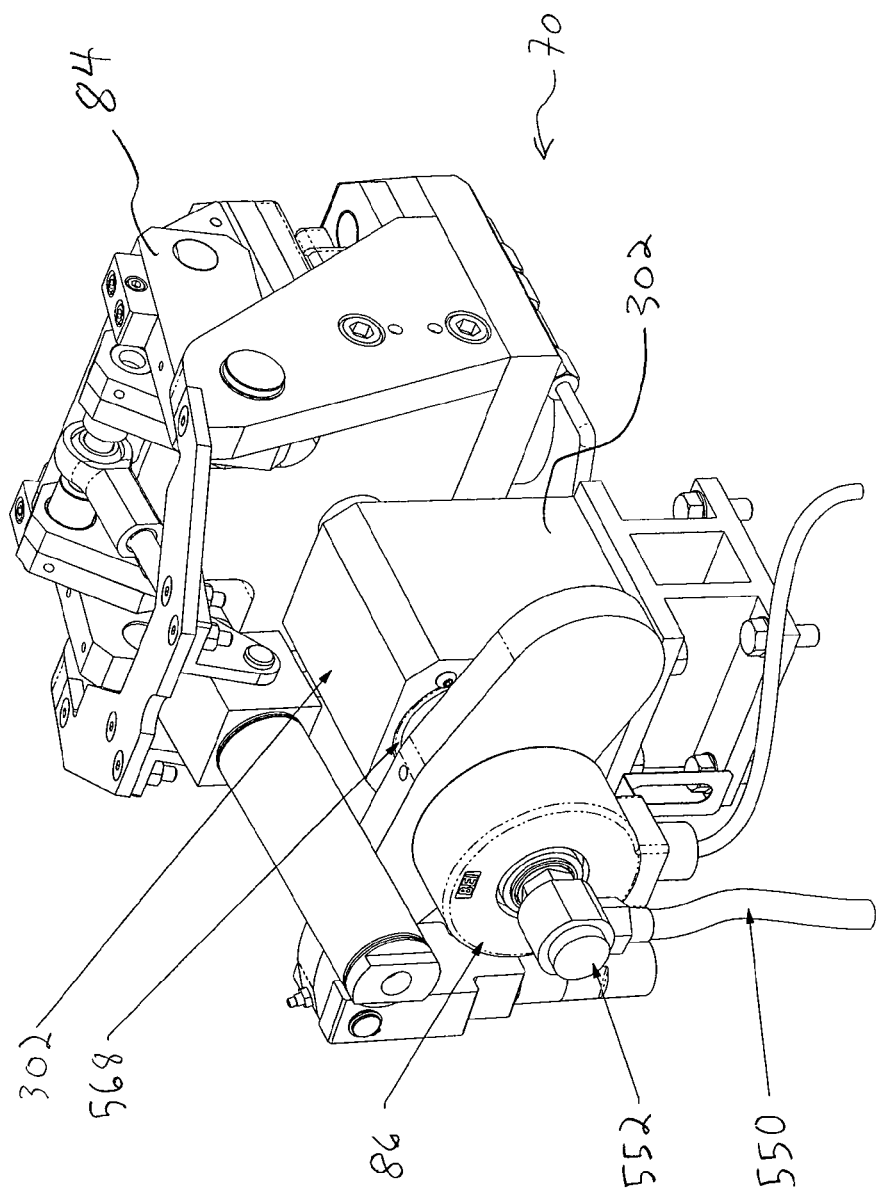
FIG. 32 is a perspective view of the lobe clamp assembly of FIG. 24 showing a hydraulic line connected to a driveshaft of the lobe clamp assembly.

The linear actuator 100 continues to shift the shaft 164 in direction 440 until the two bar linkages 444, 446 abut the bar 490, as shown in FIG. 30. At this position, the shaft 164 is fully extended and the longitudinal axes 470, 472 of the inboard and outboard links 452, 454 extend at an angle 491 relative to each other, as shown in FIG. 30A. With the longitudinal axes 470, 472 extending transversely to one another and the two bar linkages 444, 446 abutting the bar 490, the two bar linkages 444, 446 are in a stable configuration and will remain abutting the bar 490 until the linear actuator 100 retracts the shaft 164 in direction 492 (see FIG. 30). At step 270 in method 200 (see FIG. 6), the spider twister machine 14 retracts the shaft 164 in direction 492 to pivot the two bar linkages 444, 446 away from the stable configuration and open the lobe clamp 84.

The upper jaw 170 includes a pair of arms 494, 496 pivotally connected at one end to side supports 500, 502 at pins 504, as shown in FIGS. 24 and 25. A shaft 506 pivotally connects the other end of the arms 494, 496 to a pair of yokes 508, 510 which support the clamp plate 410. The pivot connection between the arms 494, 496 and the yokes 508, 510 permits the lobe pad 110 to sit flat against the lobe pad 108, although members 512 (see FIG. 14) limit pivoting of the yokes 508, 510 relative to the arms 494, 496 beyond a predetermined amount. The components of the lobe clamp assembly 70 are sufficiently rigid to withstand the torsion, tension, and compression forces experienced during operation of the spider twister machine 14. In one form, substantially all of the load-bearing components of the lobe clamp assembly 70 are made from cold drawn AISI 1045 steel, including the yokes 508, 510; arms 494, 496; pin connections 504, 458; shafts 506, 456, 460; two bar linkages 444, 446; drive plate 450; side supports 500, 502; and a support plate 536 (see FIG. 34). The clamp plates 410, 412 may be made of A2 steel.

With the upper jaw 170 in the closed configuration, the spider twister machine 14 may lock the lobe clamp 84 at step 220 in method 200 (see FIG. 5) by causing hydraulic pistons 104, clamp plate 106, and lobe pad 108 to shift upward, as shown in FIGS. 30 and 31. Shifting the lobe pad 108 upward presses the lobe pad 108 against the lobe pad 110 and applies comprehensive forces in direction 514. The forces in direction 514 would cause the arms 494, 496 to rotate in direction 478 about pins 504 but for the presence of the two-bar linkages 444, 446. Instead, the force in direction 514 is transmitted from the arms 494, 496 to respective outboard links 454 at pins 458 (see FIGS. 26 and 27) which tends to cause the outboard links 454 to pivot in direction 476. This presses the two-bar linkages 444, 446 more tightly against the rod 490 and keeps the clamp plate 410, yokes 506, and arms 494, 496 of the upper jaw 170 fixed. In this manner, locking the lobe clamps at step 220 tightly clamps the lobe of the spider 201 between the lobe pads 108, 110 and fixes the upper and lower jaws 170, 172 relative to one another. Further, the upper jaw 170 is fixed such that the hydraulic pressure within the cylinders 105 directly translates into the force with which the lobe pads 108, 110 clamp the spider 201. The computer 30 monitors the pressure within the hydraulic system 123 and ensures that the hydraulic pump 122 generates sufficient pressure within the hydraulic cylinders 105 to restrict the spider 201 from sliding between upper and lower jaws 170, 172.

The hydraulic pistons 104 have a length of travel, or stroke length, along which they can elevate the clamp plate 106 and the connected lobe pad 108. In the illustrated embodiment, the hydraulic pistons 104 of the spider twister machine 14 each have a stroke length of approximately one inch. The clamp plate 106 has dowels 530 that abut the pistons 104 and are driven upward along the stroke length with the rising hydraulic pistons 104, as shown in FIGS. 30 and 31. As will be appreciated, the dowels 530 could alternatively be formed integral with the pistons 104 to provide the desired stroke length. The clamp plate 106 has four downwardly extending guide posts 532 (see FIGS. 25, 33, 34) that slide within apertures 534 of the support plate 536 and guide the clamp plate 106 throughout the stroke length of the hydraulic pistons 104.

The stroke length of the hydraulic pistons 104 also permits the lobe clamp 84 to carry out a camber forming operation on the lobe of the spider 201 secured to the lobe clamp 84. More specifically, the upward movement of the clamp plate 106 and the connected lobe pad 108 upon pressurization of the hydraulic cylinders 105 presses the lobe pad 108 against the lobe pad 110 in a linear manner similar to a stamping press. The linear pressing movement of the lobe pad 108 against the lobe pad 110 is well suited for forming operations, whereas an arc of movement would tend to apply undesirable shear forces to the lobe. In one example, the operator 50 may load lobe pads 108, 110 into the spider twister machine 14 at step 214 in method 200 (see FIG. 5). The lobe pads 108, 110 have complimentary profiles that, when clamped onto the spider lobe, impart a camber to the spider lobe matching the profiles of the lobe pads 108, 110.

With reference to FIGS. 3 and 31-33, the hydraulic reservoir 124 is in fluid communication with the hydraulic cylinders 105 by a series of hydraulic lines and fittings including a flexible hydraulic line 550 and a hydraulic swivel coupling 552 that connects the hydraulic line 550 to the drive shaft of the lobe clamp assembly 84. In one form, the hydraulic lines are Parker Parflex 540N-6 SAE 100R7 with an inner diameter of ⅜ths inch, the hydraulic swivel coupling 552 is a Parker S2101-6-6 90° Elbow, ⅜ths inch NPTF, and the hydraulic oil is AW68 hydraulic oil. The hydraulic swivel coupling 552 permits the hydraulic line 550 to remain substantially stationary during pivoting of the driveshaft 82 and minimizes mechanical interference with the pivoting of the drive shaft 82. Further, the hydraulic swivel coupling 552 also permits the hydraulic line 550 to be coupled to the driveshaft 82 without affecting a neutral balance of a rotating assembly 557 of the lobe clamp assembly 70 about a pivot axis 554 of the lobe clamp assembly 70 (see FIG. 34).

Figure 33:
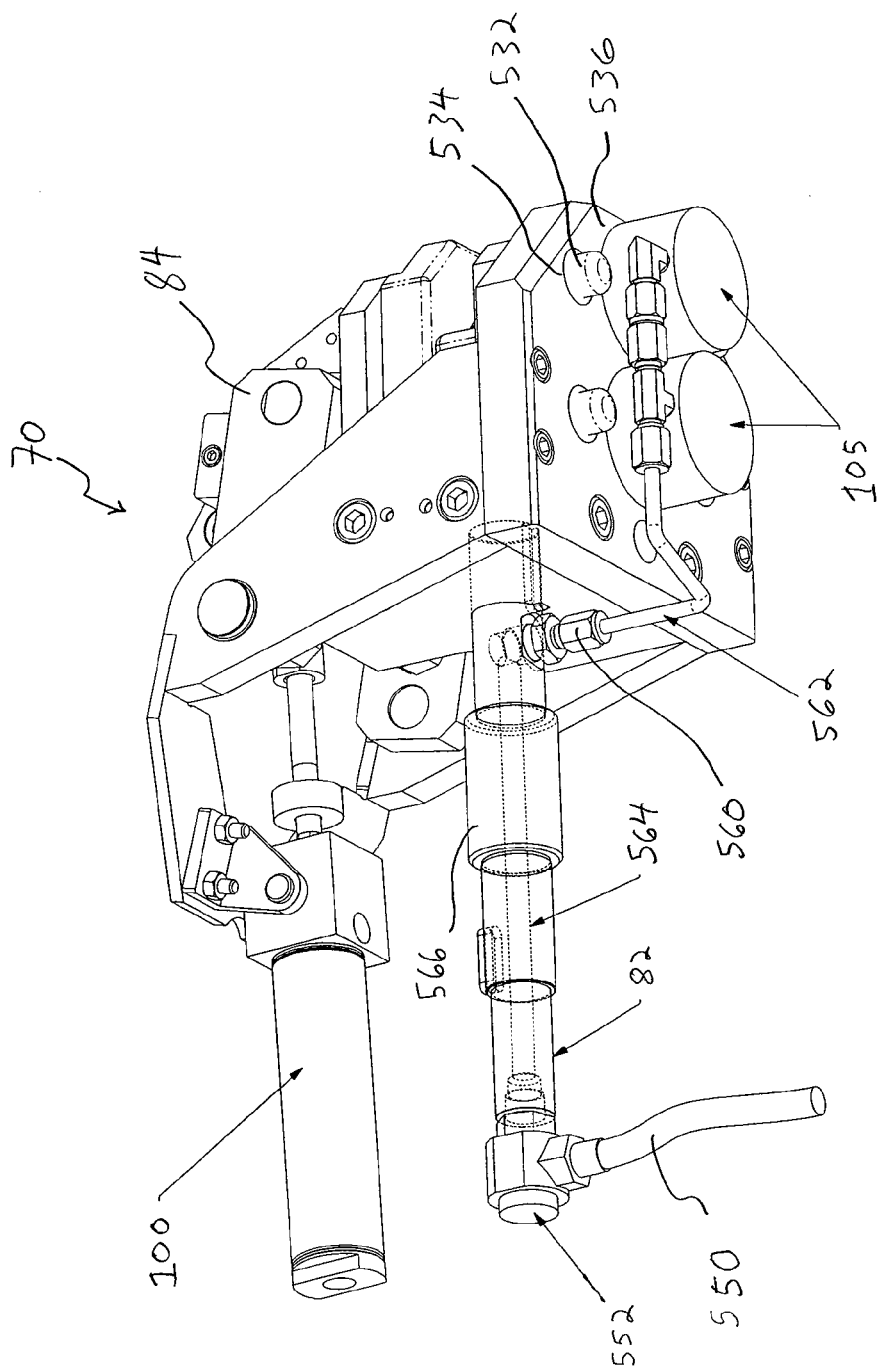
FIG. 33 is a perspective view of the lobe clamp assembly of FIG. 24 with a bearing housing of the lobe clamp assembly removed to show a hollow passage of the drive shaft in dashed lines which connects the hydraulic line to hydraulic cylinders which house the hydraulic pistons.

At the other end of the drive shaft 82, a fitting 560 and hydraulic line 562 are in communication with a hollow passage 564 of the drive shaft 82, as shown in FIG. 33. Initial setup of the spider twister machine 14 may include filling the hydraulic system 123 with hydraulic fluid. This fills the hydraulic line 562, hollow passage 564, and hydraulic cylinders 105 with low-pressure hydraulic fluid. Operating the hydraulic pump 122 at step 220 in method 200 (see FIG. 5) pressurizes the hydraulic fluid in the lines 556 and 562, passage 564, and cylinders 105 and causes the pistons 104 to shift upward, as shown in FIGS. 30-31. With reference to FIG. 33, the lobe clamp assembly 70 is illustrated with the bearing mount 302 removed to show a radially enlarged section 566 of the drive shaft 82 and the fluid passageway 564 (in dashed lines) extending through the drive shaft 82. The radially enlarged section 566 is held between bearings 568 of the bearing mount 302 (see FIGS. 29 and 32).

Figure 34:
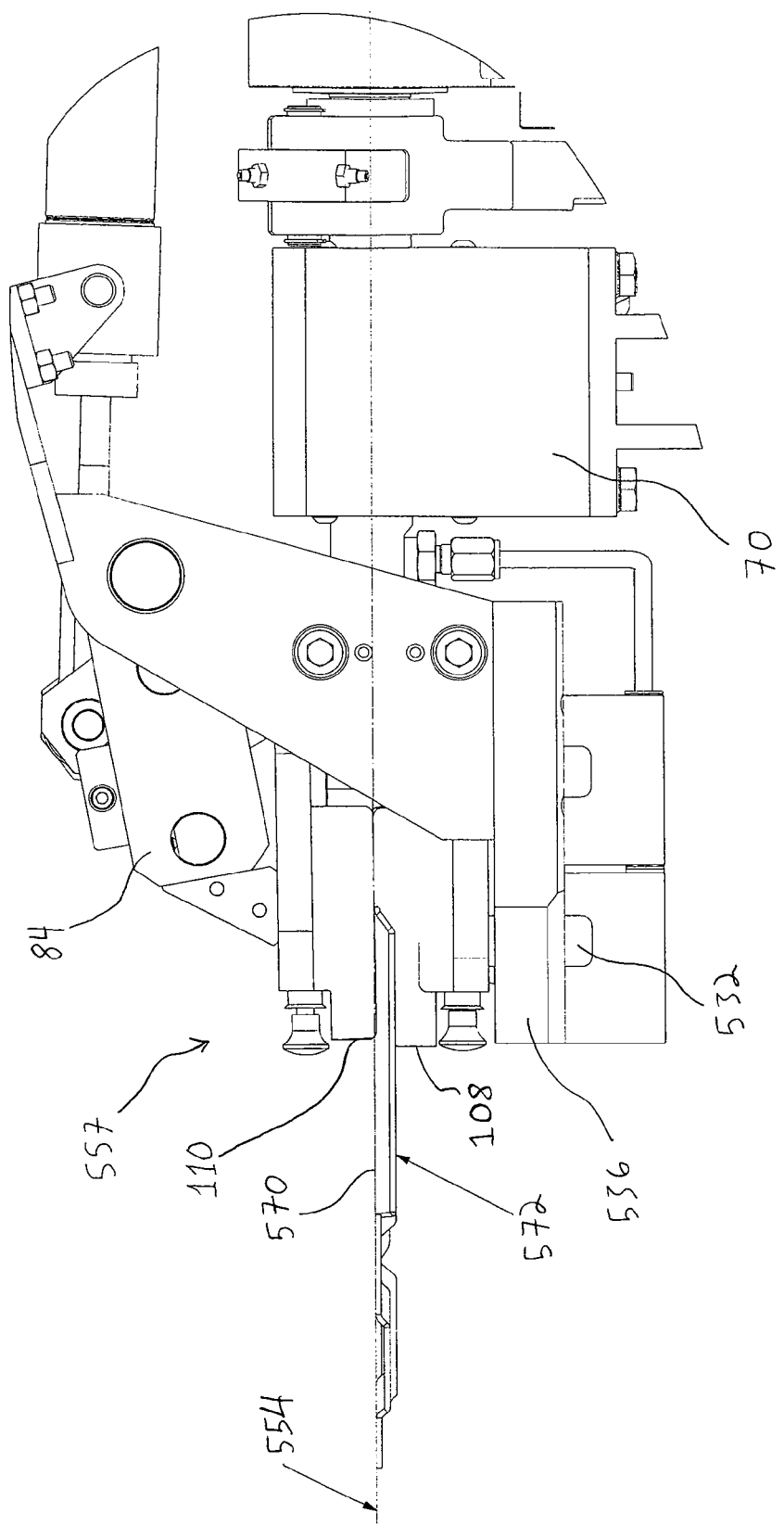
FIG. 34 is an enlarged side view of the lobe clamp assembly of FIG. 24 showing a spider lobe clamped between the jaws of the lobe clamp and a top face of the spider lobe aligned with a pivot axis of the lobe clamp.
Figure 35:
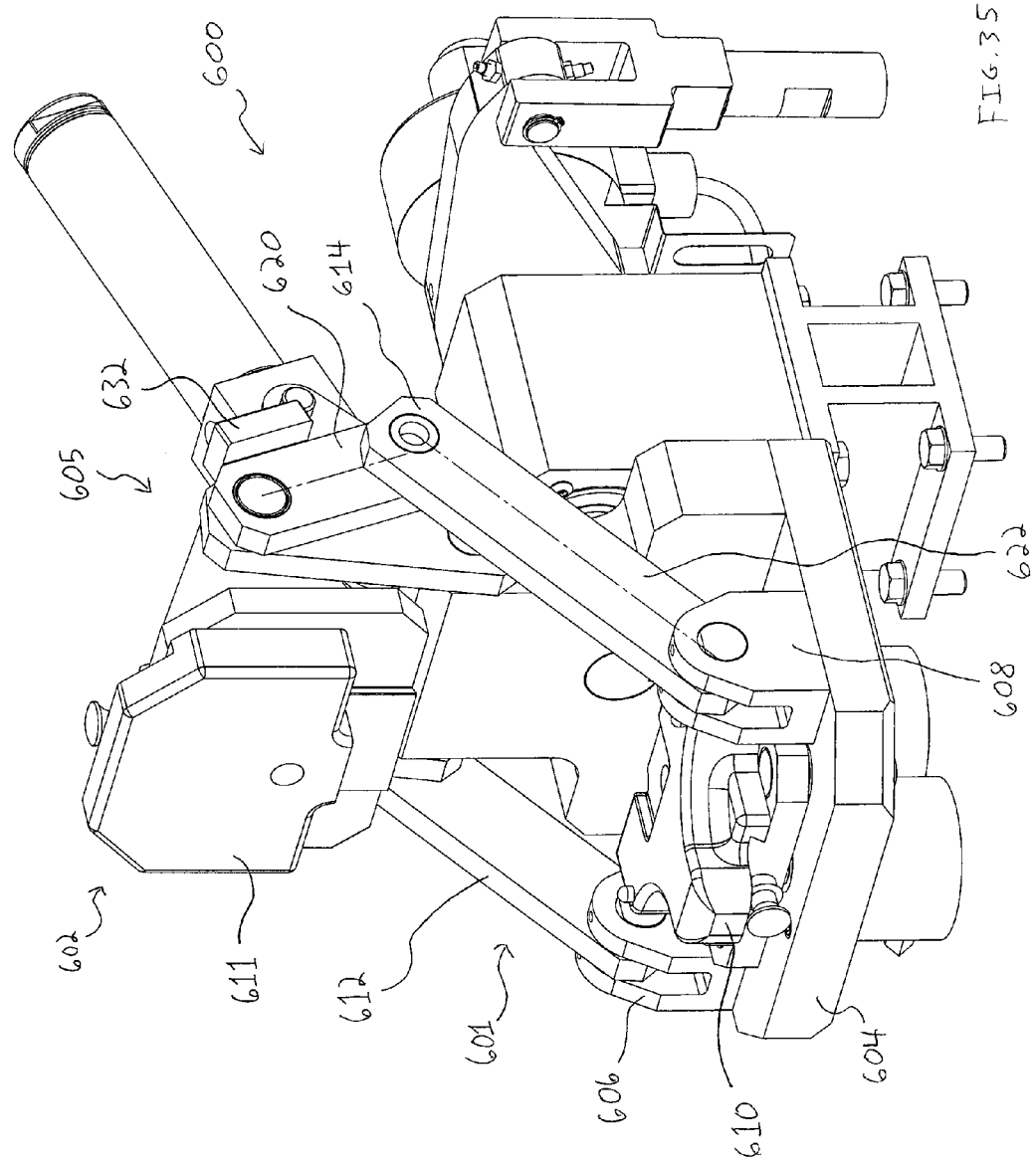
FIGS. 35-37 are a series of perspective views of another lobe clamp assembly showing jaws of the lobe clamp assembly shifting from an open configuration toward a closed configuration.
Figure 36:
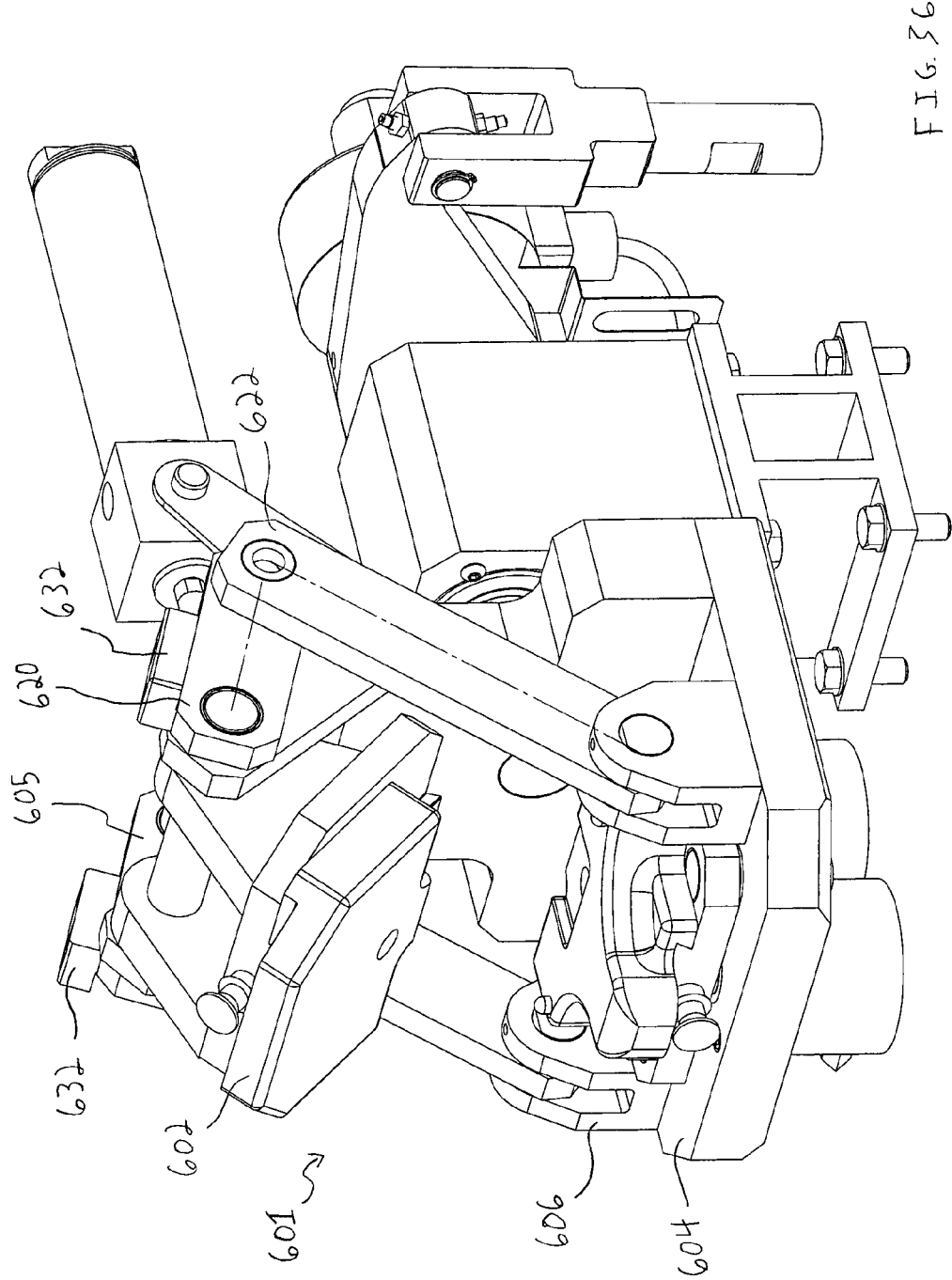

With reference to FIG. 34, the lobe clamp 84 is well suited for twisting lobes of spiders having varying thicknesses. The rotating assembly 557 of the lobe clamp assembly 70 is neutrally balanced about the pivot axis 554. When the lobe clamp 82 is closed, the lobe pad 110, an upper face 570 of the spider lobe 572, and the pivot axis 554 are all coincident. For thicker spiders, the lobe pads 108, 110 are configured to position an upper face of the thicker spider coincident with the pivot axis 554 of the lobe clamp assembly 70. In this manner, the lobe clamp assembly 70 may twist the lobes uniformly about the pivot axis 554 to ensure consistent part quality despite different spider thicknesses.

Another embodiment of a lobe clamp assembly is shown in FIGS. 35-39. The lobe clamp assembly 600 is substantially similar to the lobe clamp assembly 70 described above. One difference between the lobe clamp assembly 600 and the lobe clamp assembly 70 is that the lobe clamp 600 has a lobe clamp 601 with an upper jaw 602 connected to a lower jaw 604 at pivot mounts 606, 608 on either side of a lobe pad 610. The lobe clamp 601 includes a jaw lock mechanism 605 for locking the upper jaw 602 in a closed position relative to the lower jaw 604. The jaw lock mechanism 605 includes a pair of two bar linkages 612, 614 that connect the upper jaw 602 to the lower jaw 604 with inboard links 620 pivotally connected to pivot arms, such as outboard links 622, at a transverse shaft 624.

Figure 39:
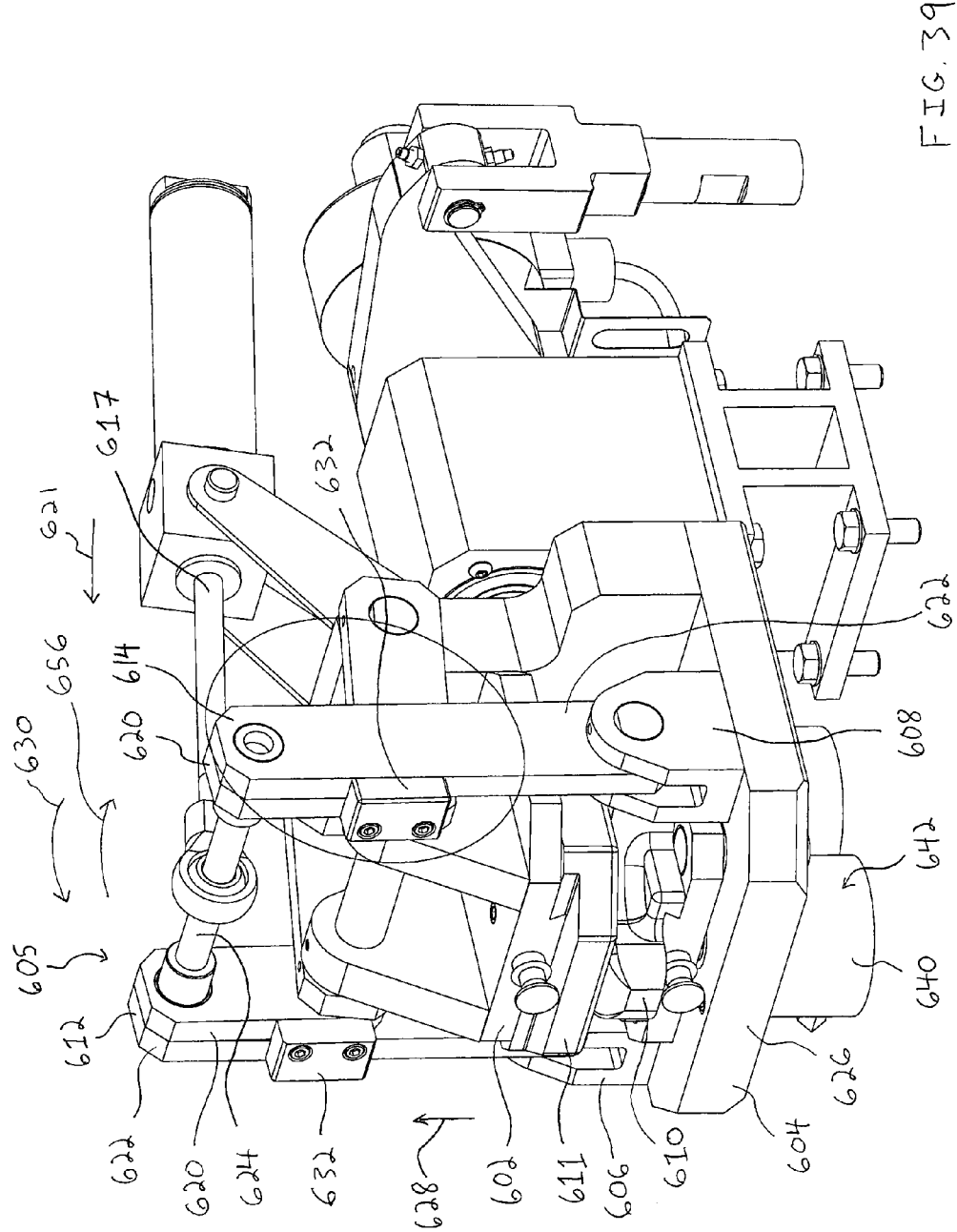
FIG. 39 is a perspective view similar to FIG. 35 showing the upper jaw in the closed position and a lower lobe pad of a lower jaw of the lobe clamp assembly in a lowered position.

When the upper jaw 602 is in the closed position and the jaw locking mechanism 605 is in the locked configuration, as shown in FIG. 39, the inboard and outboard links 620, 622 extend upward from a support plate 626 of the lower jaw 604. Pressurizing hydraulic cylinders 640 of a locking mechanism 642 presses the lower lobe pad 610 against an upper lobe pad 611 in direction 628 and tends to pivot the outboard links 622 in direction 630 (see FIG. 39) against stops 632 attached to the inboard links 620. Pressing the outboard links 622 against the stops 632 tightly engages the jaw locking mechanism 605 in the locked configuration and rigidly fixes lobe clamp 601 in the closed configuration throughout a spider twisting operation. Pressing the lobe pad 610 against the lobe pad 611 also places the two bar linkages 612, 614 in tension. The two bar linkages 612, 614 are sufficiently strong that tensile loading of the linkages 612, 614 produces effectively zero vertical displacement of the upper jaw 602 away from the closed position. In one approach, the hydraulic cylinders 640 can apply up to three tons of clamping force to the lobe pads 610, 611 when the jaw lock mechanism 605 is in the locked configuration without movement of the upper jaw 602 away from the closed position.

Figure 37:
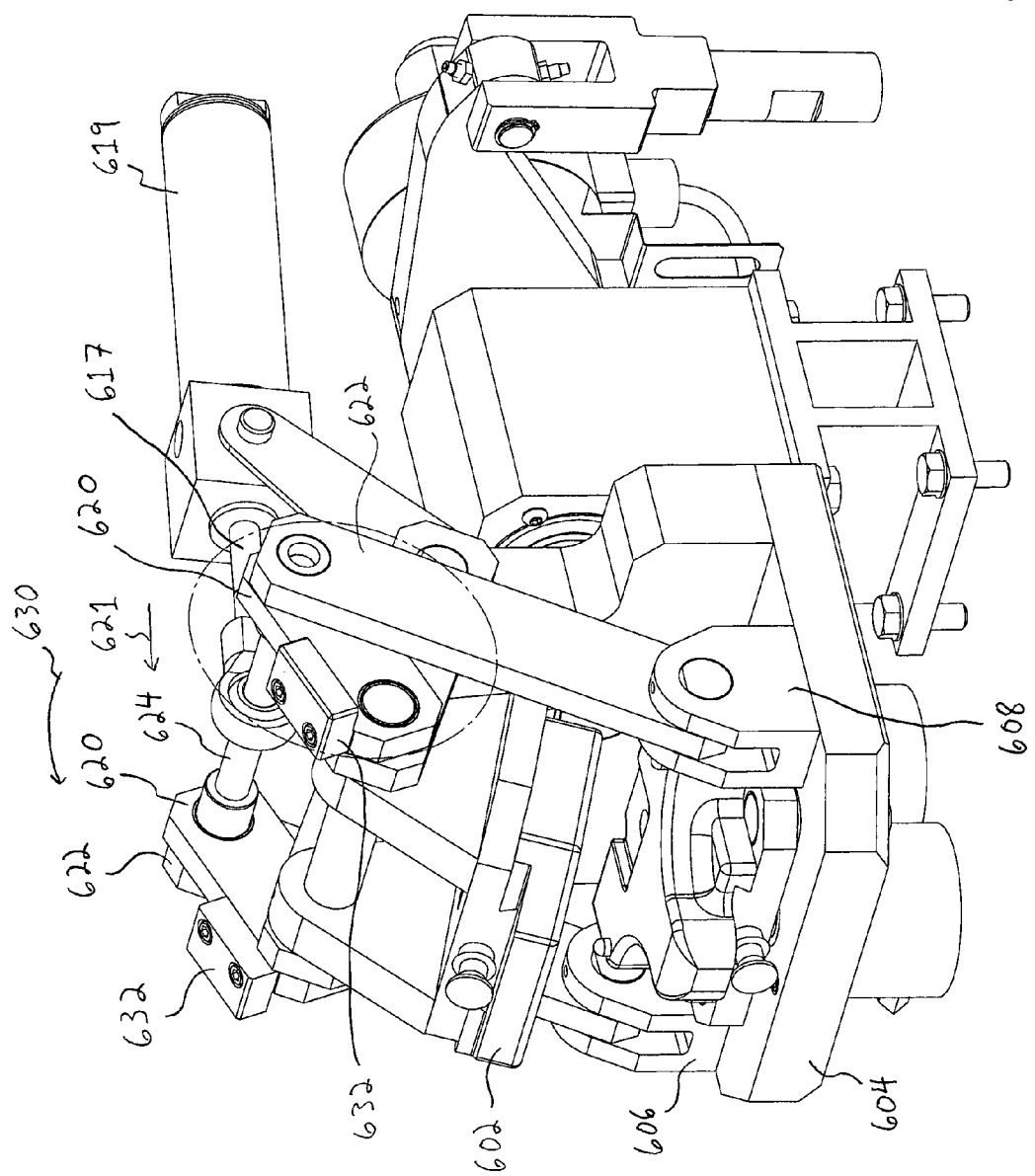

Another difference between the lobe clamp assembly 600 and the lobe clamp assembly 70 is that the inboard links 620 have stops 632 rigidly secured thereto that restrict the outboard links 622 from pivoting beyond a predetermined position once the upper jaw 602 has reached the closed position. More specifically, shifting a shaft 617 of a linear actuator 619 in direction 621 shifts the two bar linkages 612, 614 in direction 630, as shown in FIG. 37. This pivots the inboard and outboard links 620, 622 toward each other and decreases an angle 623 between longitudinal axes 650, 652 of the links 620, 622, as shown in FIG. 37A. Continued shifting of shaft 617 in direction 621 pivots the links 620, 622 toward to each other and brings the longitudinal axes 650, 652 into alignment, as shown in FIG. 38A. At this point, the two bar linkages 612, 614 are in an unstable configuration similar to the two bar linkages 444, 446 shown in FIGS. 29 and 29A. Further, there is a slight gap 625 between the outboard links 622 and the stops 632.

Continued shifting of shaft 617 in direction 621 shifts the upper jaw 602 into the closed position and pivots the outboard links 622 relative to the inboard links 620. This shifts the outboard links 622 against the stops 632 and positions the longitudinal axes 650, 652 of the links 620, 622 at an angle 637 relative to each other, as shown in FIG. 39A. With the outboard links 622 abutting the stops 632 and the longitudinal axes 650, 652 extending transversely to one another, the two-bar linkages 612, 614 are in a stable condition that will keep the upper jaw 602 in the closed position until the shaft 617 is retracted to pivot the shaft 624 in direction 656, as shown in FIG. 39.

In one form, the components of the spider twister machine 14 are as follows:

| Ref. No. | Name | Part Number | Part Description | Manufacturer |
| --- | --- | --- | --- | --- |
| 140 | Screw Jack | 15-MSJ-IK 24:1/SSE-1/SSE-2/FT/5/S | Action Jack, 15-ton, Inverted Keyed, 24:1 gear ratio, Standard Shaft Extension both sides, Standard Flanged Base and Standard Threaded End, 5 inch Travel | Nook Industries, Inc. |
| 142 | Servo Controller/Drive | AR-13CE | Compumotor, Aries Controller Drive, 1.3 kW | Parker Hannifin Corp. |
| 144 | Servo Motor | MPP0923R7D-NPSN | Compumotor, MPP custom servo motor | Parker Hannifin Corp. |
| 132 | Pneumatic Actuator (Holddown) | ME3D | ME3D-8X8-HC-MPR-NPT = ½-A = 2-C = ⅞ (head and cap) #606 WDF Key cap end, .750 from end | TRD Mfg. |
| 93 | Light Curtain | SLSK30-450Q88-1RE15 | EZ-Screen 30 mm Resolution Safety Light Kit | Banner Engineering Corp. |
| 336, 338 | Proximity Sensor | EM-005P | Amplifier-in-cable Small Proximity Sensor | Keyence Corp. of America |
| 122 | Hydraulic Pump | GX20-SSV-R4-DM31 | 20:1 Ratio air over oil Hydraulic unit | HEYPAC |

-continued

| Ref. No. | Name | Part Number | Part Description | Manufacturer |
|---|---|---|---|---|
| 100 | Pneumatic Actuator (Lobe Clamp) | BFT-174-D | Bimba 1½" Bore Double Acting - Front Block Trunnion Mounting - Air Return 4" Stroke Pneumatic Cylinder | Bimba Mfg. Co. |
| 105 | Hydraulic Cylinder | 74420 | Short Stroke Hydraulic Cylinder S3510-5 Without Return Spring | Mack Corp. |
| 552 | Swivel Coupling | 5381K41 | S2101-6-6 90° Elbow, ⅜" NPTF Swivel Coupling | Parker Hannifin Corp. |
| 494 | Arm | LNFTB20-P20-V20-L65-S35-W50-T19-TPP | Link, 3-Ø20 mm Holes × 100 mm Long × 50 mm Wide × 19 mm Thick | Misumi USA, Inc. |
| 452 | Inboard Link | LNDB20-20-L46-T12 | Link, 2-Ø20 mm Holes × 46 mm Long × 38 mm Wide × 12 mm Thick | Misumi USA, Inc. |
| 454 | Outboard Link | LNDB20-20-L35-T12 | Link, 2-Ø20 mm Holes × 35 mm Long × 38 mm Wide × 12 mm Thick | Misumi USA, Inc. |
| 82 | Drive Shaft | KZDN40-271-P30-LA86-LB60-Q26-LC58-KA0-HA40 | Drive Shaft - One End Stepped, One End Double Stepped Type | Misumi USA, Inc. |
| 702 | Power Supply | S8VM-01505CD | 5 V, 0.5 Amp DC Power Supply | OMRON Corp. |
| 86 | Rotary Encoder | 924-01080-011 | XHS35F-100-R2-SS-12GC-28V/V-CW-SM14/19 (absolute) | BEI Industrial Encoders |
| 302 | Bearing Mount | BGBWTB6206VV-100-80-KKC-NA | Bearing with Housings - Bottom Mount, Double Bearings | Misumi USA, Inc. |
| 126 | Regulator | P3KNA94AD2VD1A | Electronic Proportional Regulator, 0 to 10 Volt | Parker Hannifin Corp. |
| 30 | Computer | xw4400 Workstation | Dual-Core 2.4 GHz, 3.25 GB RAM, Microsoft Windows XP Version 2002, Service Pack 3 | Hewlett-Packard |
| 240 | Linear Actuator | T2M090-1001-NFM-HD-238-40-230-SIO | Tritex Linear Actuator, 90 mm, Integral Drive/Control, Modbus RS485 Communications, 10" Stroke, 0.1" Lead, Male rod end (½"-20 thread), analog hall device, 2 stack stator, 115/230 VAC input, single phase; 1587 lbs continuous thrust, 6.67 in/sec speed. | Exlar Corp. |
| 700 | Power Supply | SDN 10-24-100P | 24 V, 10 amp DC power supply | SolaHD |

Figure 40:
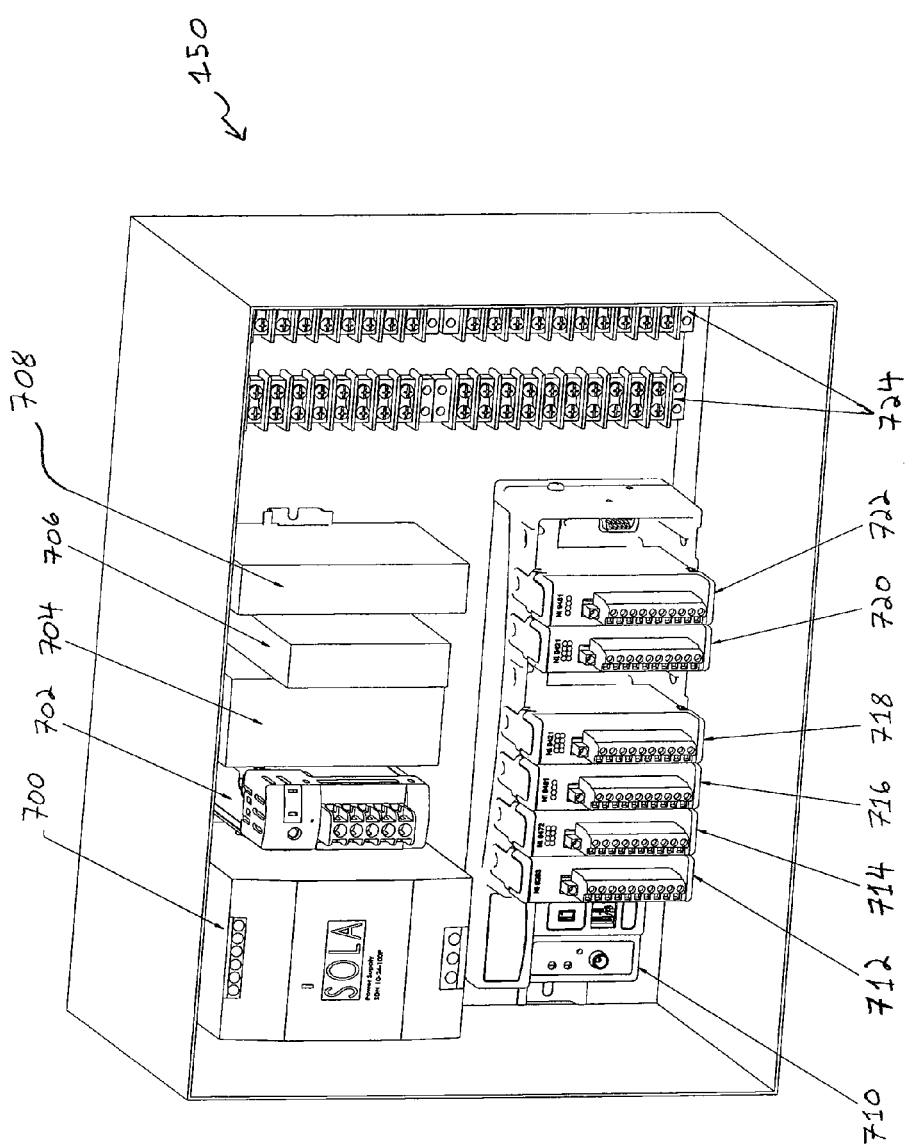
FIG. 40 is an enlarged perspective view of an electrical enclosure of the spider twister machine of FIG. 2.

Turning to additional details of the electronic enclosure 150 shown in FIG. 40, the electronic enclosure 150 includes a power supply 700, such as a SOLA SDN 10-24-100P, 24V, 10 Amp DC power supply, to power the solenoid valves and safety equipment of the spider twister machine 14. The electronics enclosure also includes a power supply 702, such as an OMRON S8VM-01505CD, 5V, 0.5 Amp DC power supply, to power the rotary encoders 86. To receive signals from the operator touch buttons 92 and transmit a start signal to the application 30, the electronics enclosure 150 includes a safety module 704, such as a Banner AT-AM-2A, Two-Hand Control Safety Module. The electronics enclosure 150 has an interface module 706, such as a Banner IM-T-9A interface module, which receives signals from the safety light curtain 93 and transmits a safe-to-operate signal to the application 30. In the illustrated embodiment, the enclosure 150 has a converter 708, such as a Ulinx USOPTL4DR, isolated USB to RS-422/485 converter, to provide bi-directional digital communication between the application 30 and the linear actuators 240.

Turning to the lower half of the electronics enclosure 150, the electronic enclosure 150 has a chassis 710 for input/output modules, such as a National Instruments cDAQ-9172 USB 2.0 chassis for CompactDAQ that houses National Instruments C-Series Input/Output modules. The electronics enclosure 150 has an output module 712, such as a National Instruments NI 9263 4-channel, 100 kS/s simultaneously updating analog output module. Three channels of the output module 712 are used to send 0 to 10 VDC signals to the linear actuators 240 for position and velocity control. One channel of the output module 712 sends a 0 to 10 VDC signal to the electronic proportional regulator 126. To control modes on the linear actuators 240, the electronics enclosure 240 has a digital output module 714, such as a National Instruments NI 9472 8-channel, 100 μs digital output module. The electronics enclosure 150 may also include a digital output module 716, such as a National Instruments NI 9481 4-channel, single-pole single throw (SPST) sourcing digital output module, to control the solenoid valve 107 of the linear actuators 100 and the pneumatic actuator 132 of the spider holddown 80. To receive signals from the proximity sensors 336, 338, the electronics enclosure 150 has a digital input module 718, such as a National Instruments NI 9421 8-channel, 100 μs sinking digital input module. Similarly, the electronics enclosure 150 has a digital input module 720, such as a National Instruments NI 9421 8-channel, 100 μs sinking digital input module, which receives signals from position sensors of the spider holddown 80. To control power to the hydraulic dump valve 120, the electronics enclosure 150 includes a digital output module 722, such as a National Instruments NI 9481 4-channel, single-pole single throw (SPST) sourcing digital output module. In the illustrated embodiment, the electronics enclosure 150 also has general-purpose terminal blocks 724 to facilitate power distribution to the various electrical circuits of the spider twister machine 14.

It will be understood that various changes in the details, materials, and arrangements of parts and components which have been herein described and illustrated in order to explain the nature of the manufacturing system and methods may be made by those skilled in the art within the principle and scope of the manufacturing system and methods as expressed in the appended claims. Furthermore, while various features have been described with regard to a particular embodiment or a particular approach, it will be appreciated that features described for one embodiment also may be incorporated with the other described embodiments.

What is claimed is:

1. A method of twisting a spider using a machine, the method comprising:
    securing the machine to lobes of a spider;
    twisting the lobes in a first direction toward initial target positions using the machine;
    permitting the lobes to twist in a second direction toward first free state positions in response to the lobes reaching the initial target positions, the machine being secured to the lobes as the lobes twist toward the first free state positions; and
    twisting one or more of the lobes in the first direction or the second direction toward first corrective target positions using the machine in response to the one or more lobes having first free state positions different than final target positions of the lobes.

2. The method of claim 1 further comprising permitting the one or more lobes to twist in the first direction or the second direction toward second free state positions in response to the one or more lobes reaching the first corrective target positions, the machine being secured to the one or more lobes as the one or more lobes twist toward the second free state positions.

3. The method of claim 2 further comprising twisting one or more of the lobes in the first direction or the second direction toward second corrective target positions using the machine in response to the one or more the lobes having second free state positions different than the final target positions.

4. The method of claim 3 further comprising permitting the one or more lobes to twist in the first direction or the second direction toward third free state positions in response to the one or more lobes reaching the second corrective target positions, the machine being secured to the one or more lobes as the one or more lobes twist toward the third free state positions.

5. The method of claim 1 wherein twisting the lobes in the first direction toward initial target positions using the machine includes twisting at least two of the lobes to different initial target positions.

6. The method of claim 1 wherein twisting one or more of the lobes toward first corrective target positions using the machine includes twisting fewer than all of the lobes of the spider.

7. The method of claim 6 further comprising twisting at least one lobe in the first direction or the second direction toward a second corrective target position, wherein the at least one lobe was not one of the one or more lobes twisted toward first corrective target positions, in response to the twisting of the one or more lobes toward first corrective target positions causing the first free state position of the at least one lobe to be different than the final target position of the at least one lobe.

8. The method of claim 1 wherein twisting one or more of the lobes toward first corrective target positions using the machine includes restricting movement of one or more remaining lobes of the spider using the machine as the one or more lobes twist toward the first corrective target positions.

9. The method of claim 1 wherein permitting the lobes to twist in the second direction toward first free state positions includes controlling twisting of the lobes toward the first free state positions.

10. The method of claim 1 wherein securing the machine to the lobes of the spider includes clamping jaws of a lobe clamp to each of the lobes.

11. The method of claim 1 further comprising measuring the first free state positions of the lobes by measuring values that correspond to the first free state positions of the lobes.

12. A method of twisting a spider using a machine, the method comprising:
    securing the machine to lobes of a spider;
    twisting the lobes in a first direction toward initial target positions using the machine;
    permitting the lobes to twist in a second direction toward first free state positions in response to the lobes reaching the initial target positions;
    measuring the first free state position of each of the lobes using sensors of the machine; and
    determining first corrective target positions for one or more of the lobes in response to the one or more lobes having first free state positions different than final target positions of the one or more lobes.

13. The method of claim 12 further comprising twisting the one or more lobes in the first direction or the second direction toward the first corrective target positions using the machine and permitting the one or more lobes to twist in the first direction or the second direction toward second free state positions in response to the one or more lobes reaching the first corrective target positions.

14. The method of claim 13 further comprising measuring the second free state position of each of the one or more lobes and determining second corrective target positions for one or more of the lobes in response to the one or more lobes having second free state positions different than the final target positions.

15. The method of claim 12 further comprising determining the initial target positions using a processor to calculate the initial target position for each of the lobes based at least partially on the final target position of the lobe.

16. The method of claim 12 wherein measuring the first free state position of each of the lobes using sensors of the machine includes receiving data from free state position sensors regarding the lobes reaching the first free state positions.

17. The method of claim 16 wherein receiving data from free state position sensors regarding the lobes reaching the first free state positions includes monitoring torsional loads applied to the machine by the lobes to detect when the torsional loads are approximately zero.

18. The method of claim 12 wherein measuring the first free state position of each of the lobes using sensors of the machine includes receiving data from position sensors regarding the positions of the lobes in the first free state positions.

19. The method of claim 18 wherein receiving data from position sensors includes detecting rotary positions of driveshafts connected to the lobes.

20. The method of claim 12 wherein determining first corrective target positions for one or more lobes includes using a processor to calculate the first corrective target positions using the initial target positions, the final target positions, and the first free state positions of the one or more lobes.

21. The method of claim 12 wherein measuring the first free state position of each of the lobes using sensors of the machine includes measuring a value for each of the lobes that corresponds to the free state position of the lobe.

22. A method of twisting a spider using a machine, the method comprising:
securing the machine to lobes of a spider;
twisting the lobes in a first direction toward initial target positions using the machine;
permitting the lobes to twist in a second direction toward first free state positions in response to the lobes reaching the initial target positions, the machine being secured to the lobes as the lobes twist toward the first free state positions; and
twisting a plurality of the lobes in the first direction or the second direction toward first corrective target positions using the machine in response to the plurality of lobes having first free state positions different than final target positions of the lobes,
wherein twisting the plurality of the lobes toward first corrective target positions using the machine includes twisting the plurality of the lobes independently of each other.

23. The method of claim 22 wherein twisting the plurality of lobes in the first direction or the second direction toward first corrective target positions includes twisting the plurality of lobes to different first corrective target positions.

24. The method of claim 22 wherein twisting the plurality of lobes in the first direction or the second direction toward first corrective target positions includes twisting fewer than all of the lobes of the spider.

25. The method of claim 22 further comprising permitting the plurality of lobes to twist in the first direction or the second direction toward second free state positions in response to the plurality of lobes reaching the first corrective target positions, the machine being secured to the plurality of lobes as the plurality of lobes twist toward the second free state positions.

26. The method of claim 25 further comprising twisting one or more of the lobes in the first direction or the second direction toward second corrective target positions using the machine in response to the one or more the lobes having second free state positions different than the final target positions.

27. The method of claim 26 further comprising permitting the one or more lobes to twist in the first direction or the second direction toward third free state positions in response to the one or more lobes reaching the second corrective target positions, the machine being secured to the one or more lobes as the one or more lobes twist toward the third free state positions.

28. The method of claim 22 wherein twisting the lobes in the first direction toward initial target positions using the machine includes twisting at least two of the lobes to different initial target positions.

29. The method of claim 22 further comprising twisting at least one lobe in the first direction or the second direction toward a second corrective target position, wherein the at least one lobe was not one of the plurality of lobes twisted toward first corrective target positions, in response to the twisting of the plurality of lobes toward first corrective target positions causing the first free state position of the at least one lobe to be different than the final target position of the at least one lobe.

30. The method of claim 22 wherein twisting the plurality of lobes toward first corrective target positions using the machine includes restricting movement of one or more remaining lobes of the spider using the machine as the plurality of lobes twist toward the first corrective target positions.

31. The method of claim 22 wherein permitting the lobes to twist in the second direction toward first free state positions includes controlling twisting of the lobes toward the first free state positions.

32. The method of claim 22 wherein securing the machine to the lobes of the spider includes clamping jaws of a lobe clamp to each of the lobes.

33. The method of claim 22 wherein twisting the plurality of lobes in the first direction or the second direction toward first corrective target positions includes twisting one of the plurality of lobes in the first direction and twisting another one of the plurality of lobes in the second direction.

34. The method of claim 22 further comprising measuring the first free state positions of the lobes by measuring values that correspond to the first free state positions of the lobes.

35. A method of twisting a spider using a machine, the method comprising:
securing the machine to lobes of a spider;
twisting the lobes in a first direction toward initial target positions using the machine;
determining first values corresponding to first free state positions of the lobes using the machine; and
twisting one or more of the lobes in the first direction or a second direction toward first corrective target positions using the machine in response to the first values corresponding to the first free state positions of the one or more lobes being different than second values corresponding to final target positions of the one or more lobes.

36. The method of claim 35 wherein twisting the one or more lobes in the first direction or the second direction toward first corrective target positions includes twisting a plurality of lobes in the first direction or the second direction toward first corrective target positions in response to the first values being different than the second values.

37. The method of claim 36 wherein twisting the plurality of lobes in the first direction or the second direction toward first corrective target positions includes twisting the plurality of lobes to different first corrective target positions.

38. The method of claim 36 wherein twisting the plurality of lobes in the first direction or the second direction toward the first corrective target positions includes twisting fewer than all of the lobes of the spider.

39. The method of claim 35 further comprising:
using the machine to determine third values corresponding to second free state positions of one or more lobes; and twisting the one or more lobes in the first direction or the second direction toward second corrective target positions using the machine in response to the third values corresponding to the second free state positions of the one or more lobes being different than the second values corresponding to the final target positions of the one or more lobes.

40. The method of claim 39 further comprising:
using the machine to determine fourth values corresponding to third free state positions of one or more lobes; and
twisting the one or more of the lobes in the first direction or the second direction toward third corrective target positions using the machine in response to the fourth values corresponding to the third free state positions of the one or more lobes being different than the second values corresponding to the final target positions.

41. The method of claim 35 wherein twisting one or more of the lobes toward first corrective target positions using the machine includes twisting fewer than all of the lobes of the spider.

42. The method of claim 41 further comprising twisting at least one lobe in the first direction or the second direction toward a second corrective target position, wherein the at least one lobe was not one of the one or more lobes twisted toward first corrective target positions, in response to the twisting of the one or more lobes toward first corrective target positions causing the first value corresponding to the first free state position of the at least one lobe to be different than the second value corresponding to the final target position of the at least one lobe.

43. The method of claim 35 wherein twisting the one or more lobes in the first direction toward first corrective target positions includes twisting a plurality of the lobes independently of each other toward first corrective target positions.

44. The method of claim 35 wherein the determining the first values corresponding to the first free state positions of the lobes using the machine includes determining a torque applied to the machine by each of the lobes.

* * * * *